(12) United States Patent
Kobayashi

(10) Patent No.: US 11,609,410 B2
(45) Date of Patent: Mar. 21, 2023

(54) OPTICAL SYSTEM, OPTICAL APPARATUS, AND IMAGE PICKUP APPARATUS

(71) Applicant: CANON KABUSHIKI KAISHA, Tokyo (JP)

(72) Inventor: Kana Kobayashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 636 days.

(21) Appl. No.: 15/839,631

(22) Filed: Dec. 12, 2017

(65) Prior Publication Data
US 2018/0172964 A1    Jun. 21, 2018

(30) Foreign Application Priority Data
Dec. 15, 2016   (JP) .............................. JP2016-243042

(51) Int. Cl.
G02B 15/22     (2006.01)
G02B 13/20     (2006.01)
G02B 27/00     (2006.01)

(52) U.S. Cl.
CPC ............. *G02B 15/22* (2013.01); *G02B 13/20* (2013.01); *G02B 27/0025* (2013.01)

(58) Field of Classification Search
CPC ...... G02B 15/00; G02B 15/14; G02B 15/143; G02B 15/1435; G02B 15/143507; G02B 15/16; G02B 13/001; G02B 13/0015; G02B 13/009; G02B 27/0025; G02B 7/00; G02B 7/02; G02B 7/04; G02B 7/08; G02B 7/09; G02B 7/10; G02B 7/105; G02B 5/005; G02B 13/20; G02B 15/22–28; G03B 3/00; G03B 3/0081; G03B 2205/00; G03B 2205/0046; H04N 5/23212

USPC .............. 359/642, 676–706, 738; 348/240.1, 348/240.3, 345–357, 374; 396/72–88, 396/89–152; 352/139, 140, 142; 250/201.4, 201.6–201.8; 382/255

See application file for complete search history.

(56) References Cited

U.S. PATENT DOCUMENTS

| | | | | |
|---|---|---|---|---|
| 4,310,221 A | * | 1/1982 | Momiyama | G02B 13/20 359/779 |
| 4,781,446 A | * | 11/1988 | Tanaka | G02B 15/1435 359/680 |
| 4,826,301 A | * | 5/1989 | Ikemori | G02B 13/20 359/740 |
| 4,957,354 A | * | 9/1990 | Matsuyama | G02B 7/28 359/823 |

(Continued)

FOREIGN PATENT DOCUMENTS

| | | |
|---|---|---|
| CN | 105960605 A | 9/2016 |
| EP | 3098641 A1 | 11/2016 |

(Continued)

*Primary Examiner* — Nicholas R. Pasko
(74) *Attorney, Agent, or Firm* — Canon U.S.A., Inc. I.P. Division

(57) ABSTRACT

An optical system includes a first focusing unit and a second focusing unit that move in different loci during focusing. In a first arrangement state, the first focusing unit and the second focusing unit are so arranged to generate a first aberration while maintaining an in-focus state at a predetermined object distance, and in a second arrangement state, the first focusing unit and the second focusing unit are so arranged to generate a second aberration different from the first aberration while maintaining the in-focus state at the predetermined object distance.

15 Claims, 59 Drawing Sheets

(56) References Cited

U.S. PATENT DOCUMENTS

| | | | | | |
|---|---|---|---|---|---|
| 5,267,086 | A | * | 11/1993 | Hirano | G02B 13/20 359/795 |
| 5,822,132 | A | * | 10/1998 | Hirakawa | G02B 13/20 359/698 |
| 5,841,590 | A | * | 11/1998 | Sato | G02B 13/20 359/764 |
| 5,991,093 | A | * | 11/1999 | Murata | G02B 15/177 359/686 |
| 6,212,017 | B1 | * | 4/2001 | Murata | G02B 13/20 359/687 |
| 6,552,857 | B2 | * | 4/2003 | Sensui | G02B 13/20 359/795 |
| 6,778,332 | B2 | * | 8/2004 | Iikawa | G02B 27/0068 359/695 |
| 8,169,717 | B2 | * | 5/2012 | Caldwell | G02B 13/18 359/781 |
| 2016/0116734 | A1 | | 4/2016 | Gyoda | |
| 2017/0038566 | A1 | * | 2/2017 | Shibayama | G02B 15/17 |

FOREIGN PATENT DOCUMENTS

| | | |
|---|---|---|
| JP | 10-68879 A | 3/1998 |
| JP | 10-68880 A | 3/1998 |
| JP | 2000-292689 A | 10/2000 |
| JP | 2002-318347 A | 10/2002 |
| JP | 2015-135439 A | 7/2015 |
| JP | 2016-071282 A | 5/2016 |
| JP | 2016-081005 A | 5/2016 |

* cited by examiner

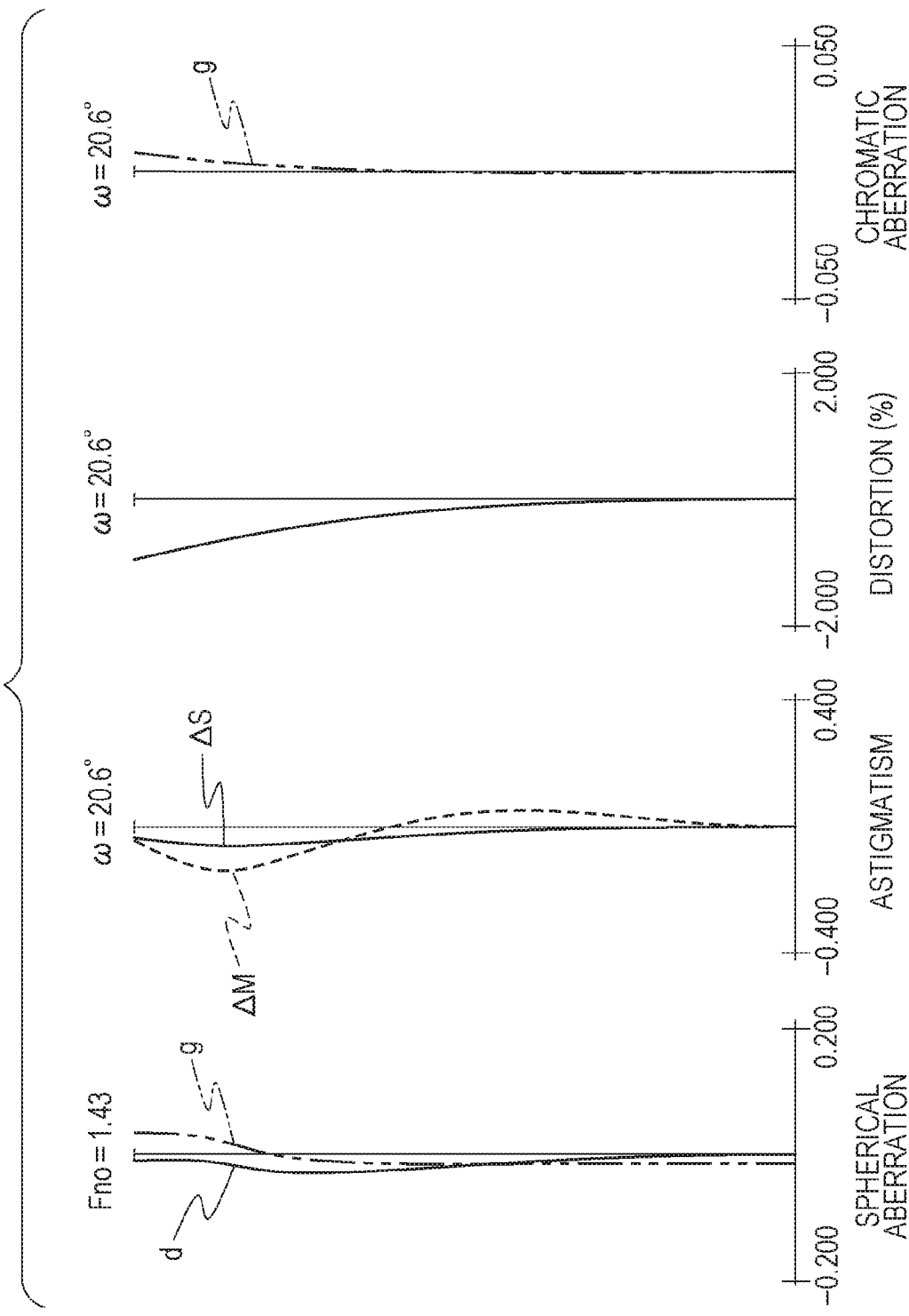

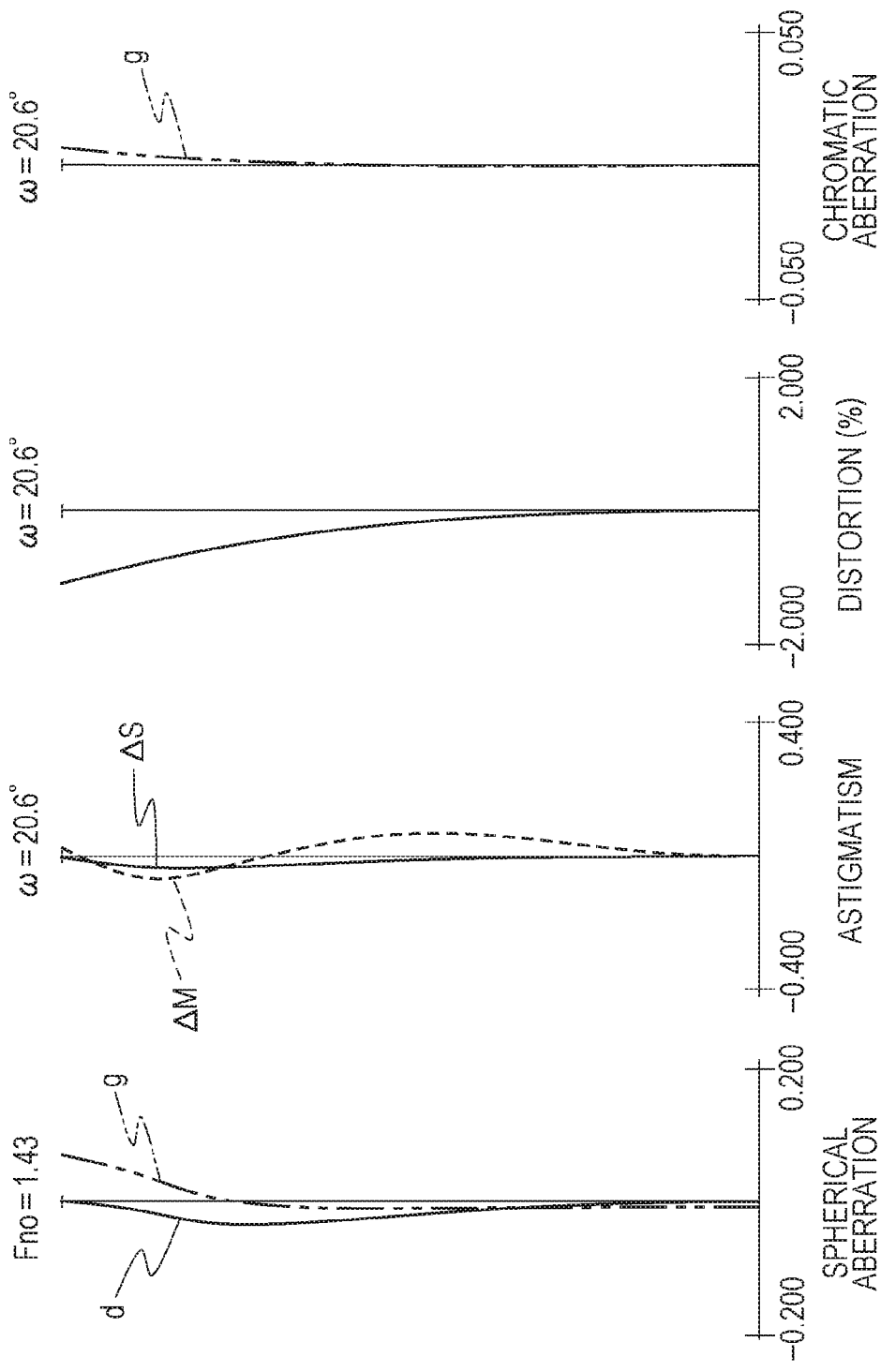

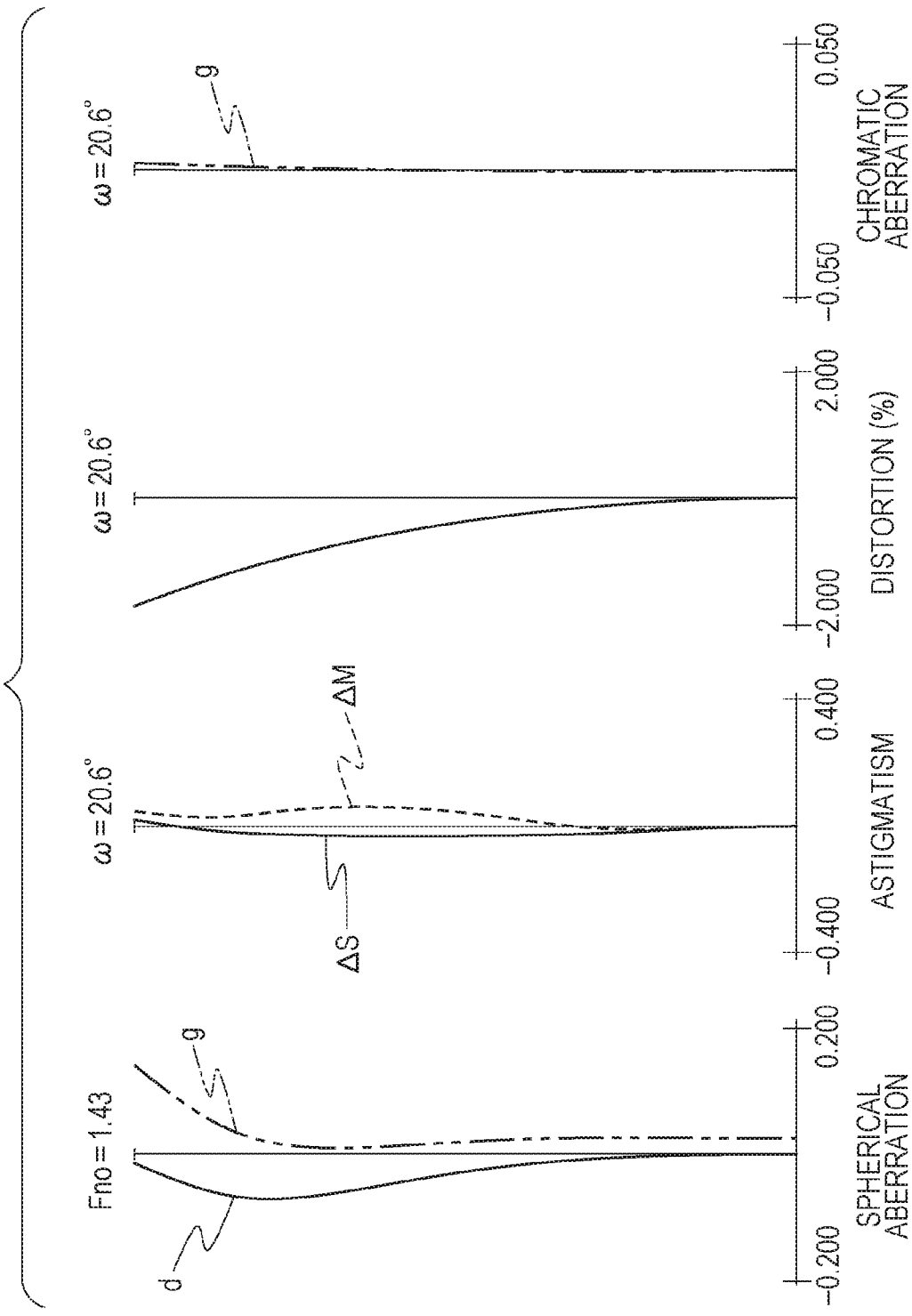

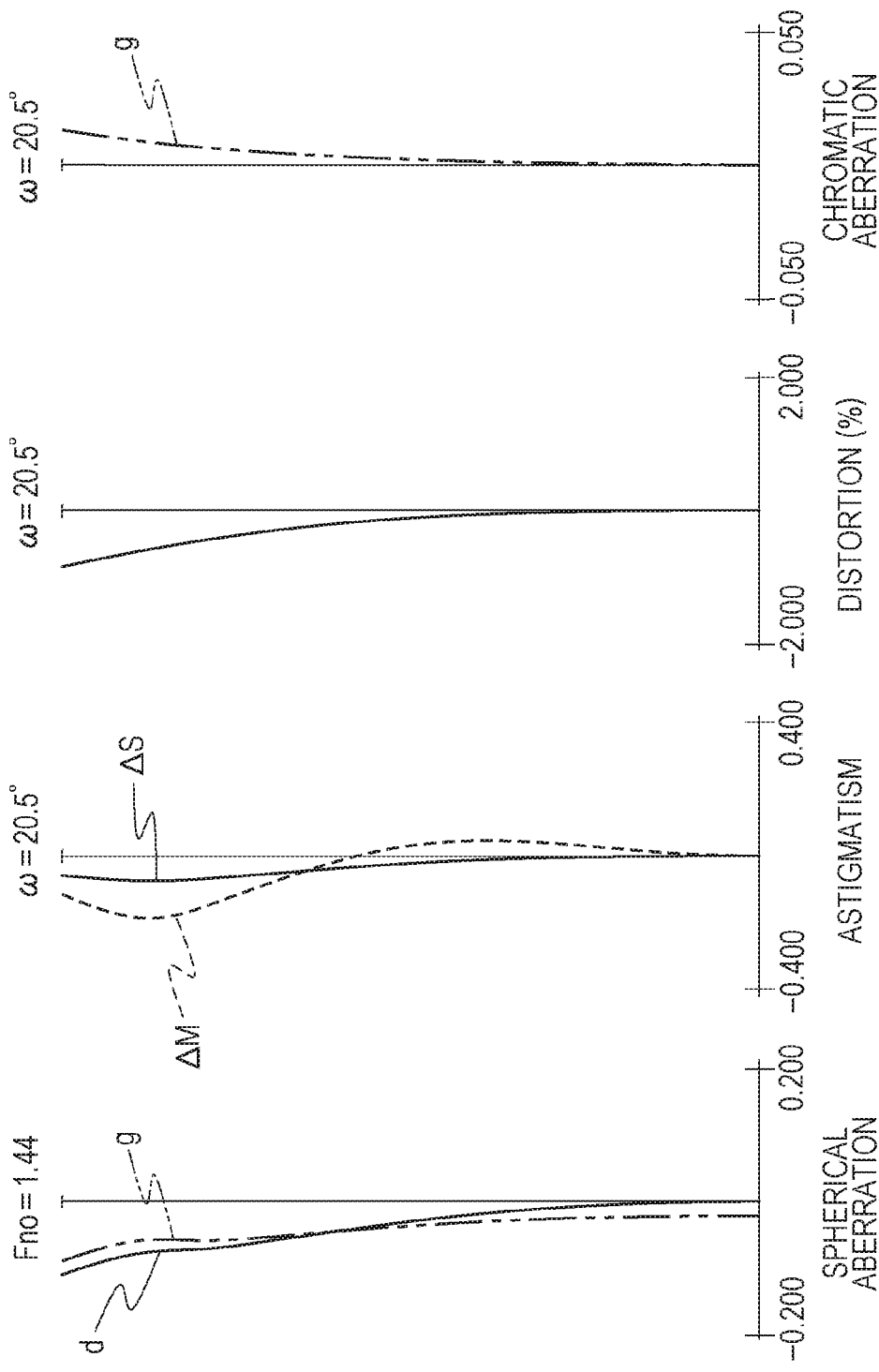

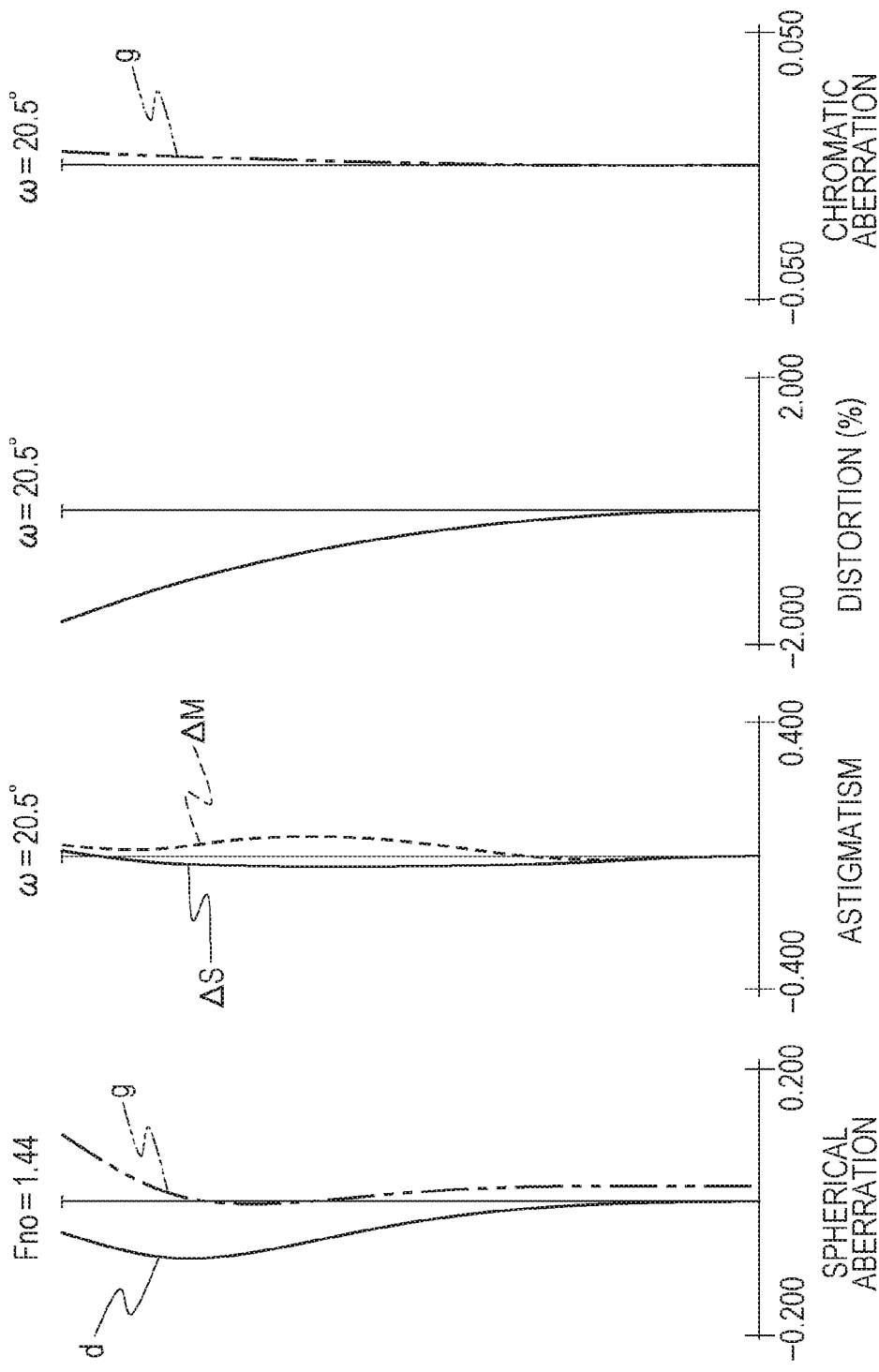

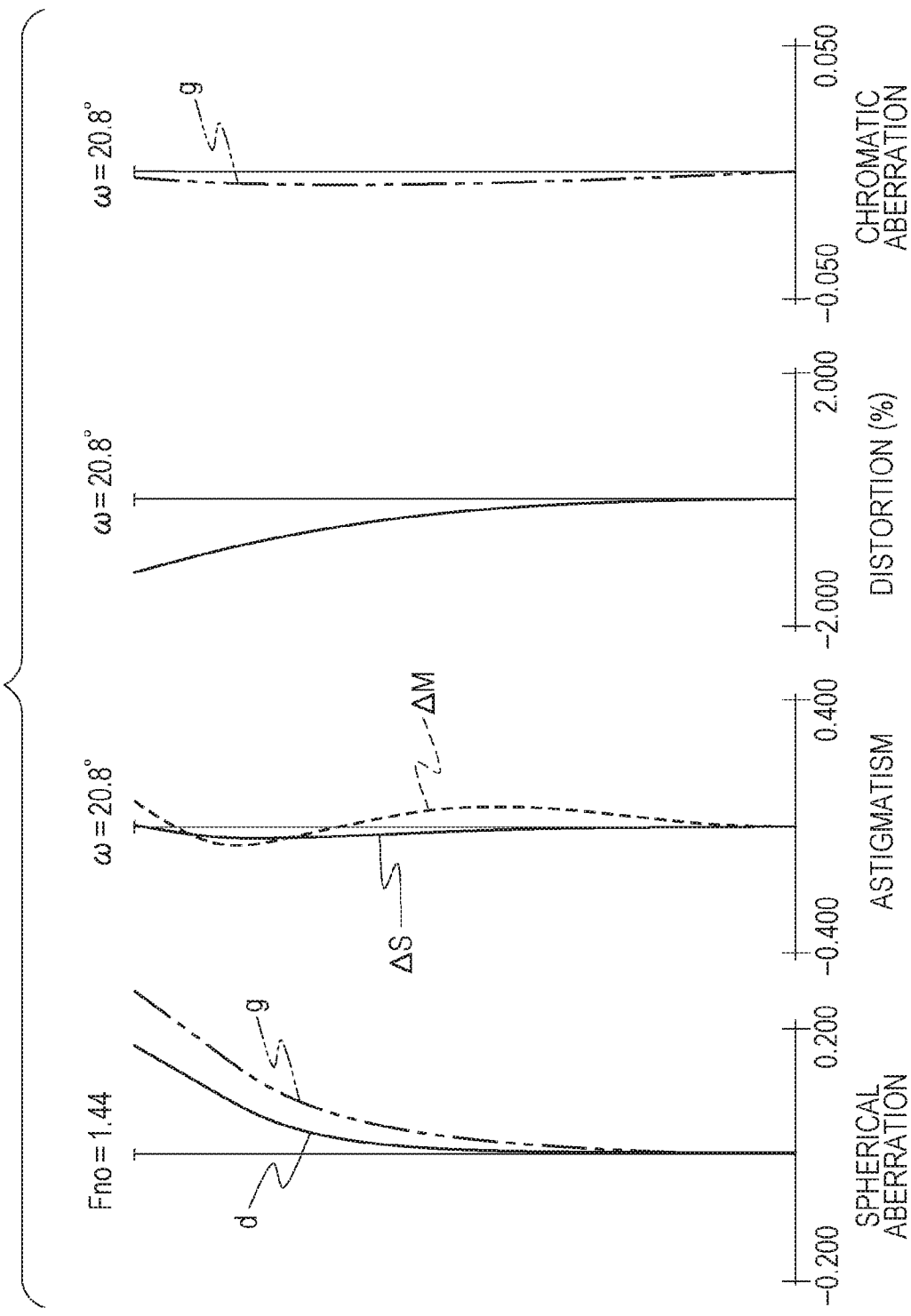

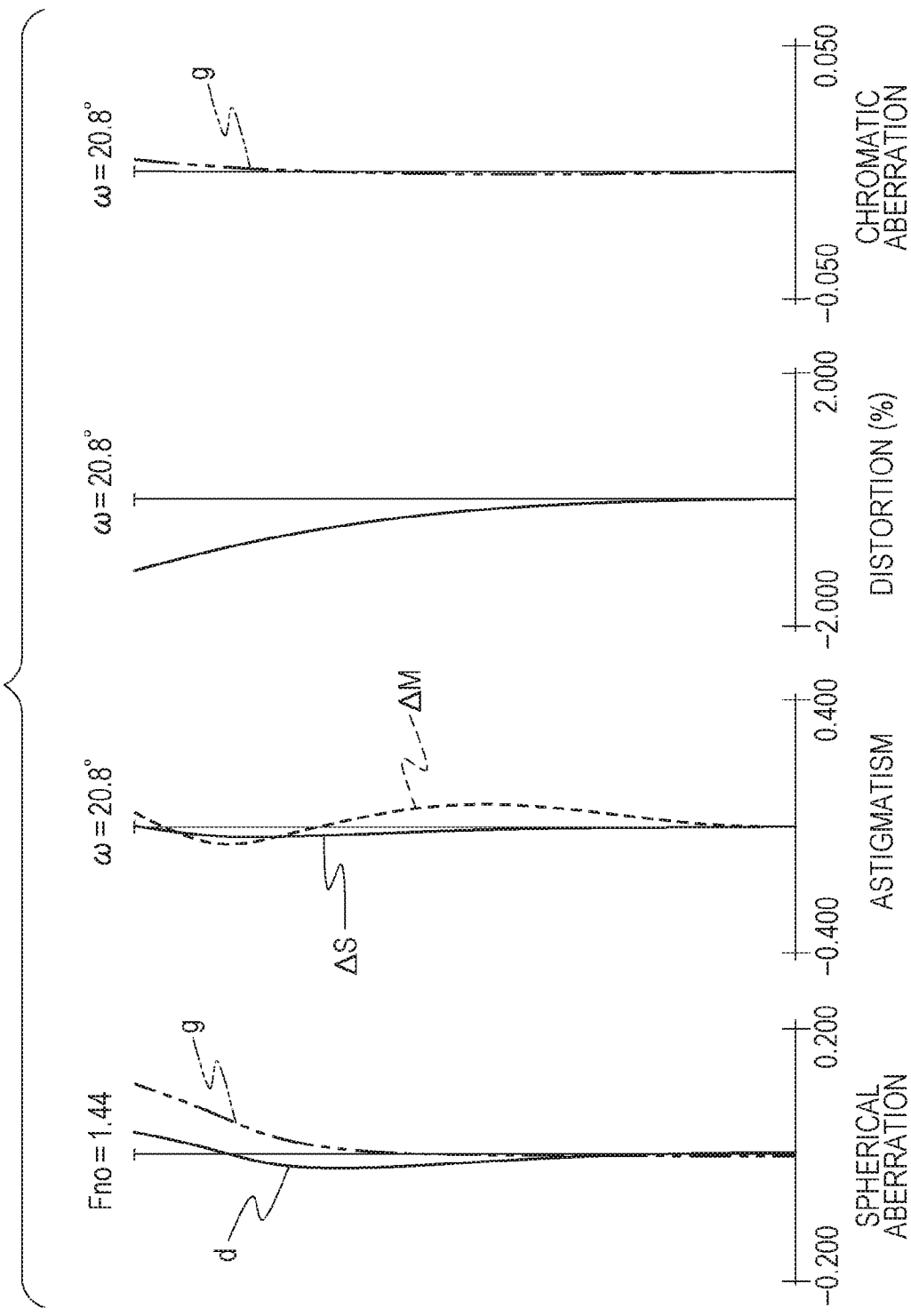

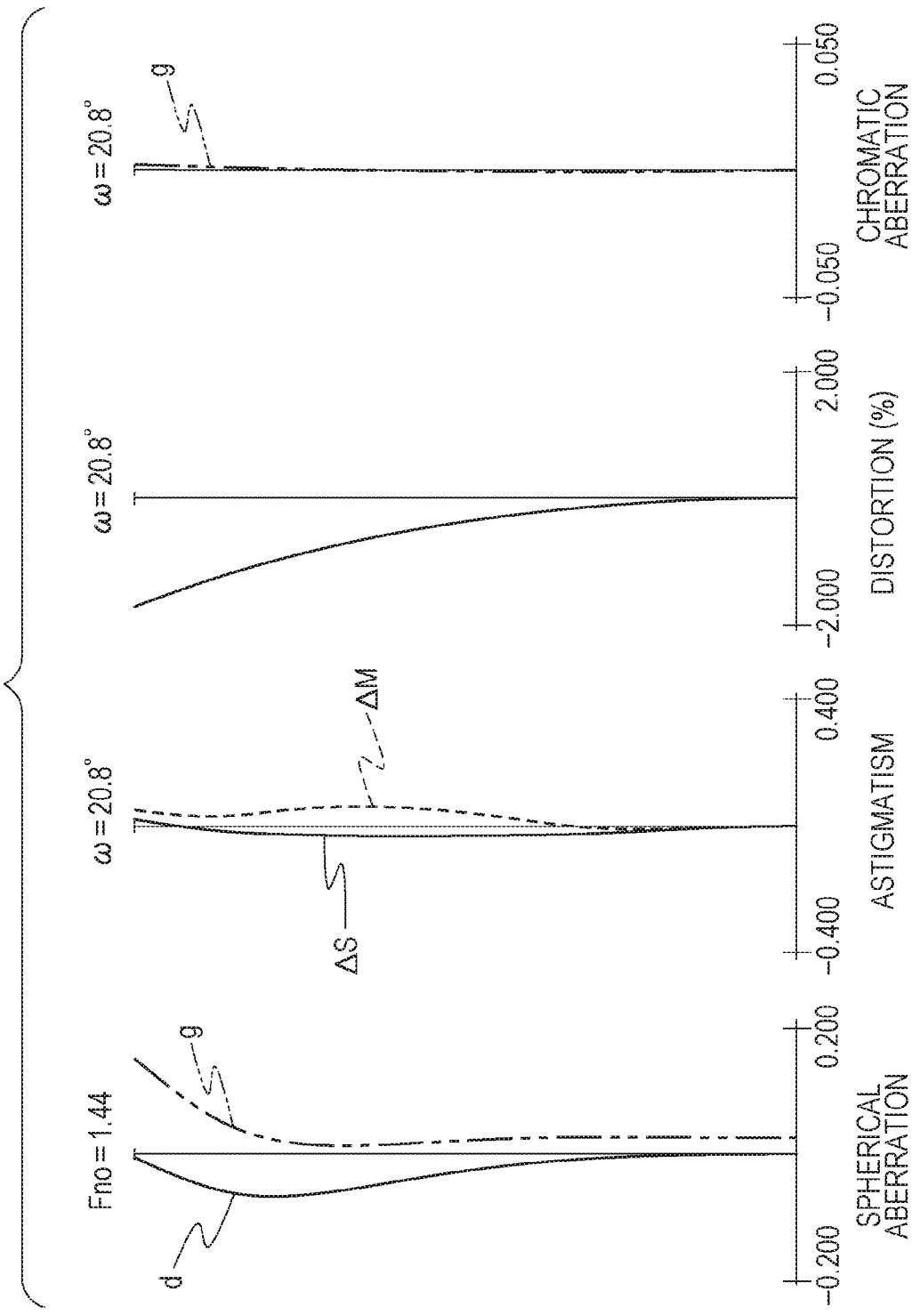

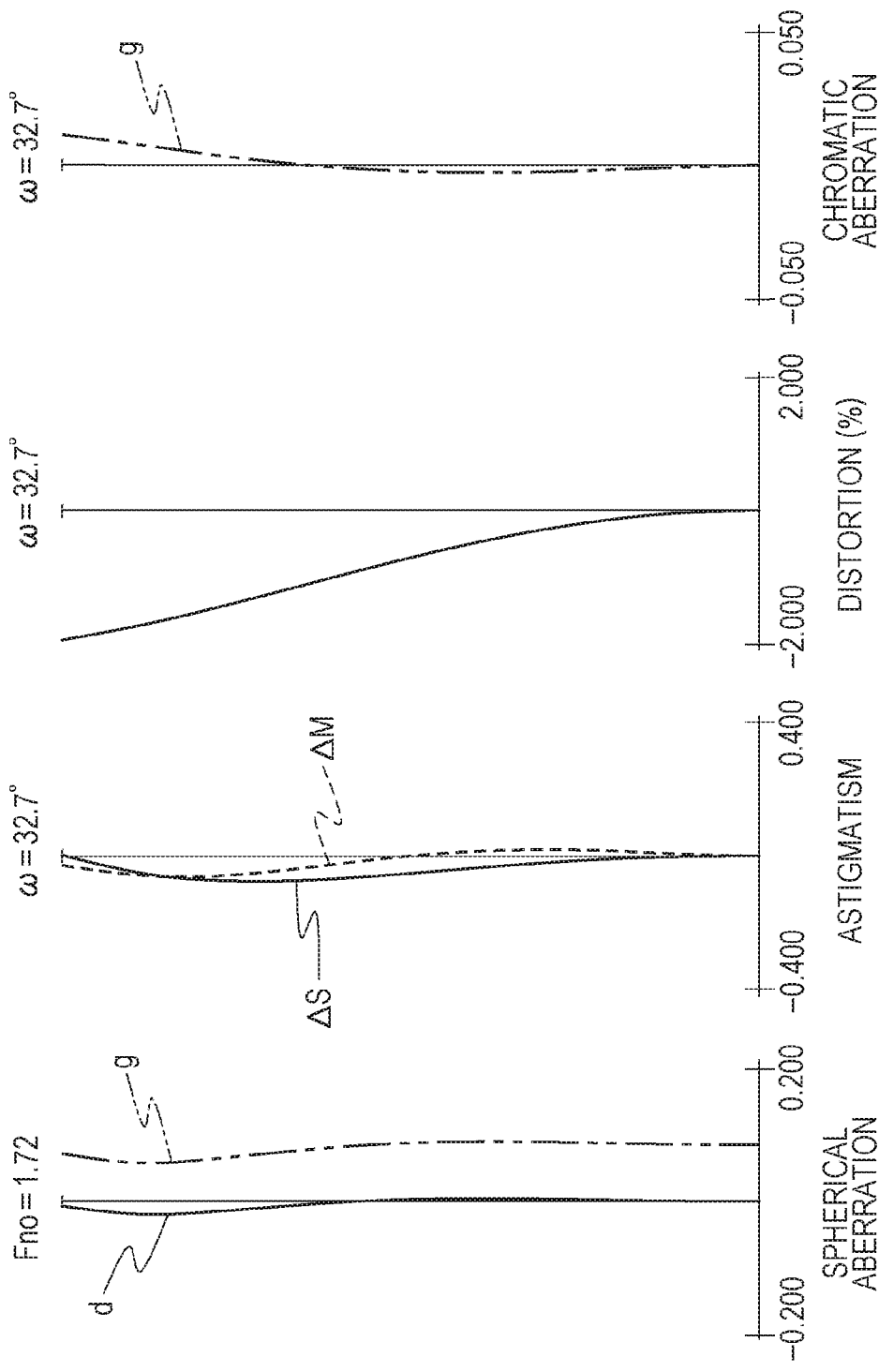

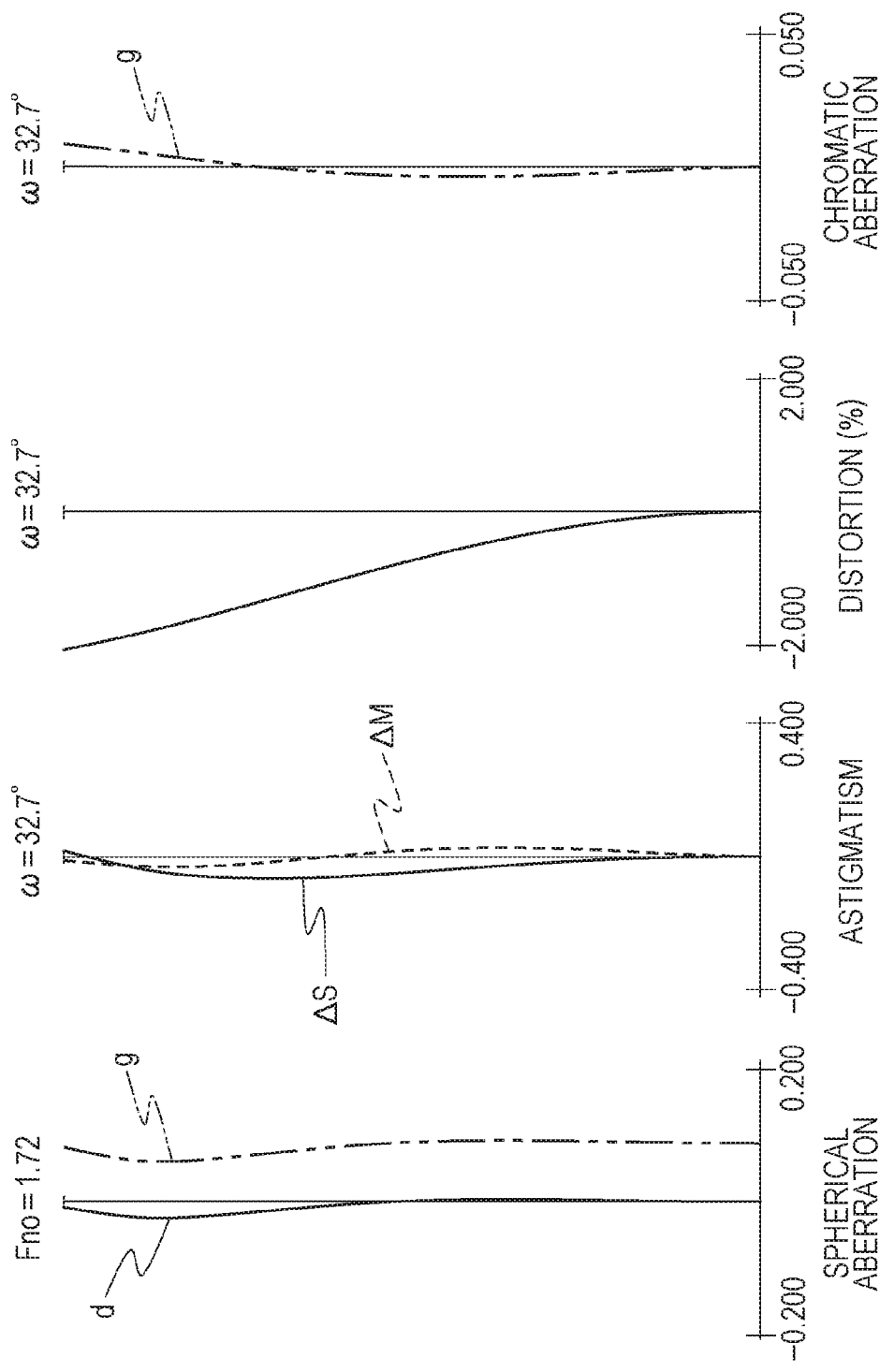

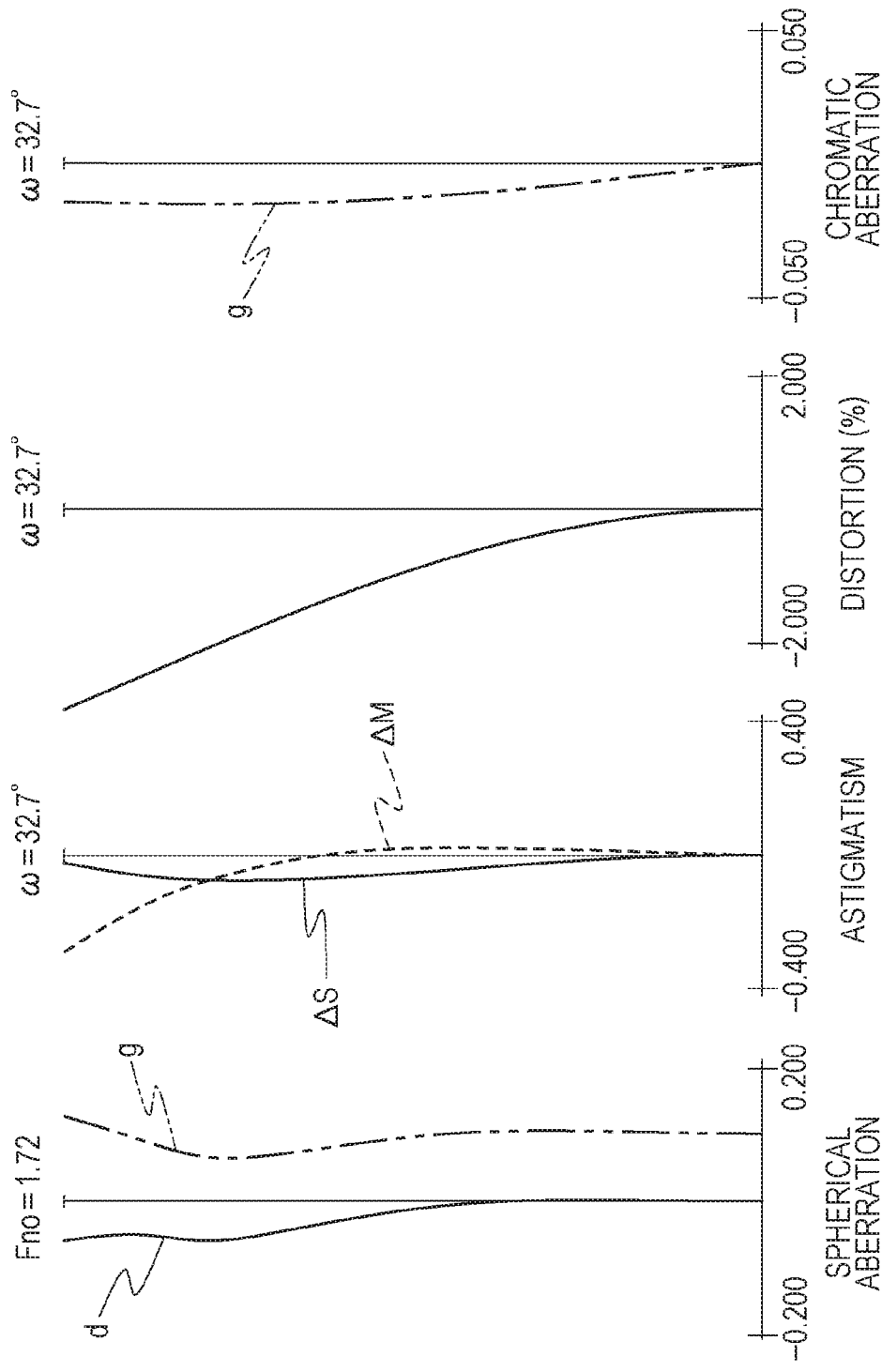

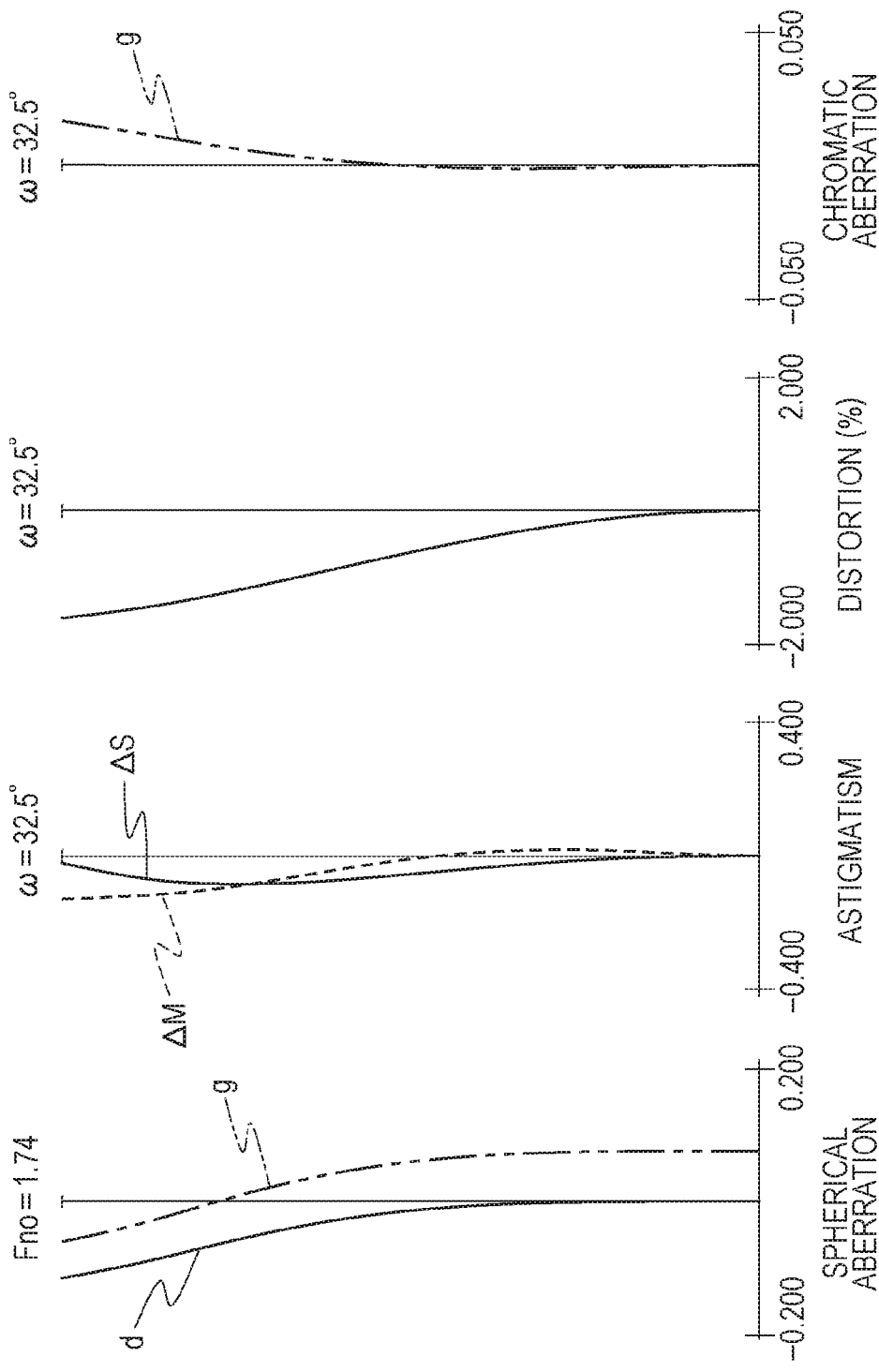

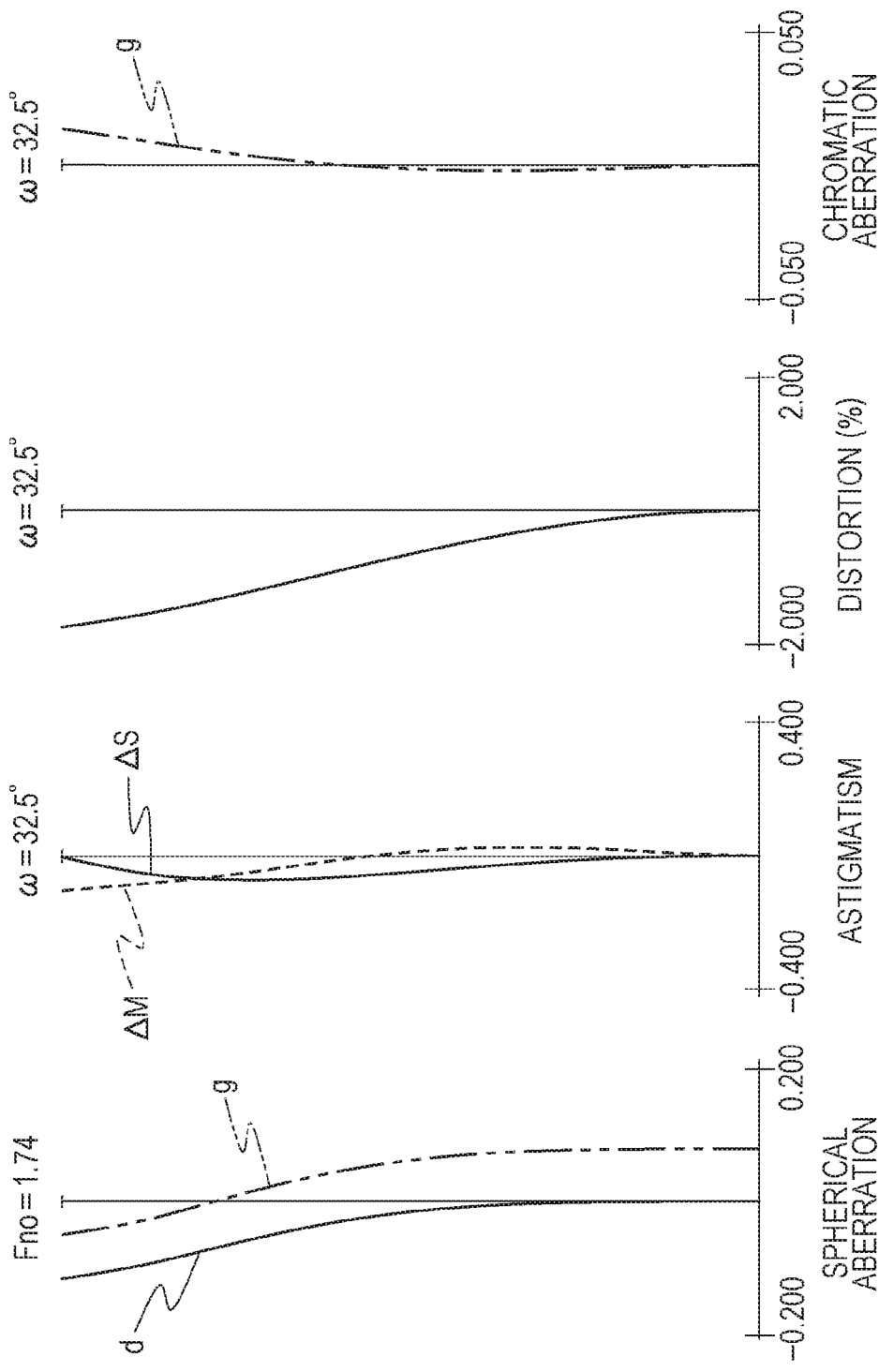

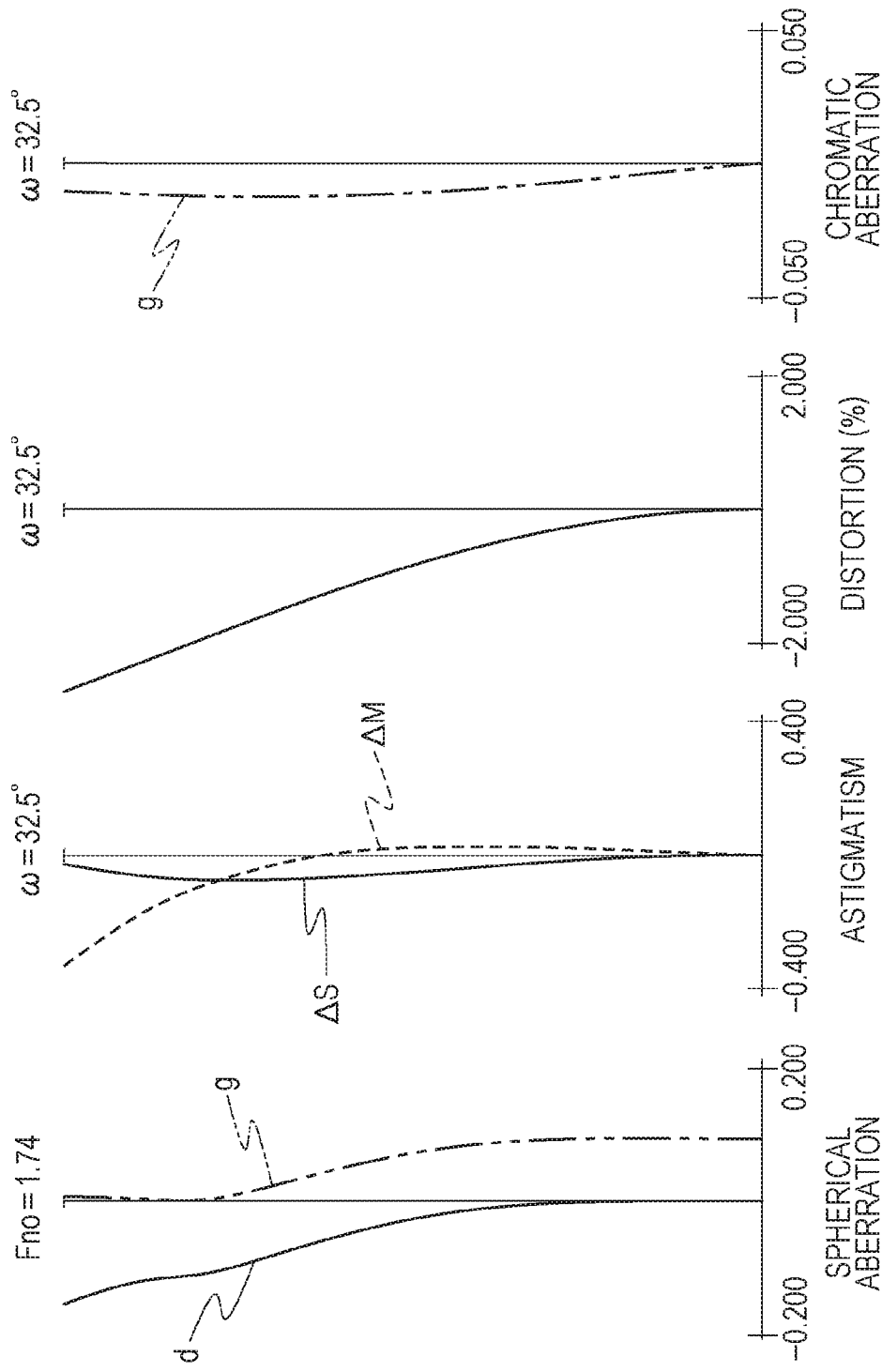

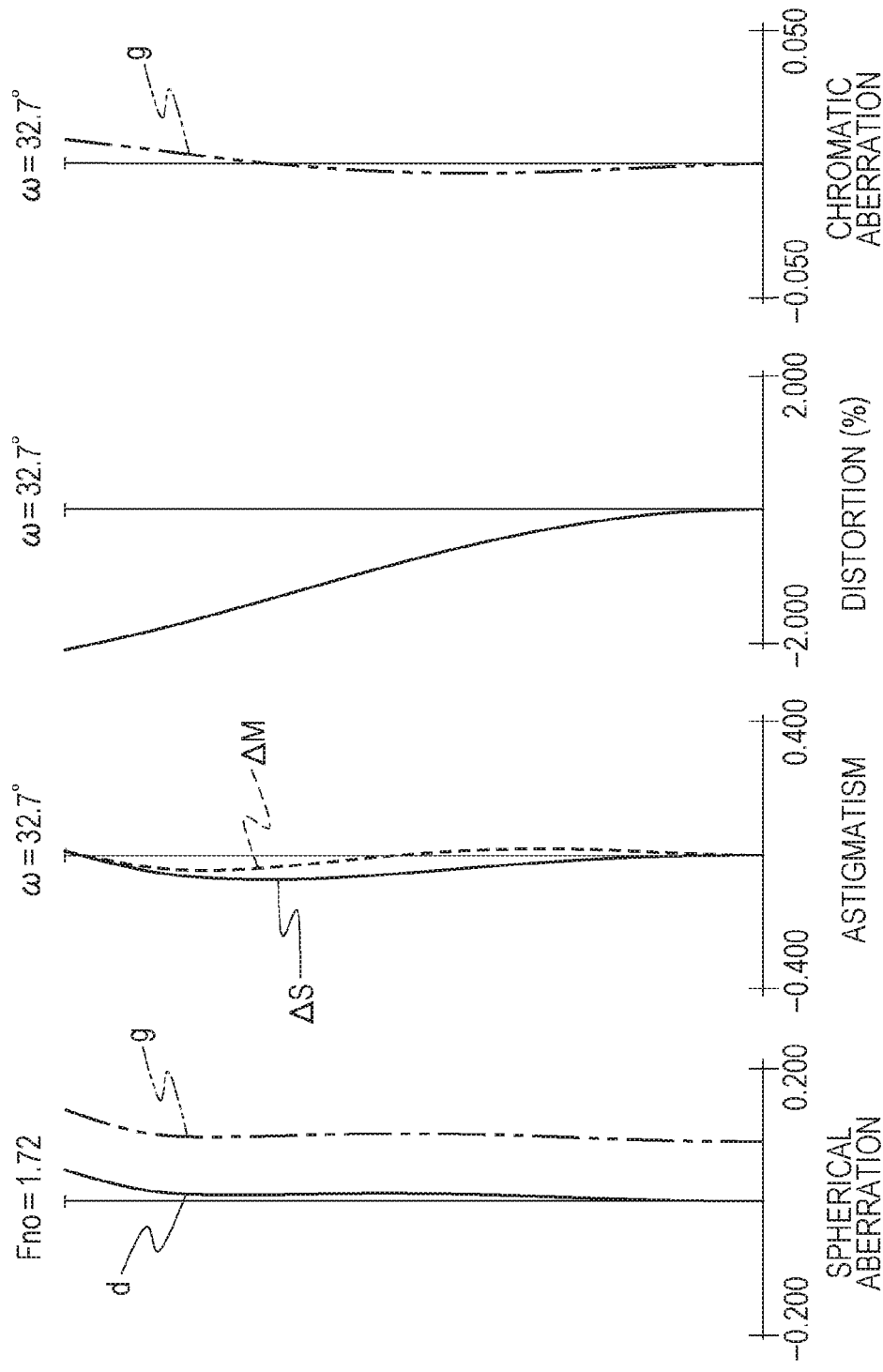

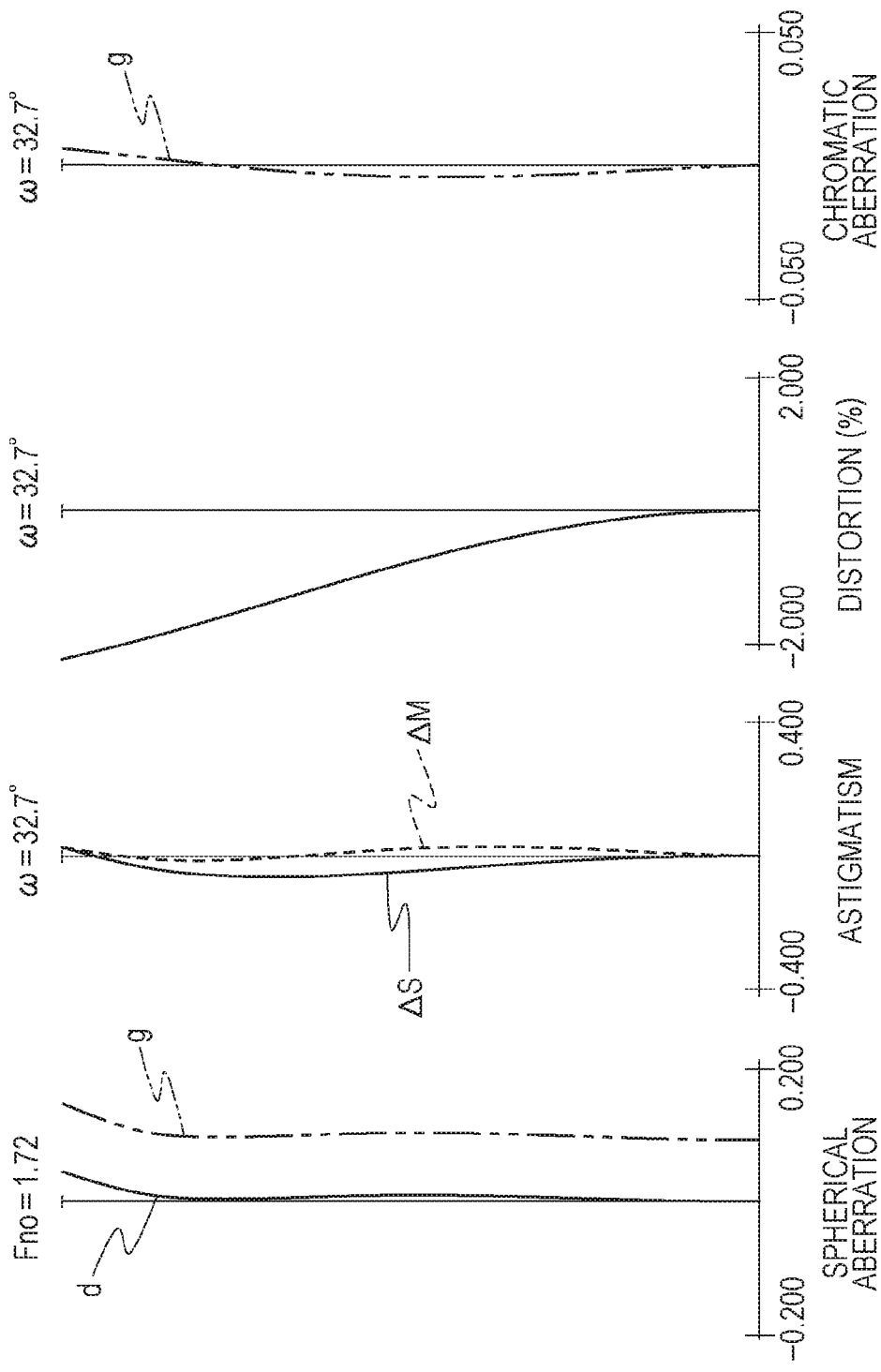

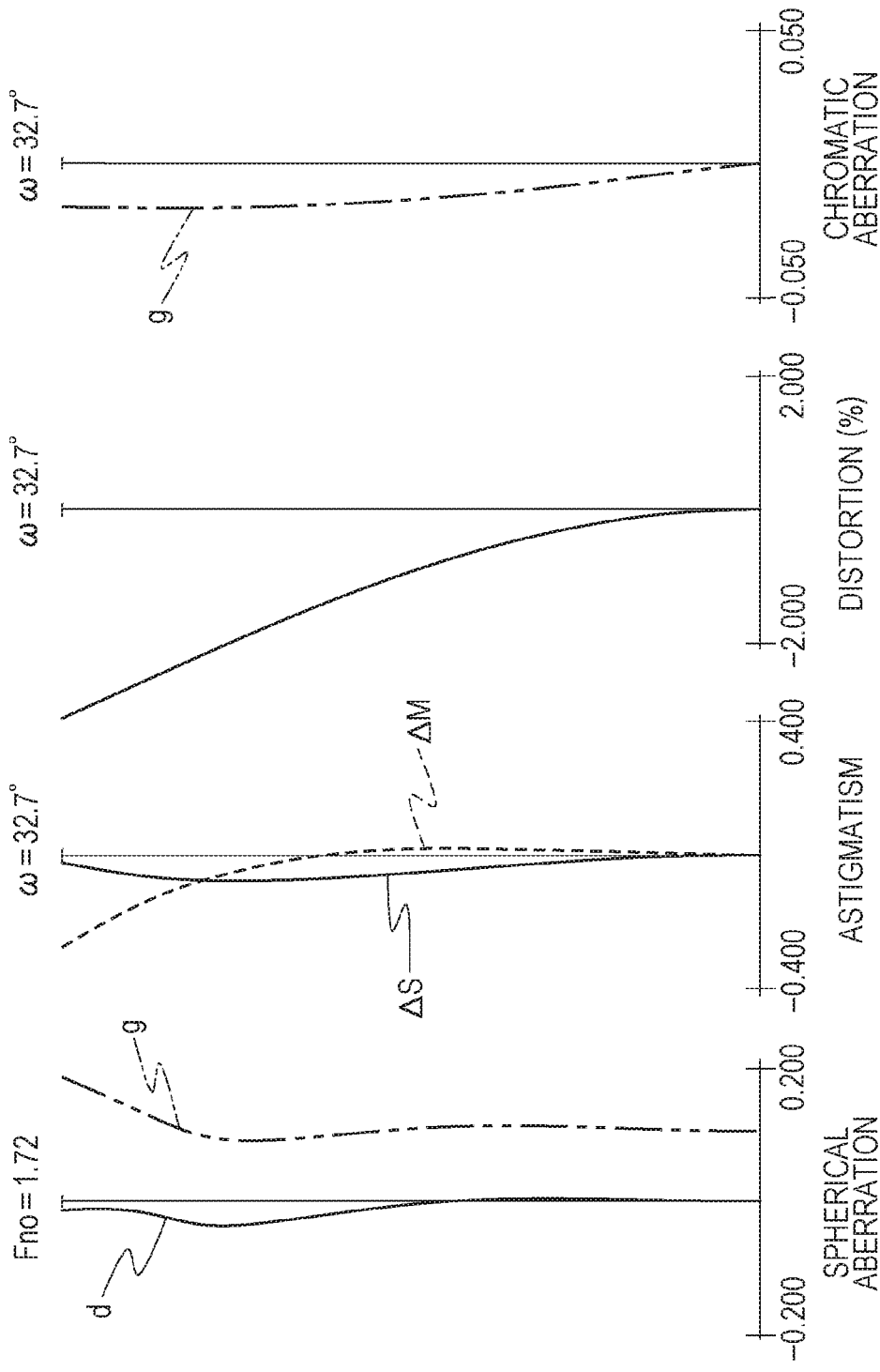

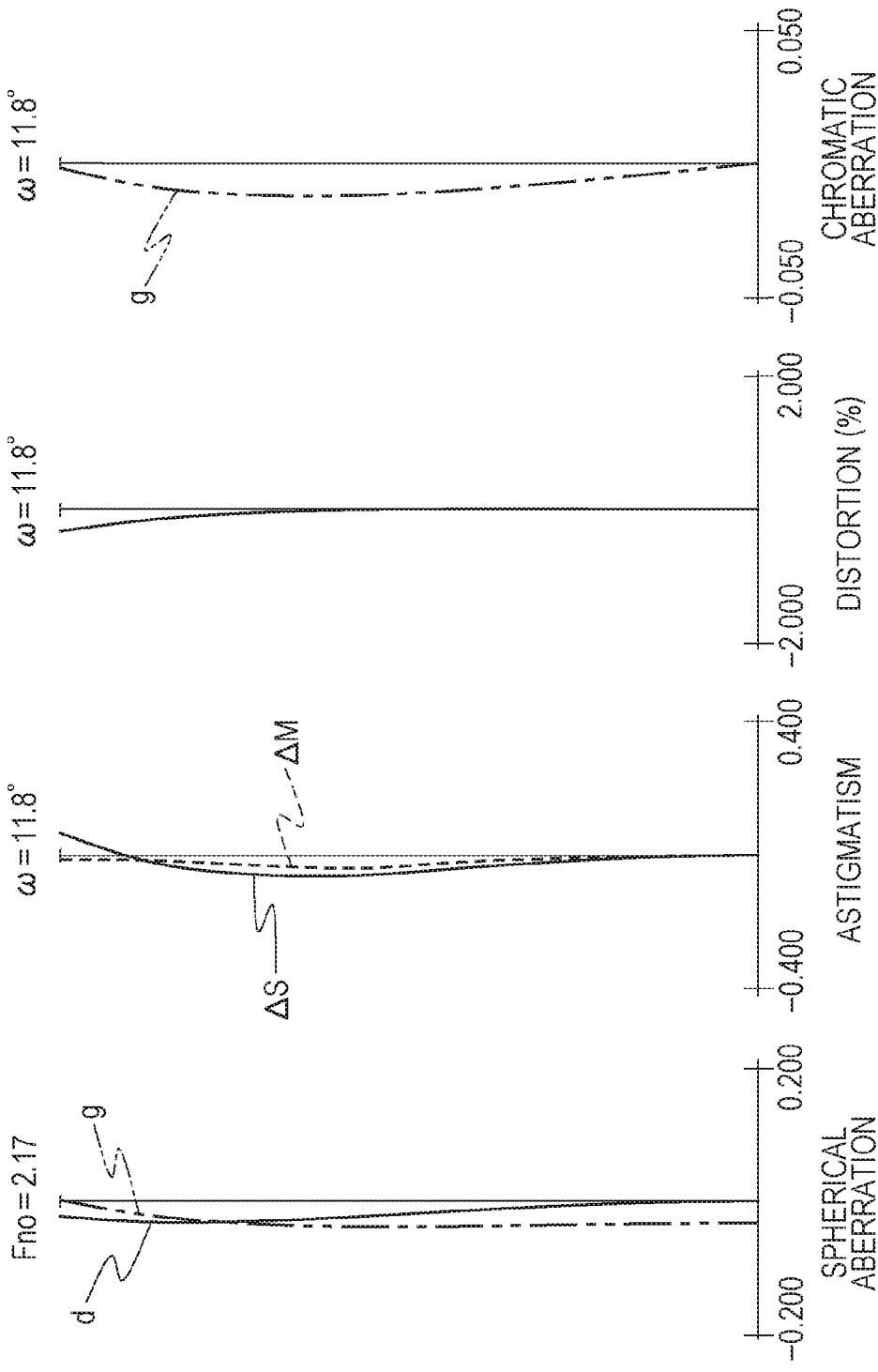

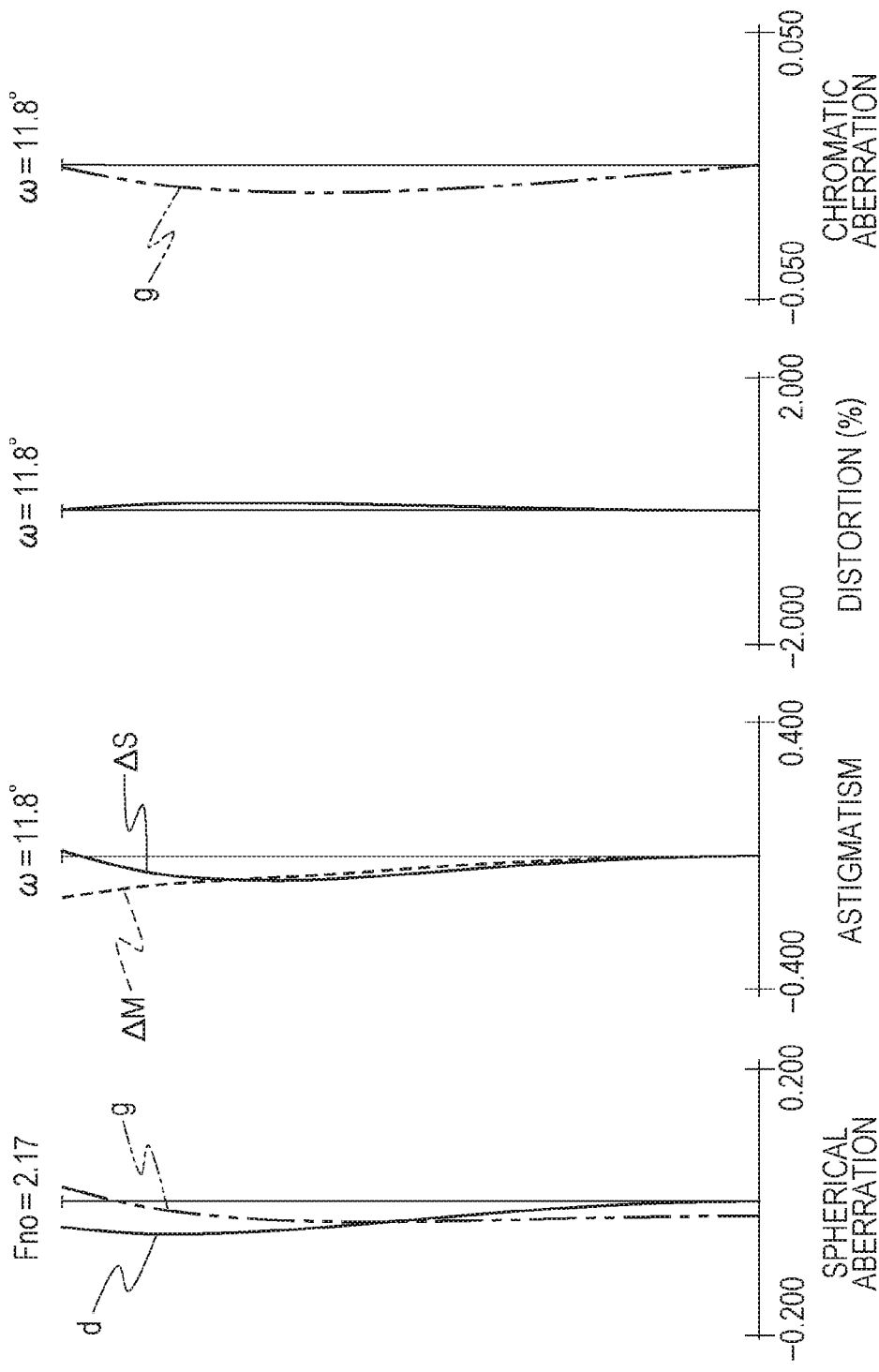

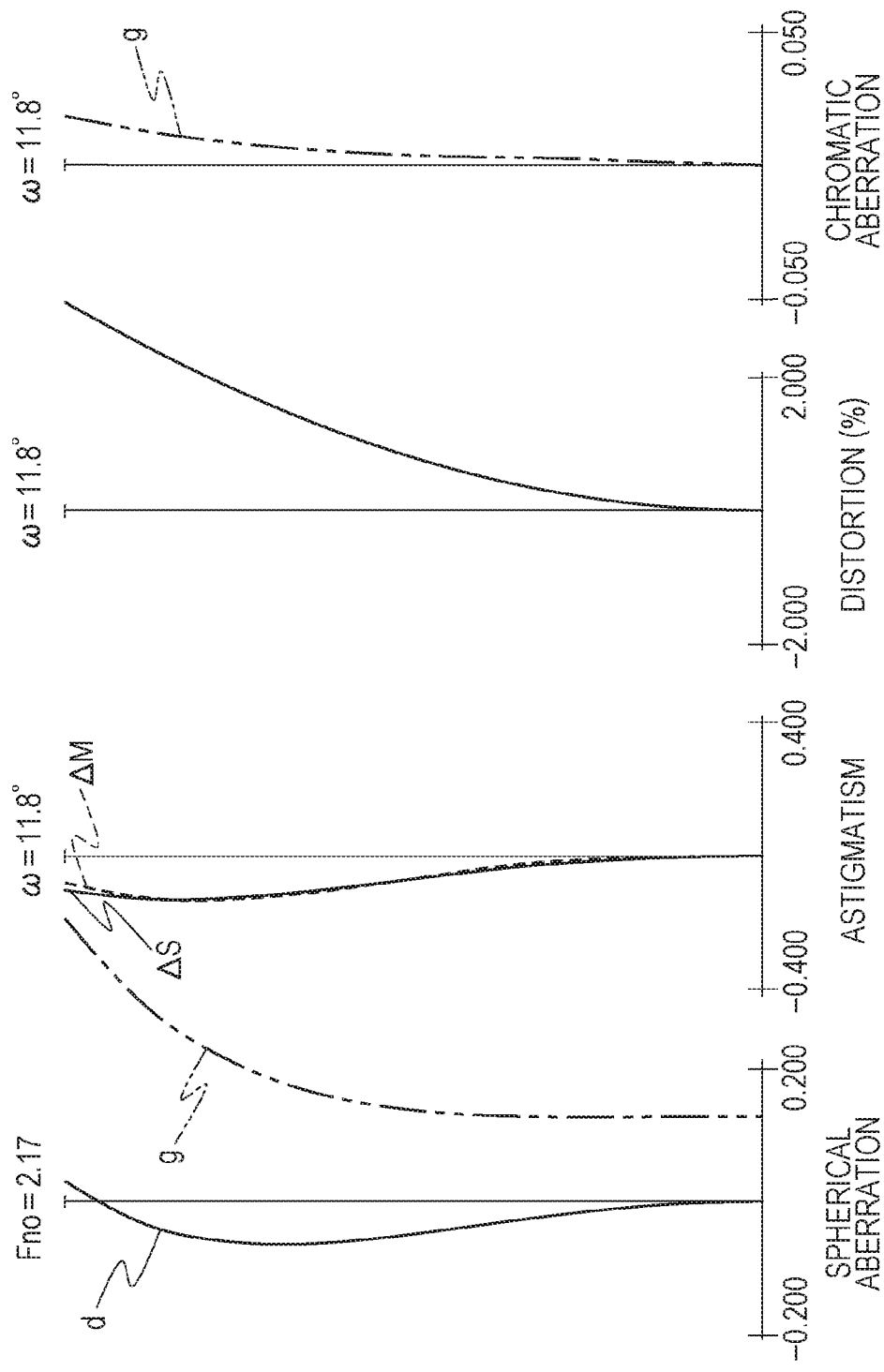

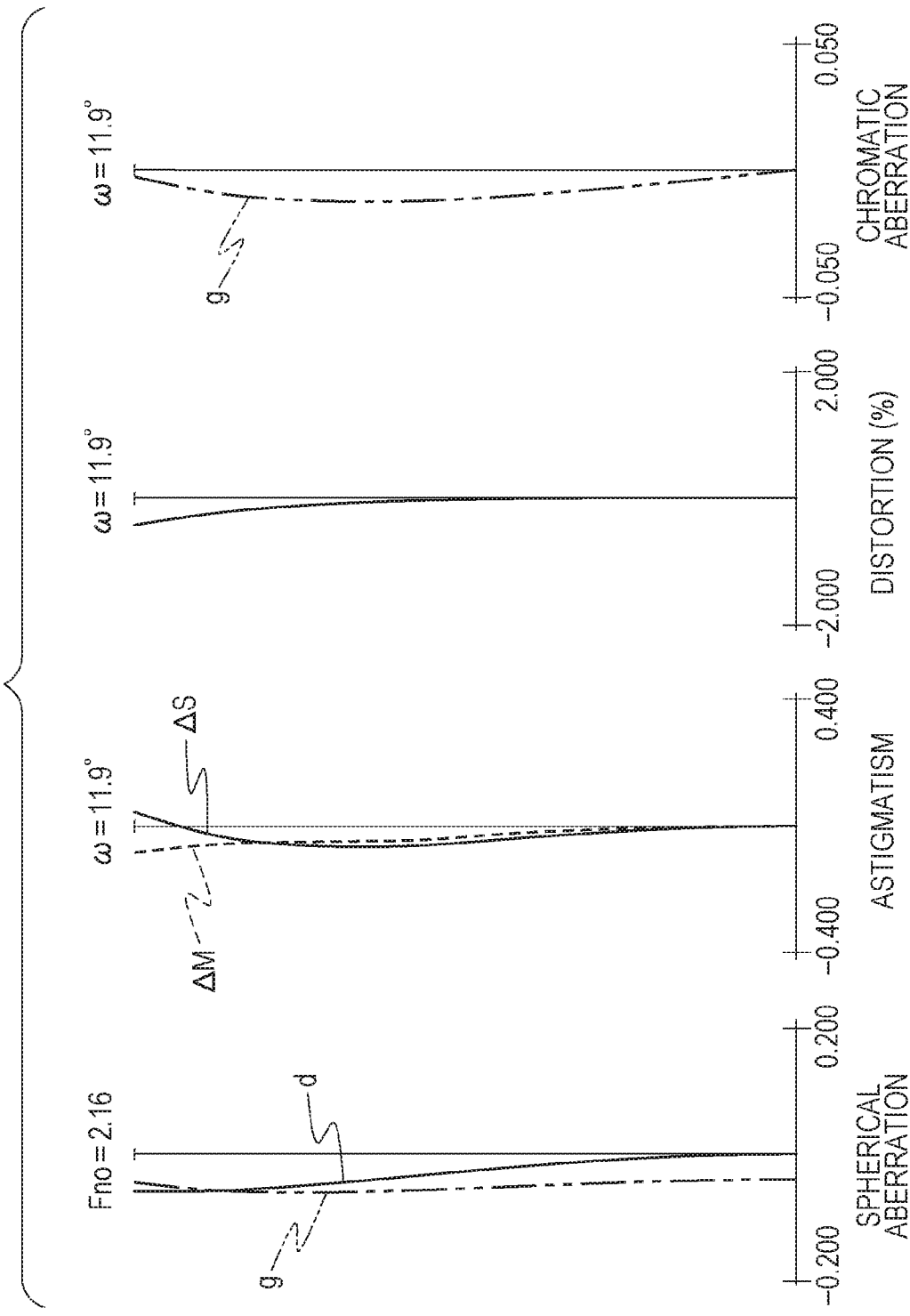

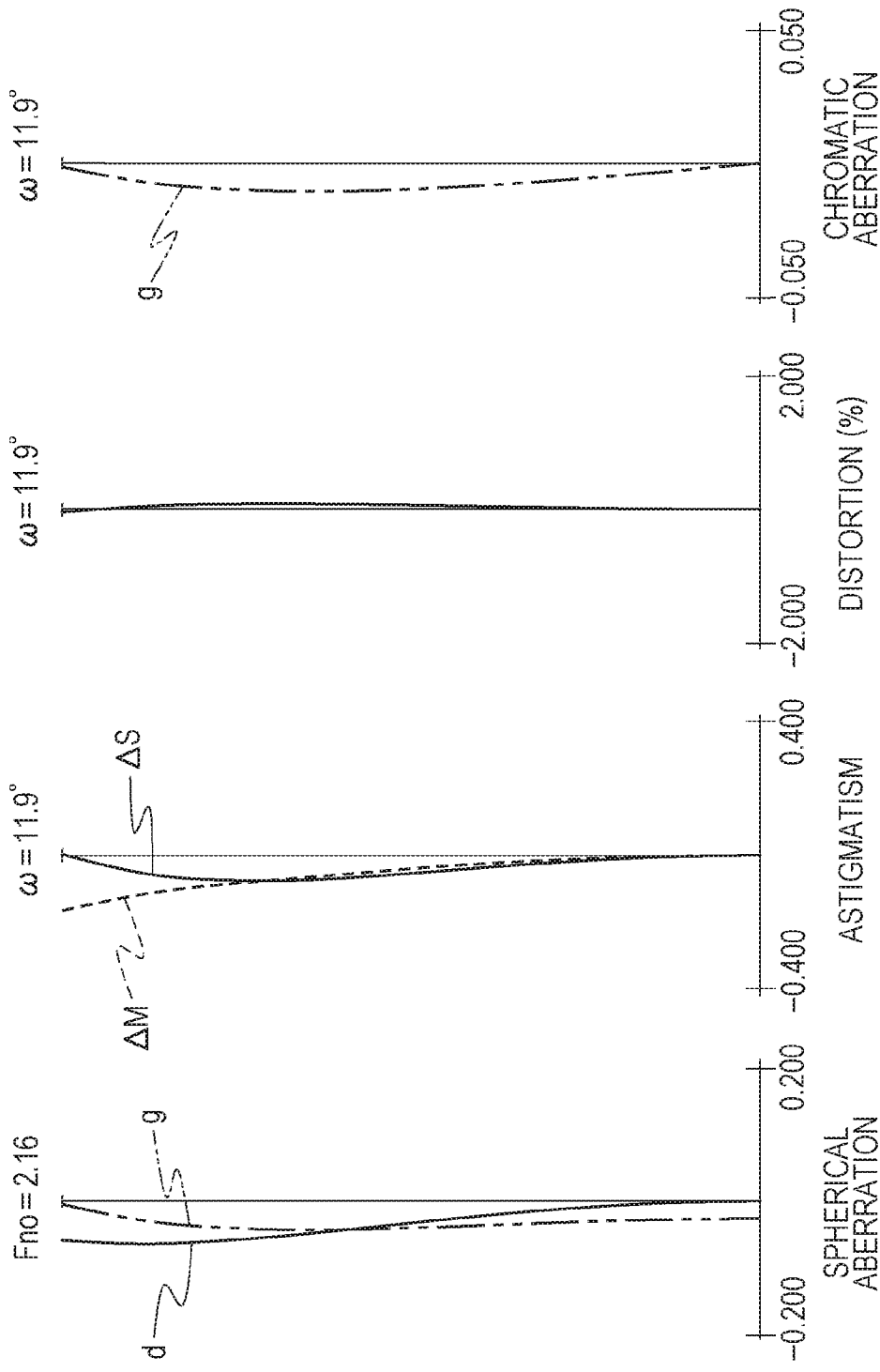

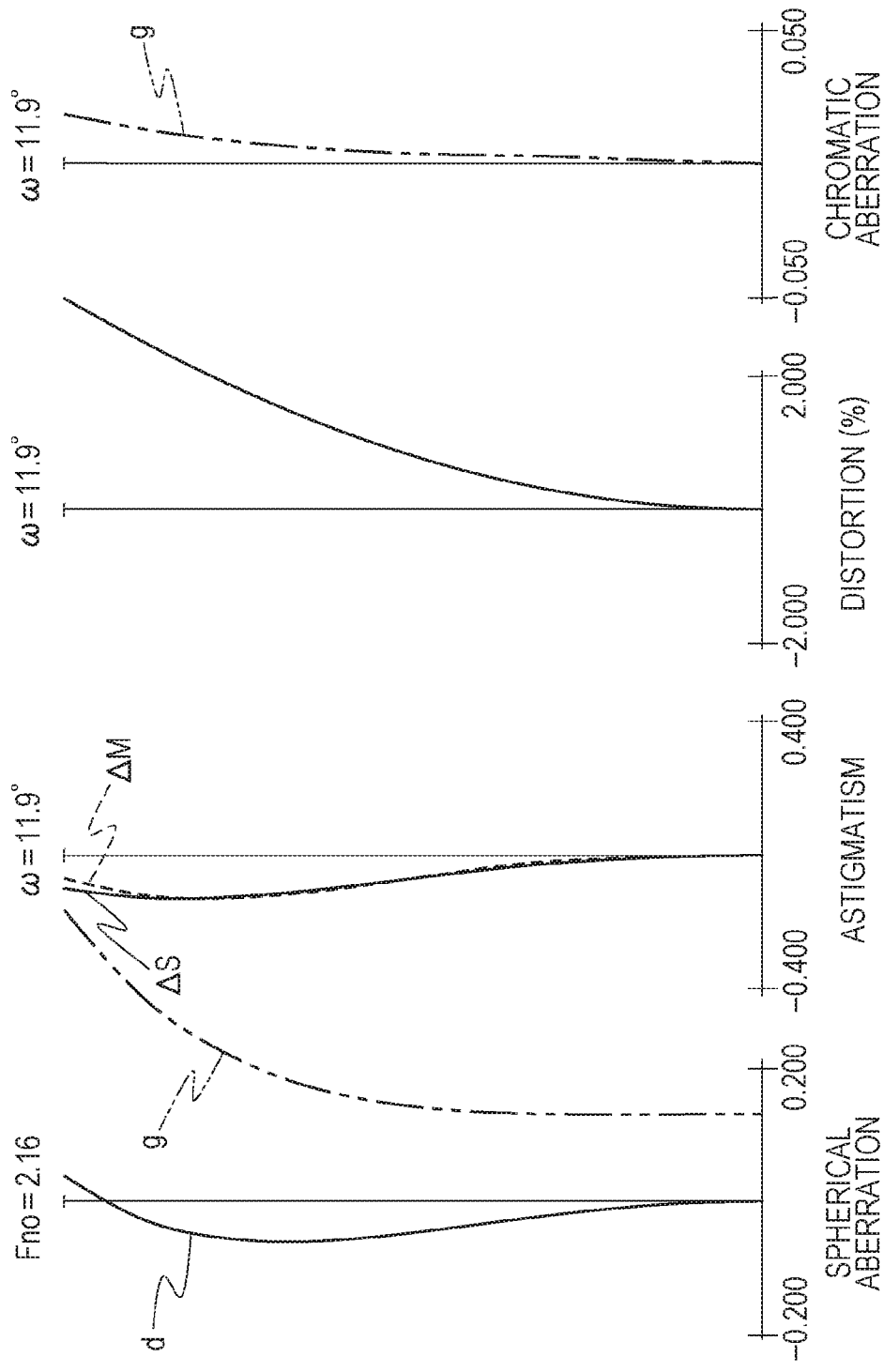

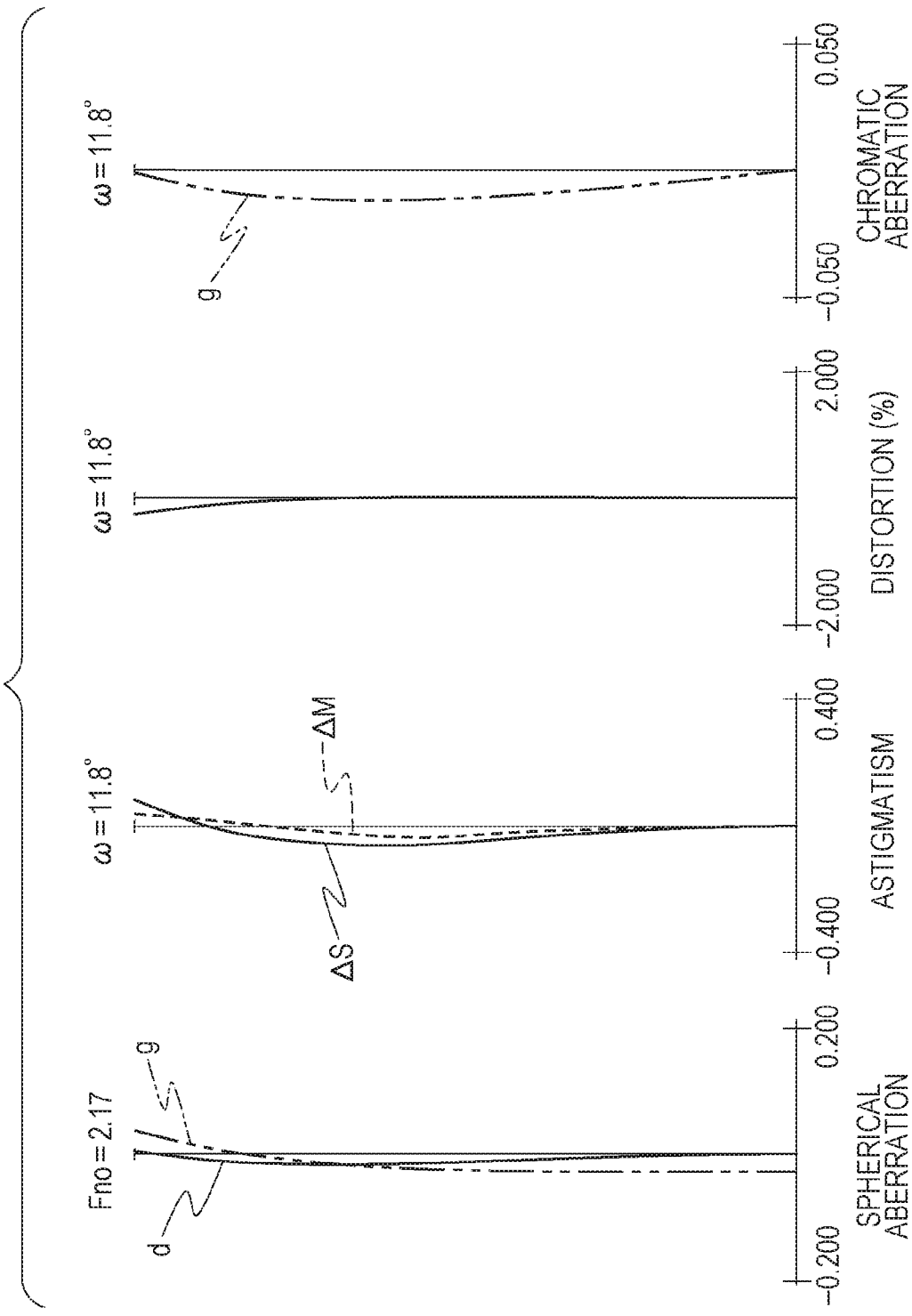

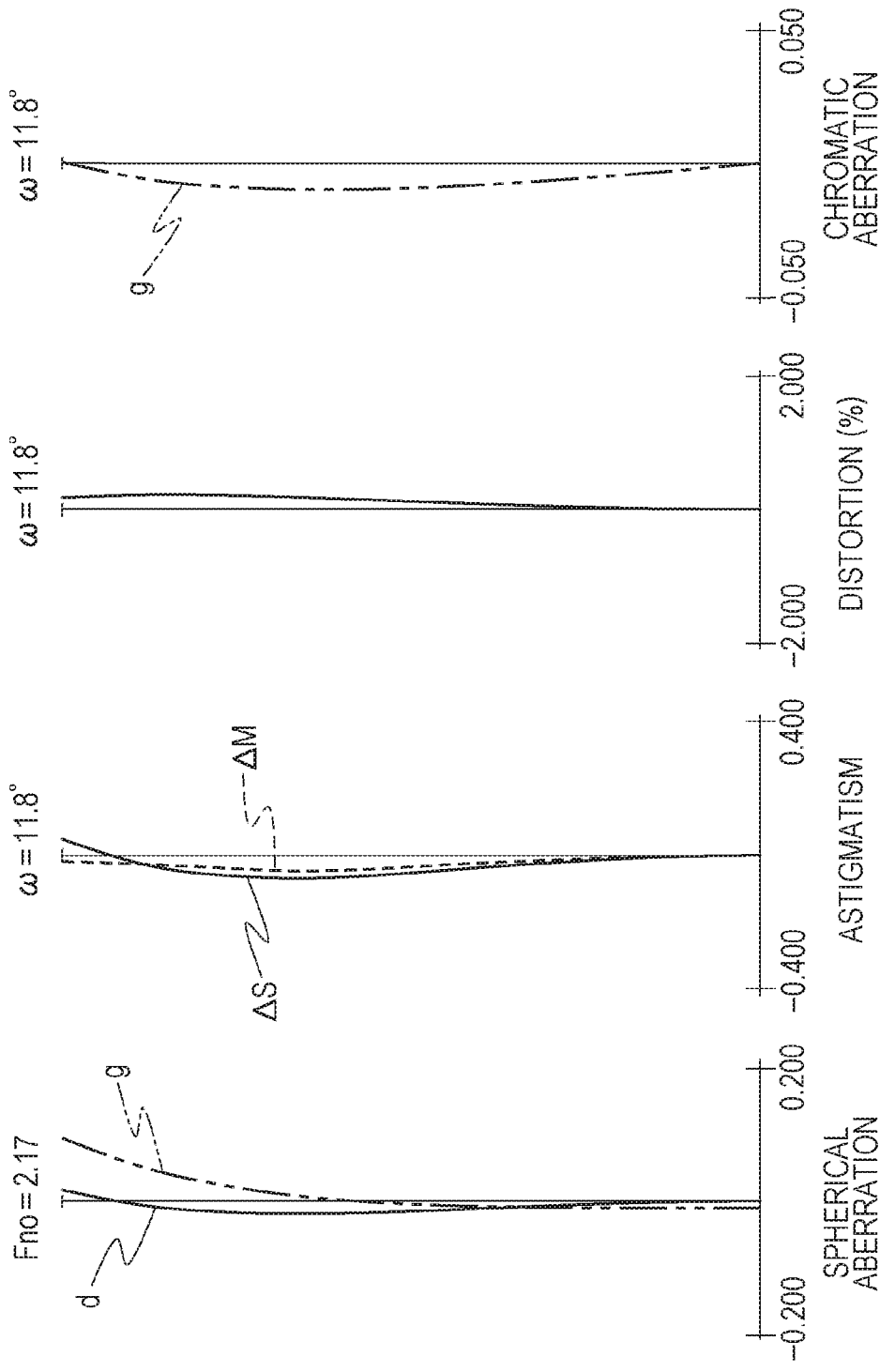

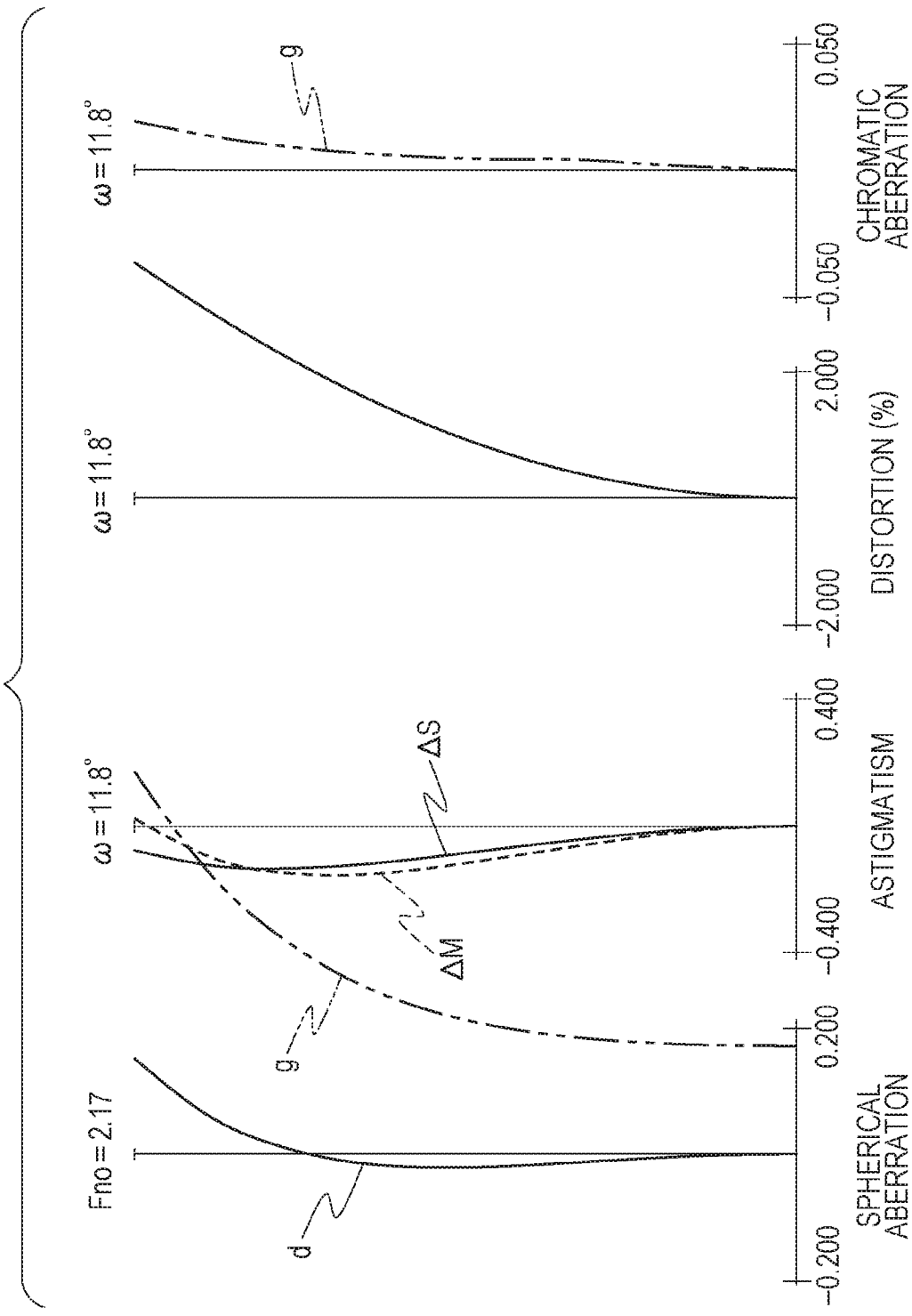

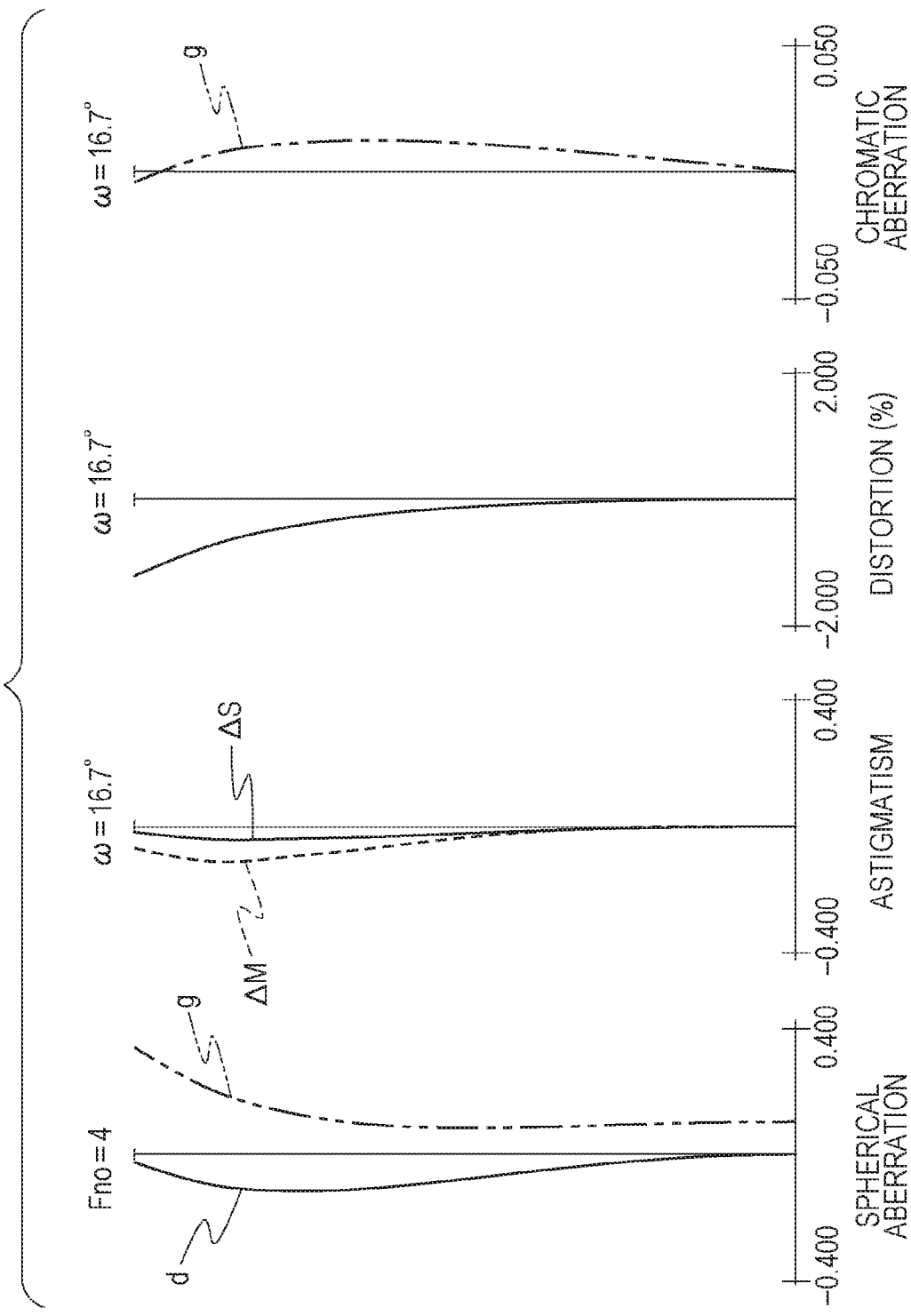

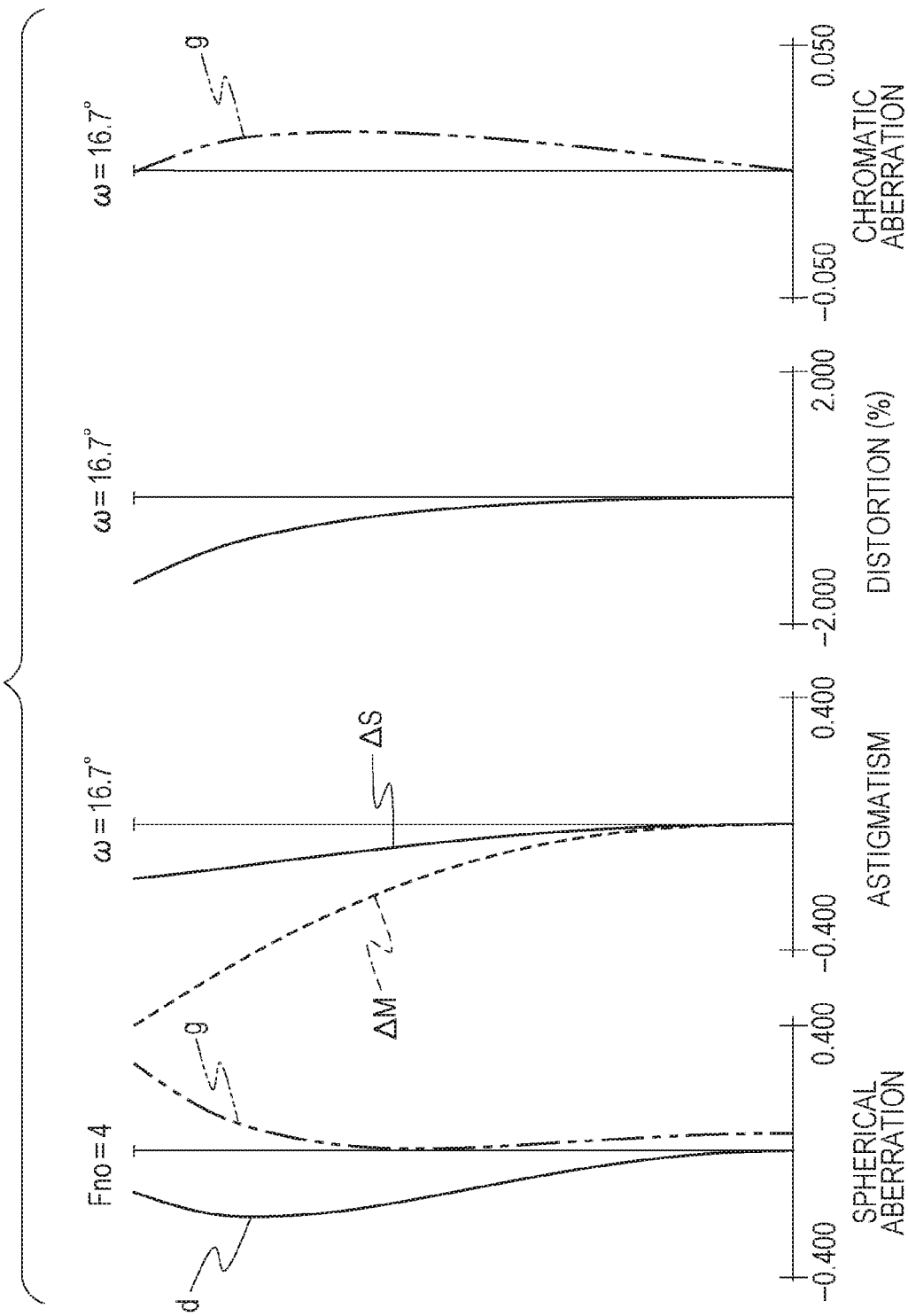

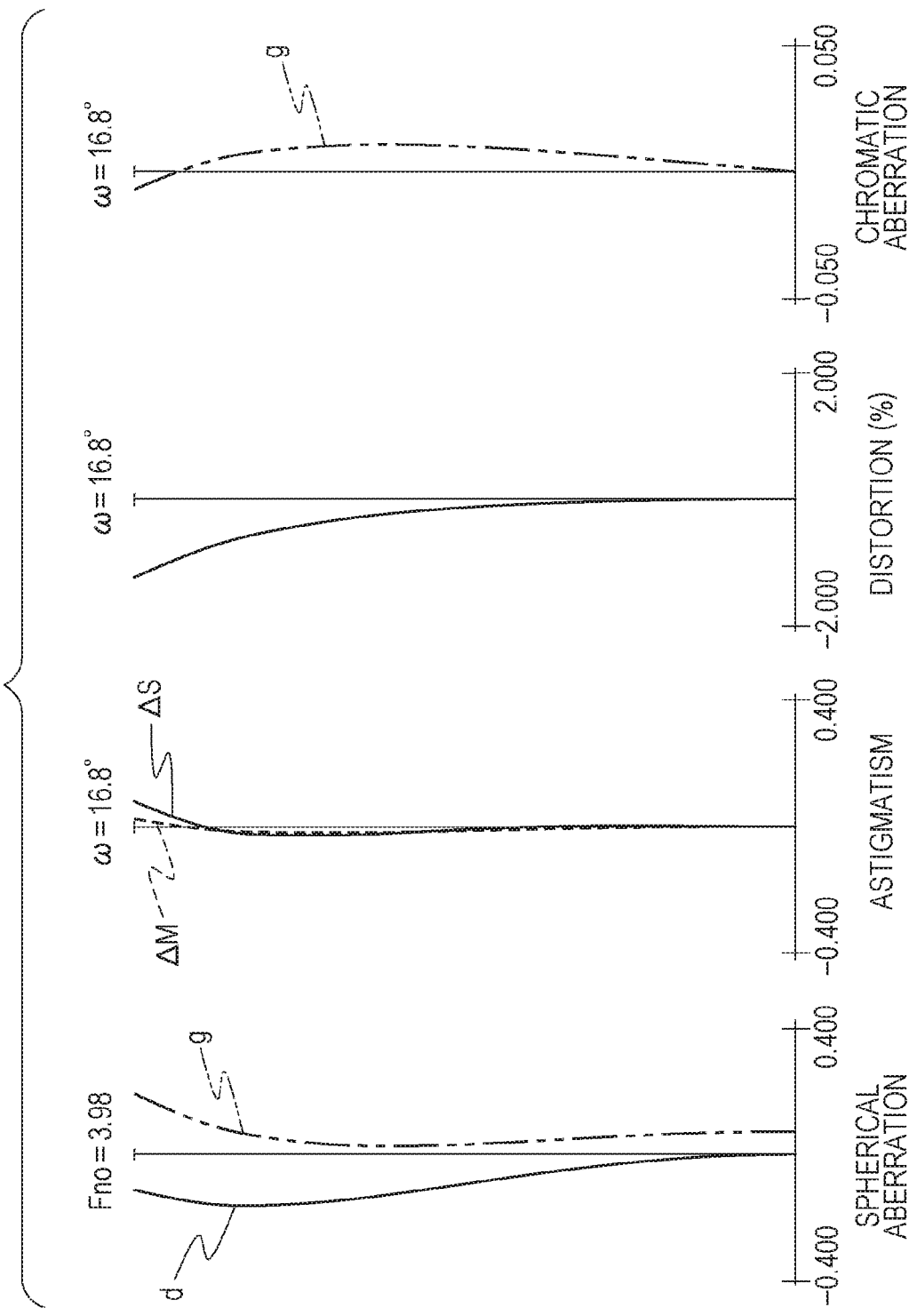

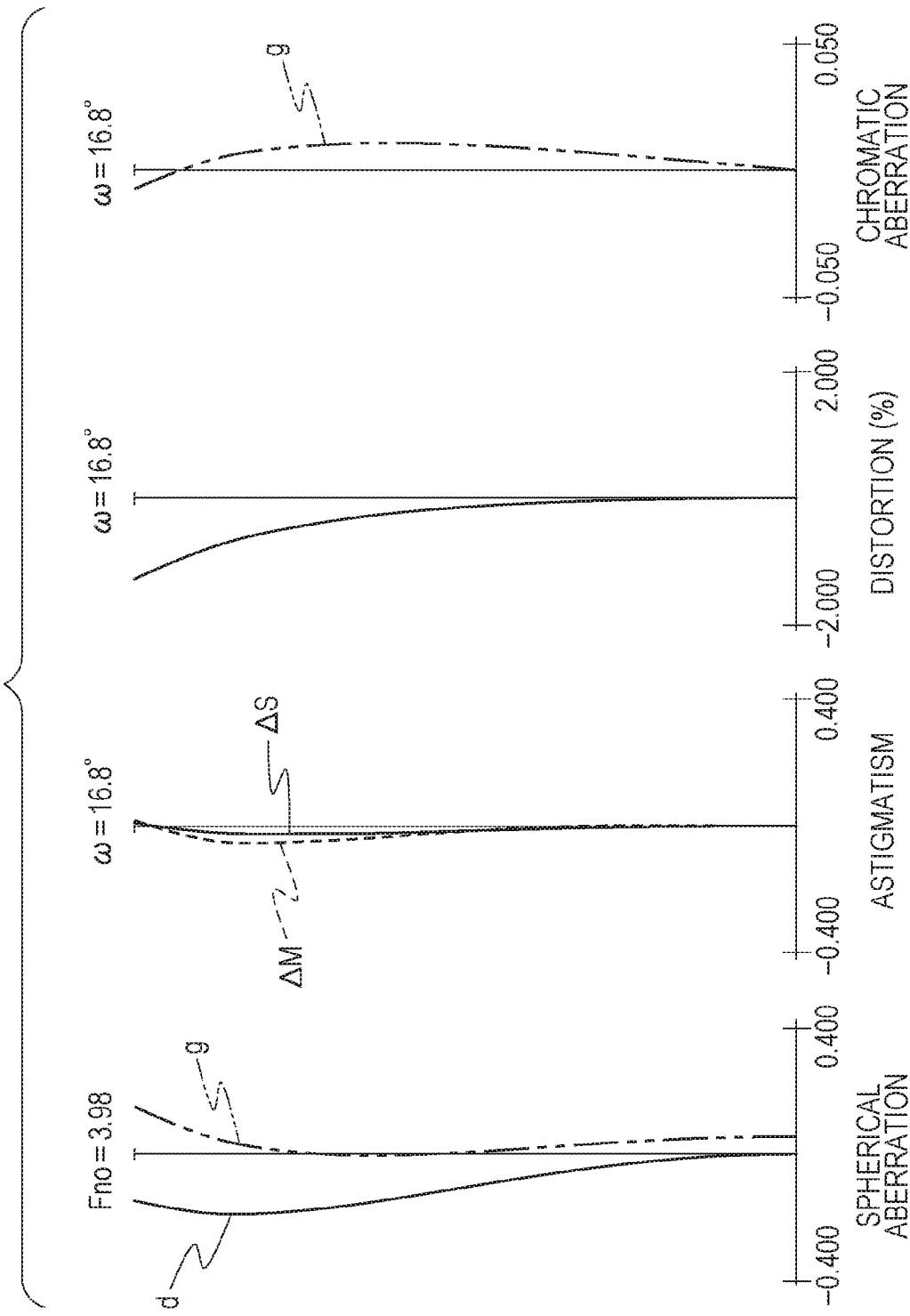

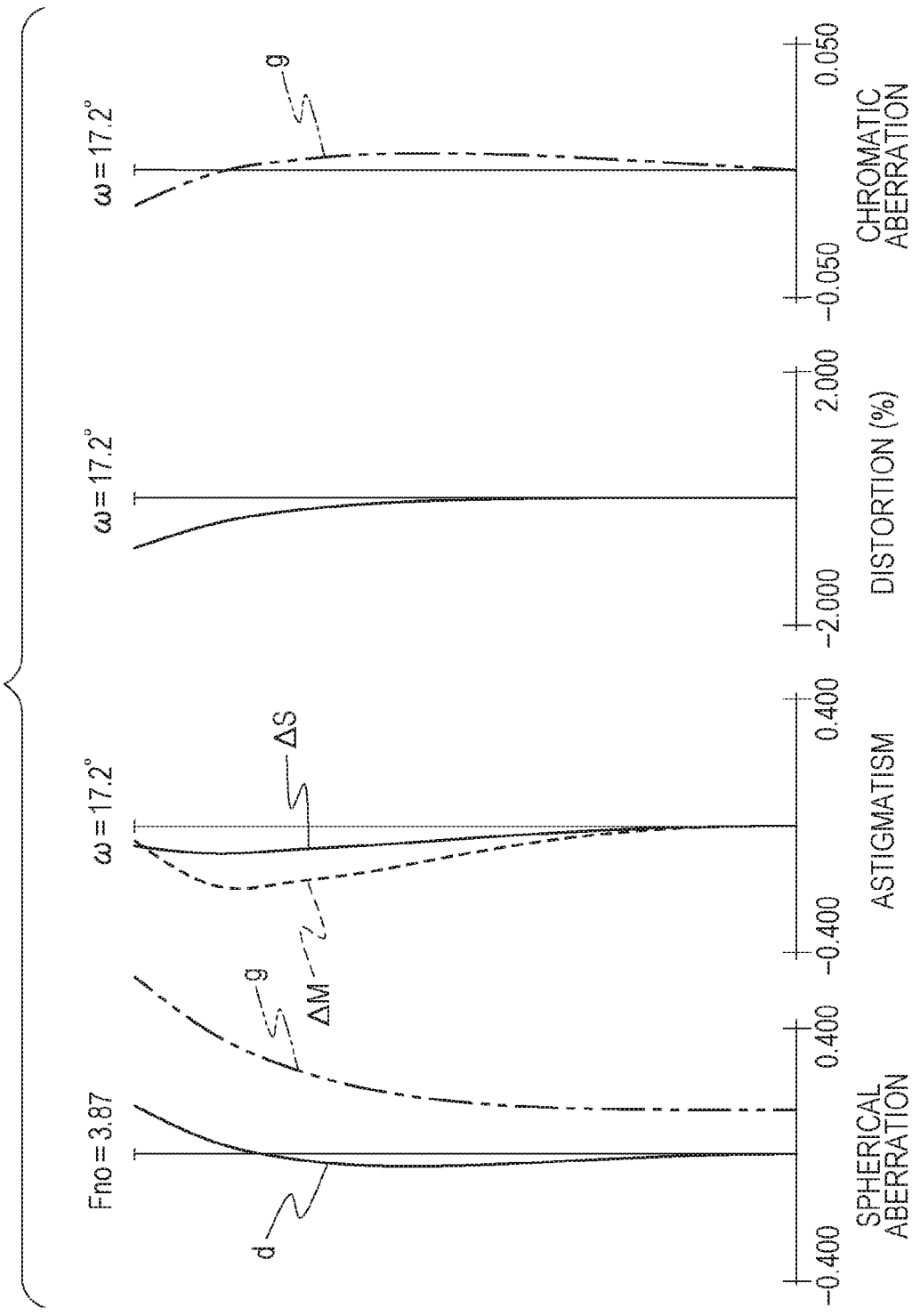

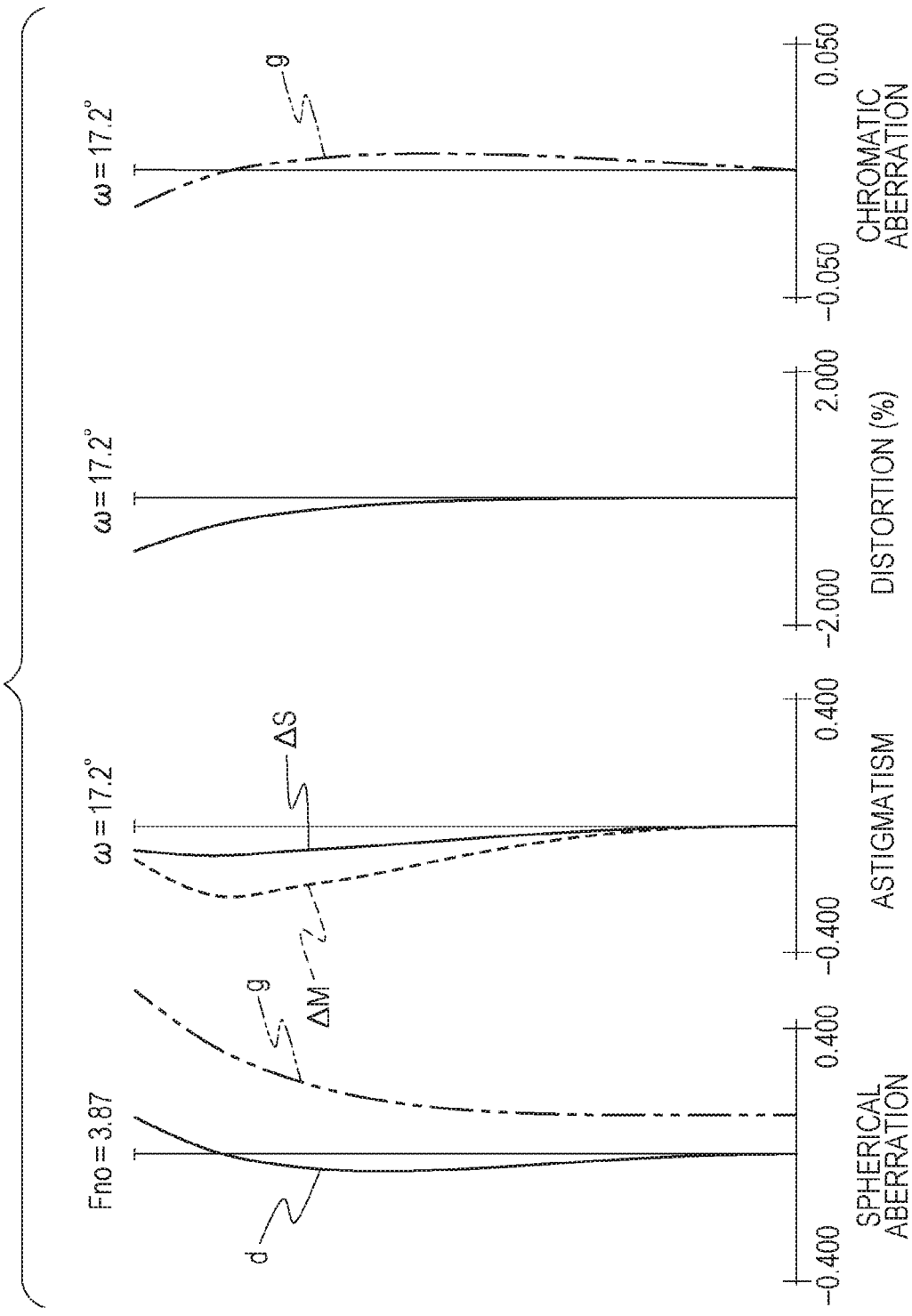

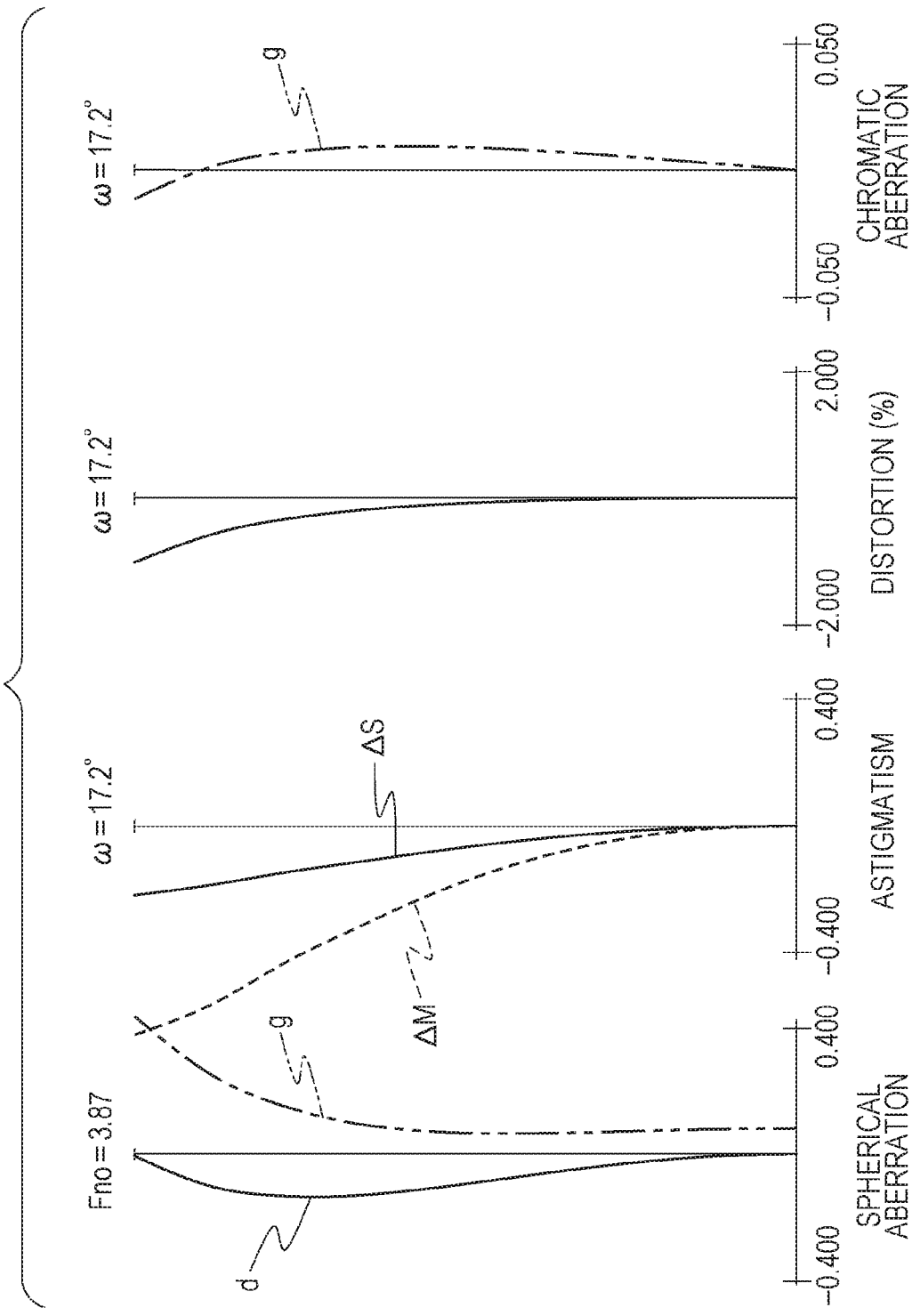

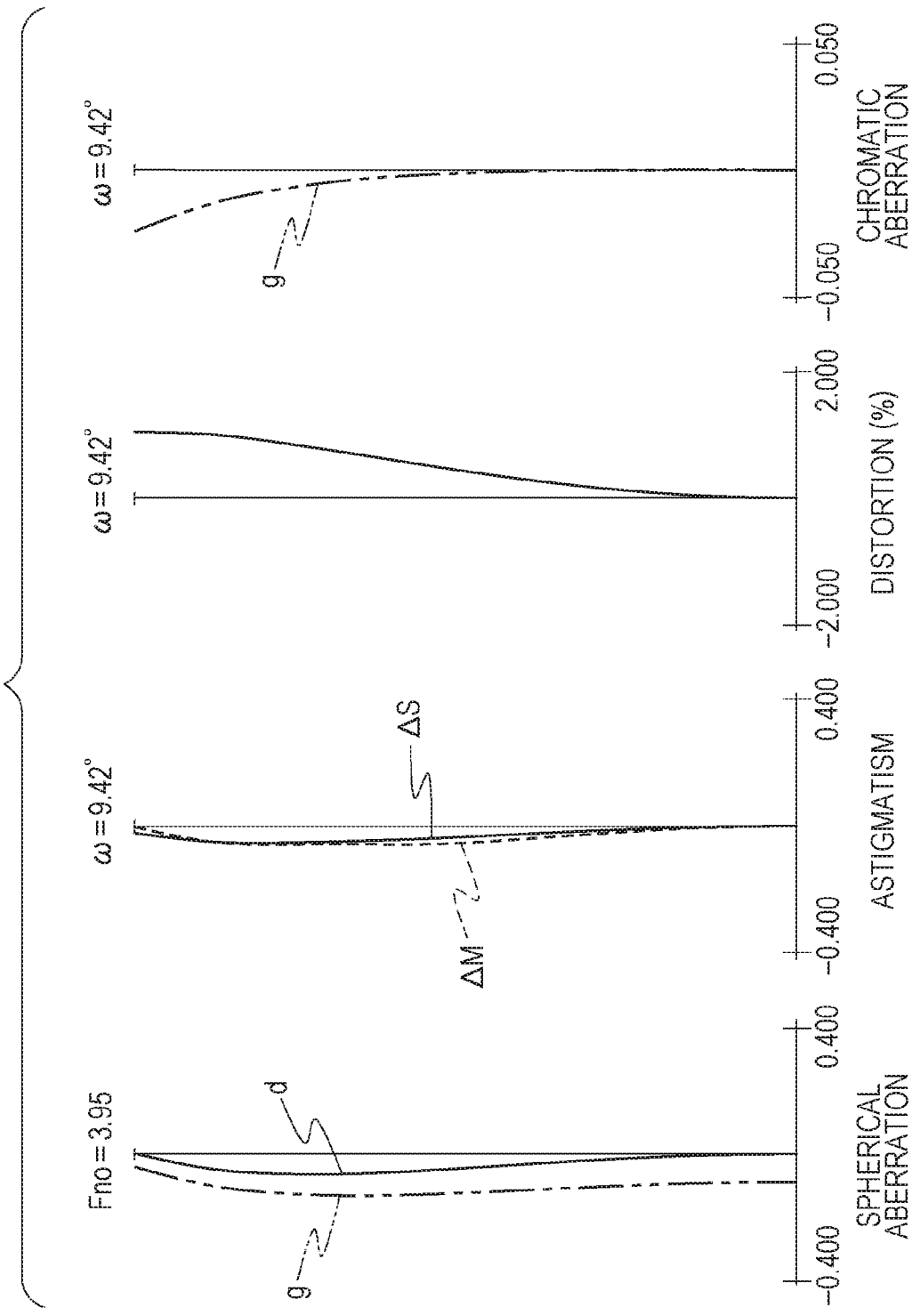

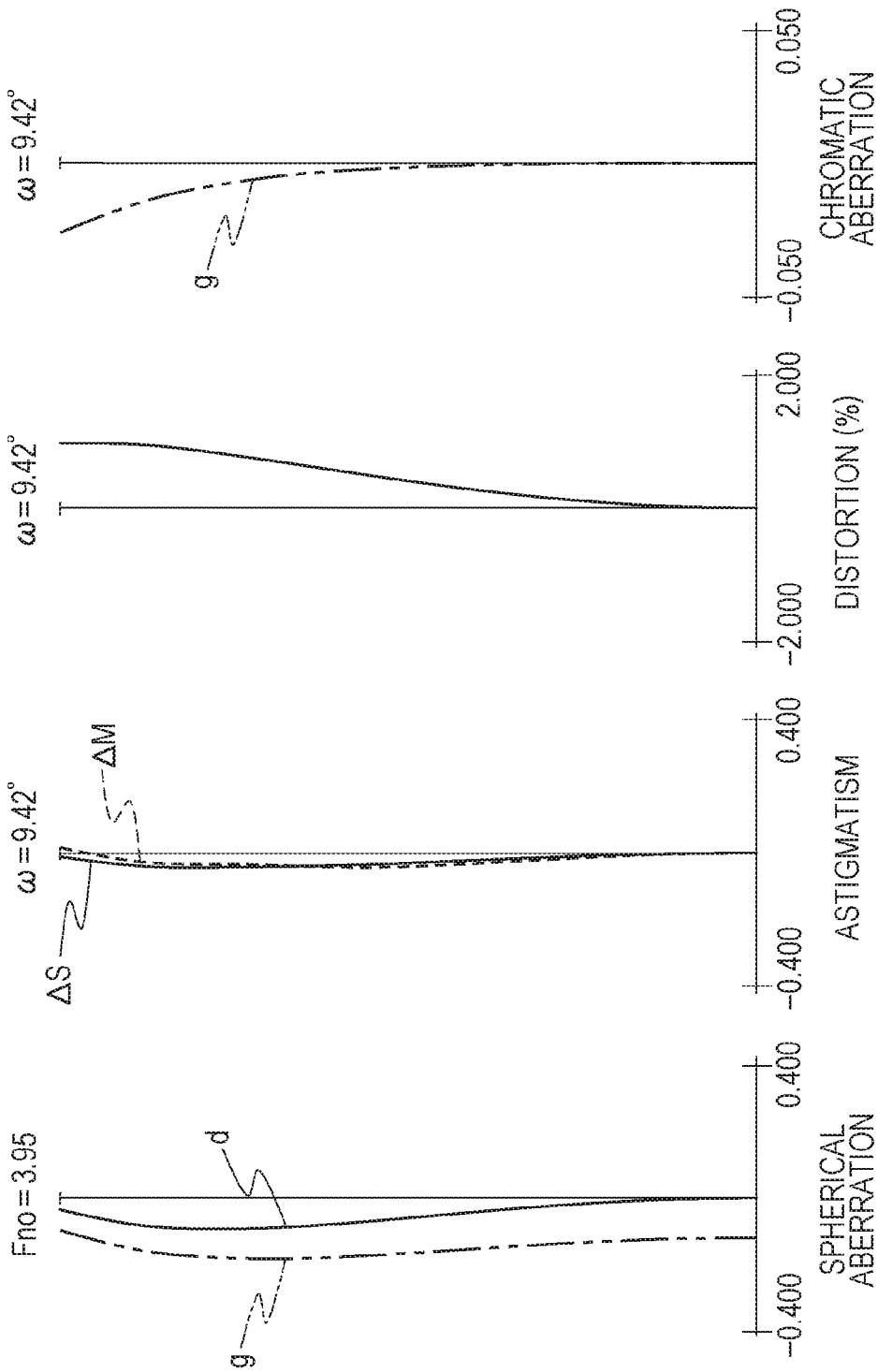

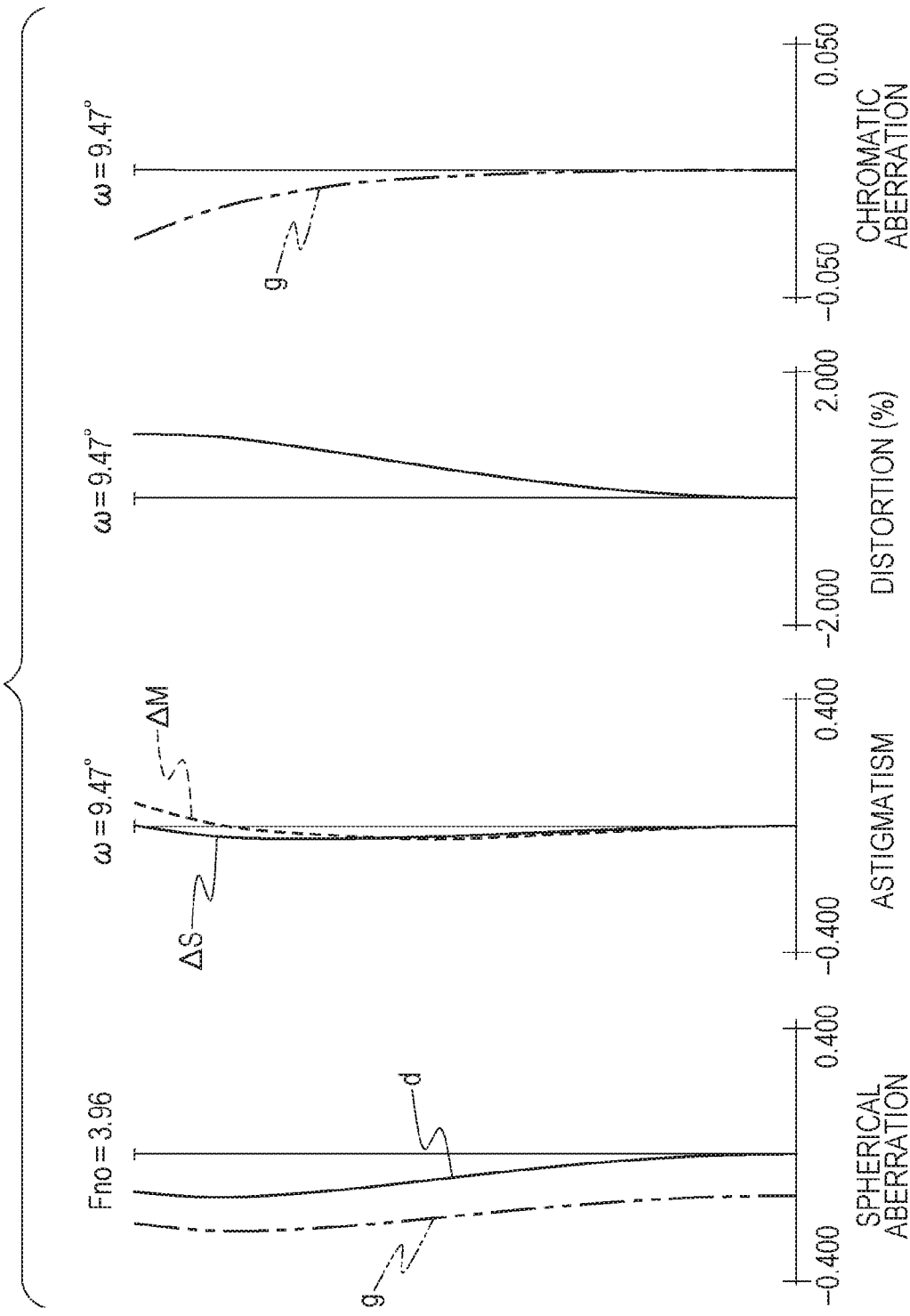

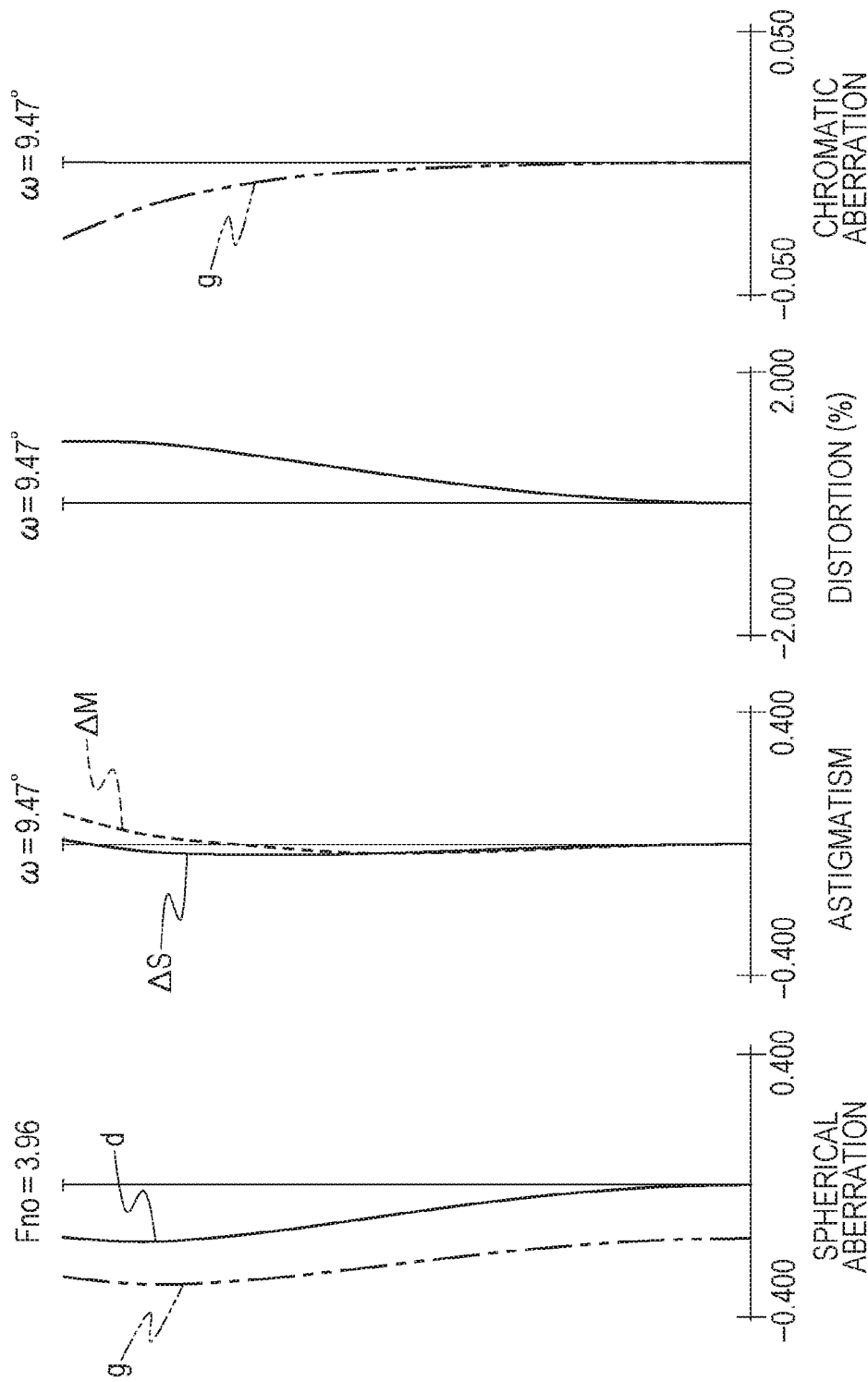

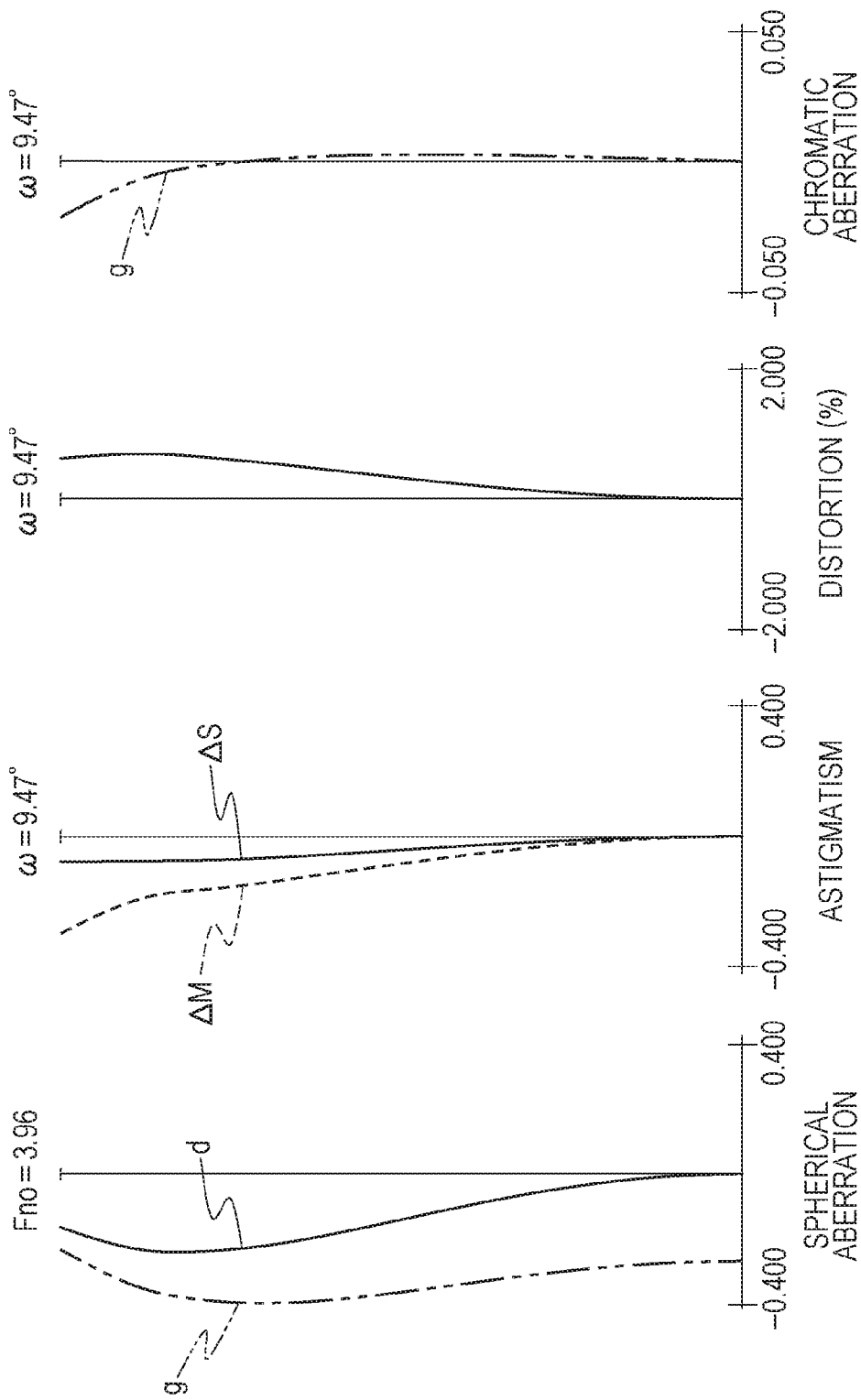

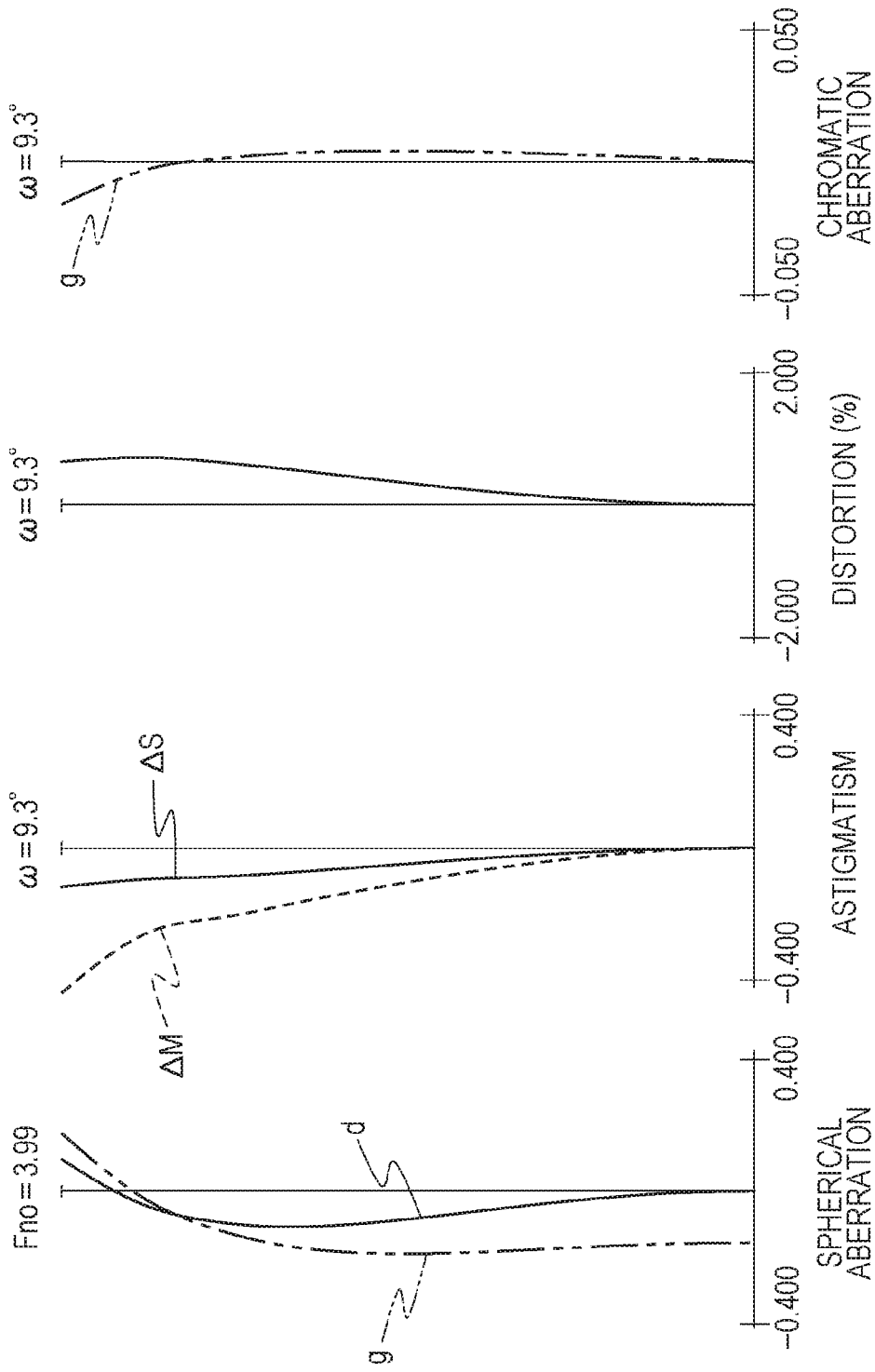

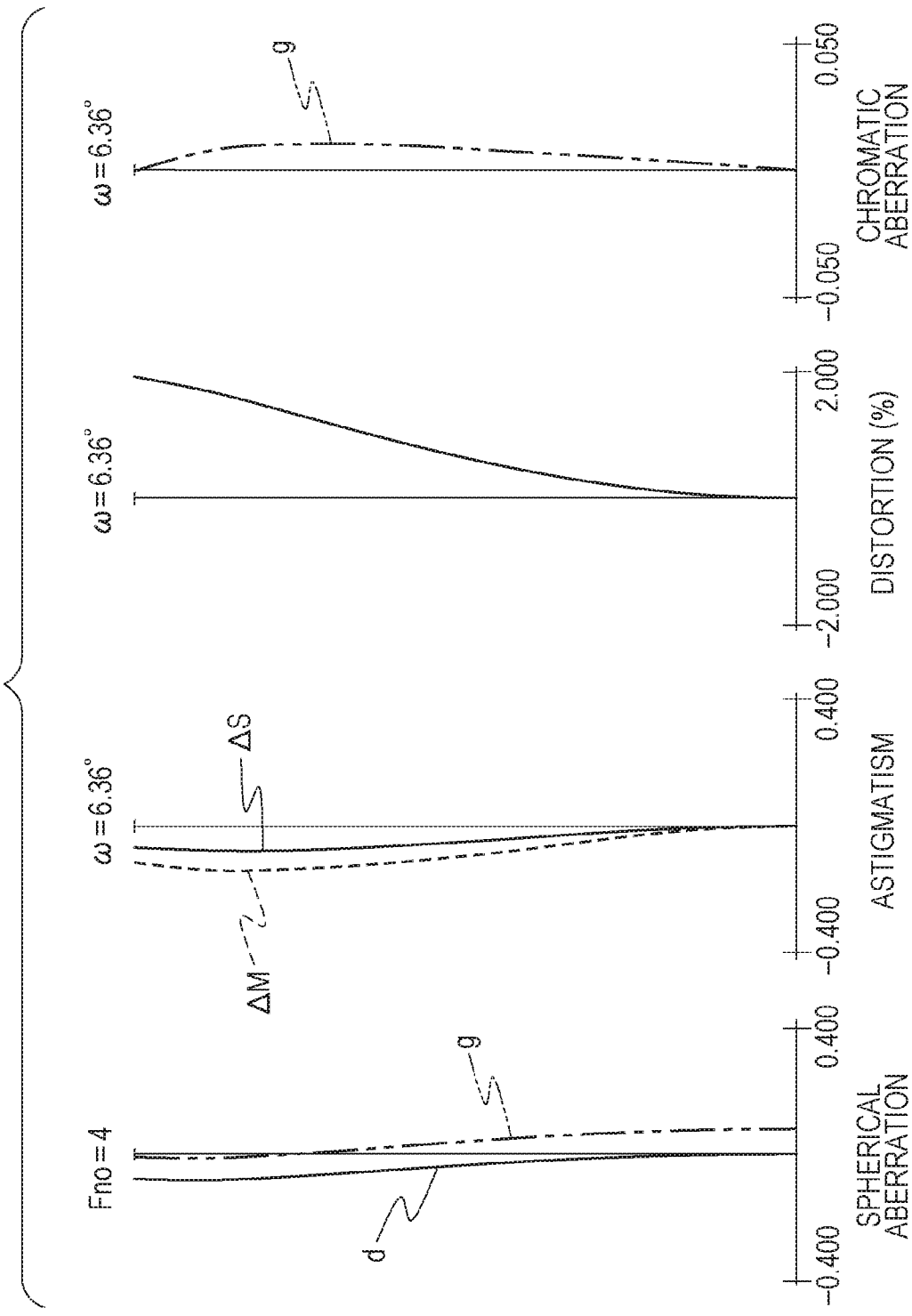

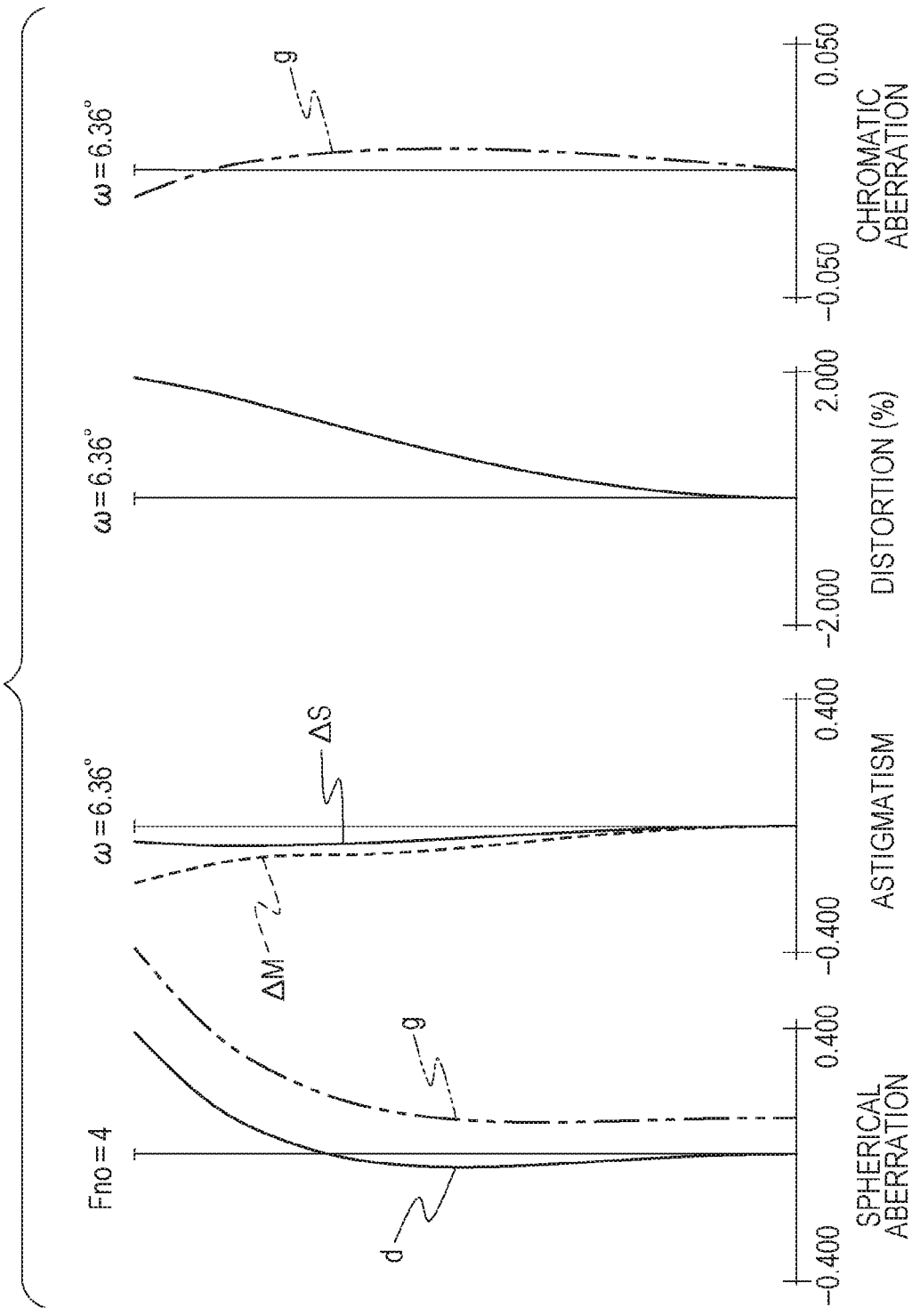

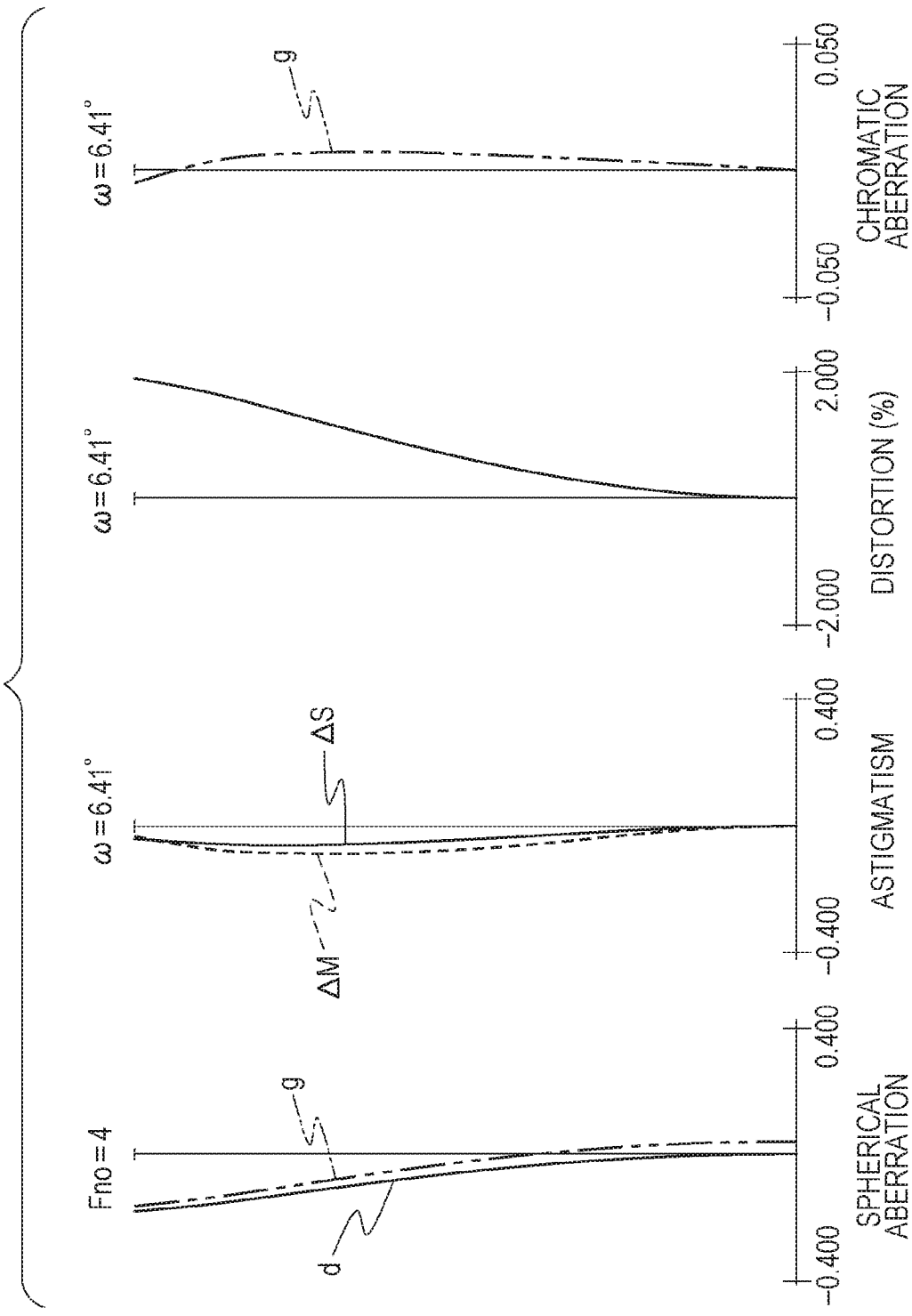

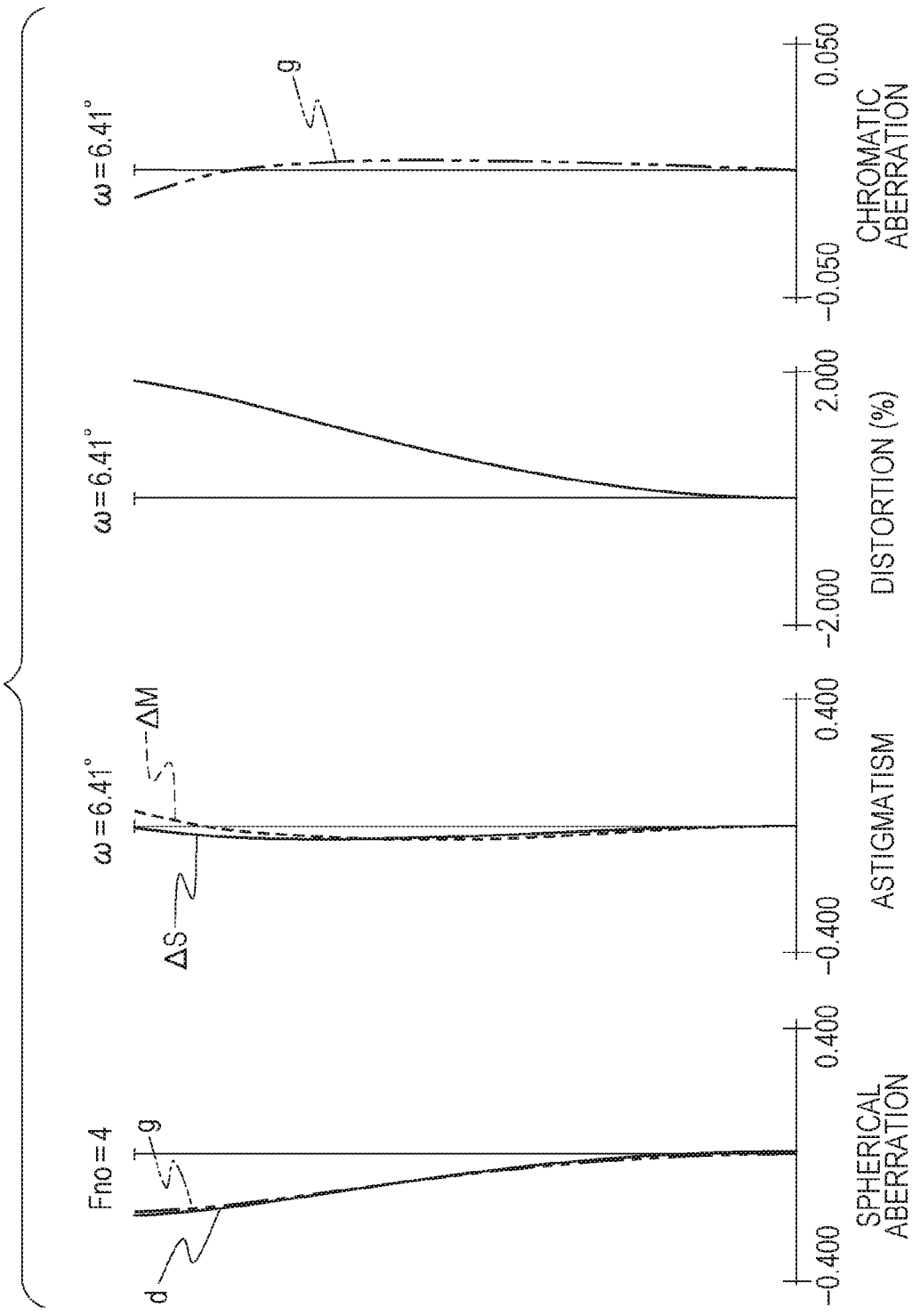

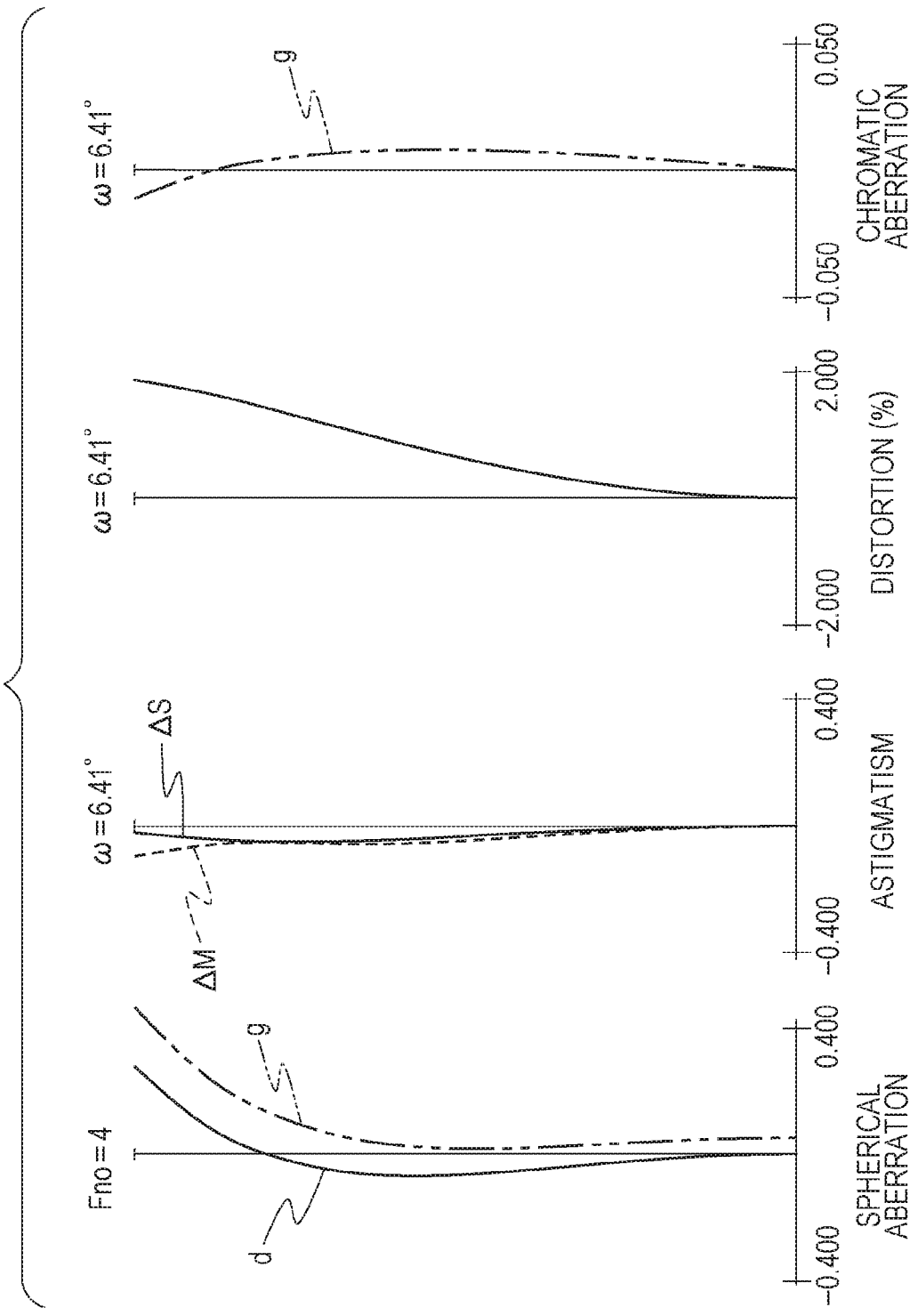

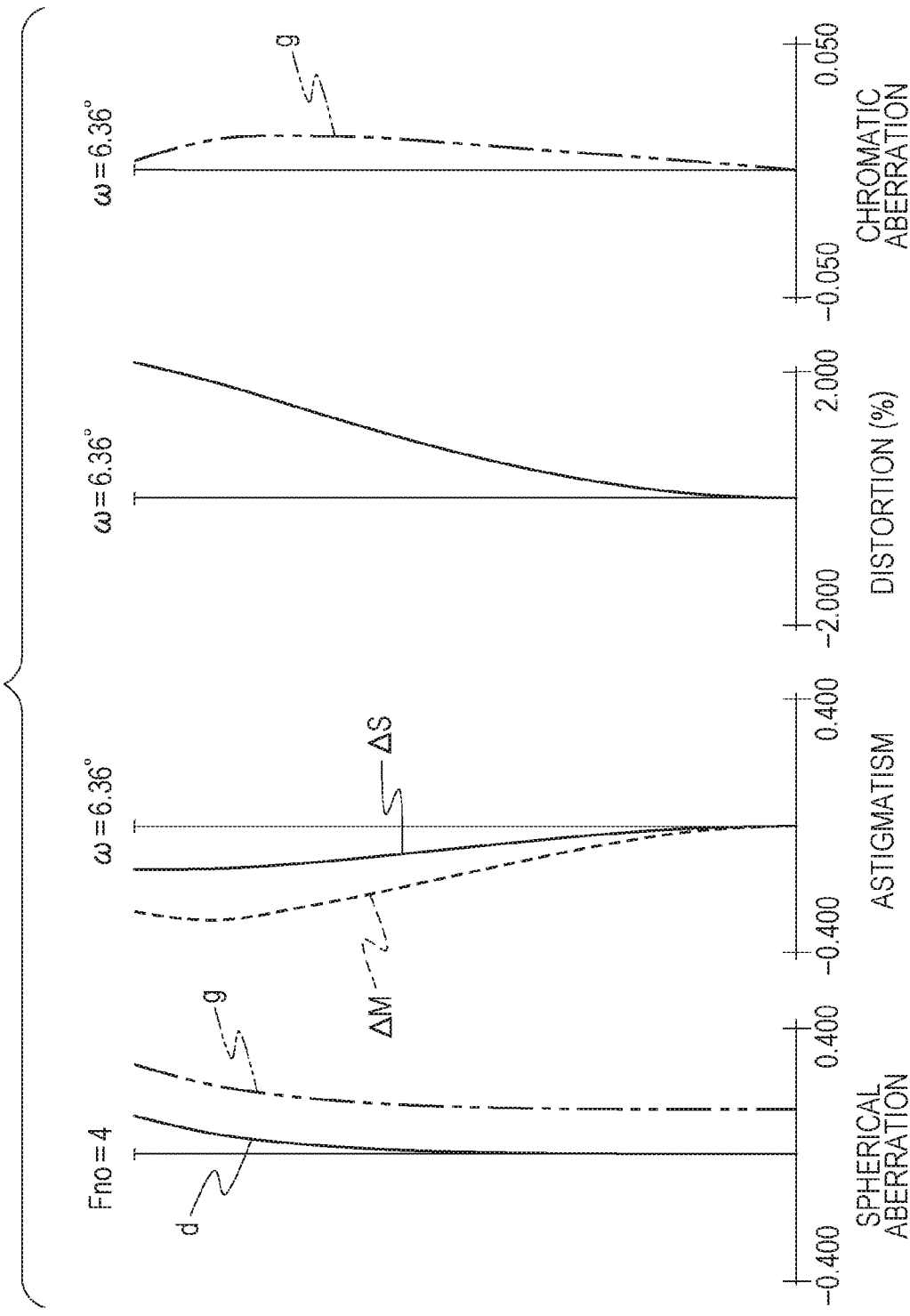

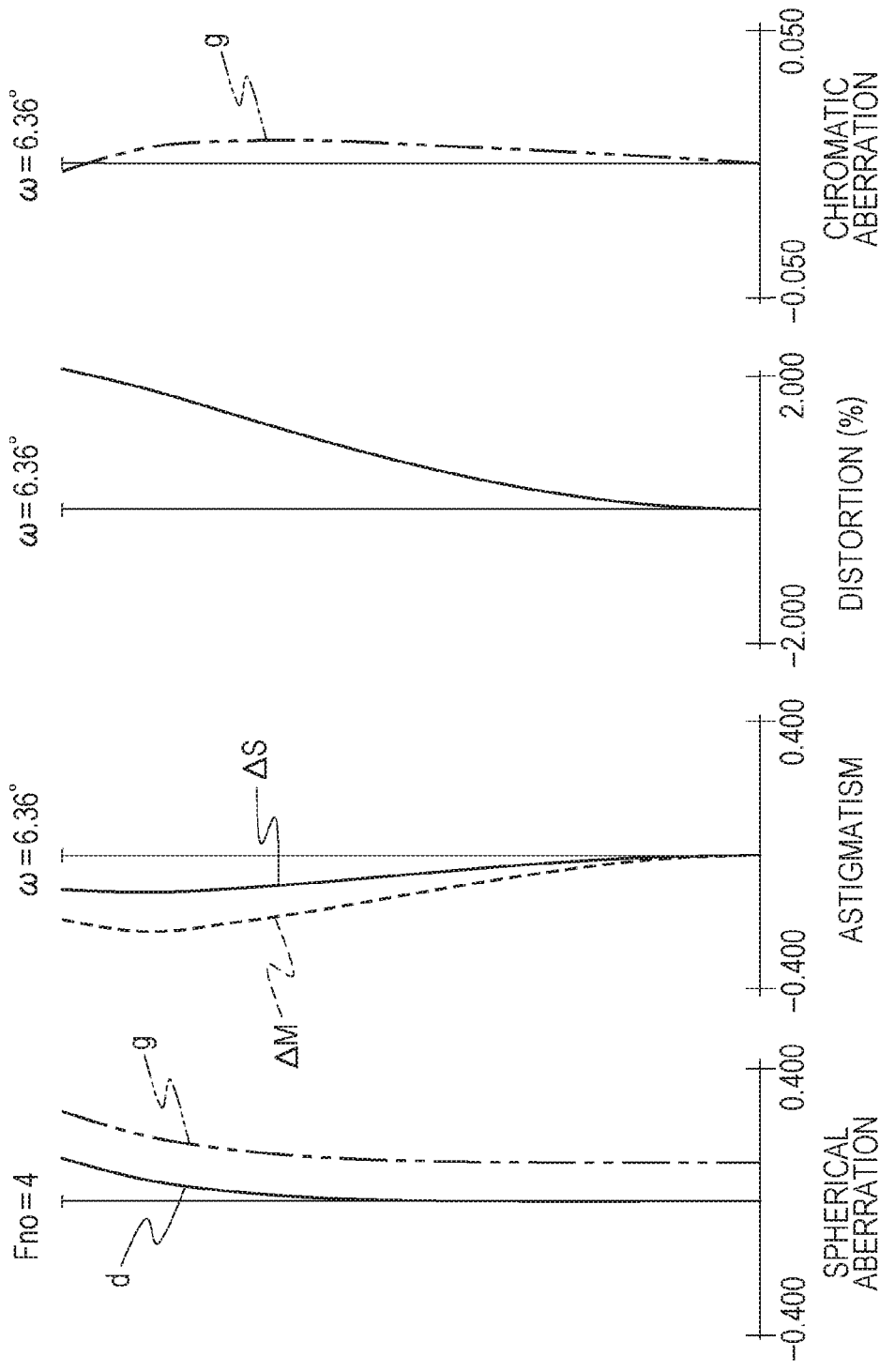

OPTICAL SYSTEM, OPTICAL APPARATUS, AND IMAGE PICKUP APPARATUS

BACKGROUND

Field of the Disclosure

The present disclosure relates to an optical system, an optical apparatus, and an image pickup apparatus.

Description of the Related Art

Conventionally, an aberration-variable optical system that changes the depiction property by continuously changing the amount of aberration generated is known. For example, a soft focus lens that changes the depiction property by generating uniform flare from the center to the periphery of the screen by using spherical aberration is known.

In an optical system of the two-unit configuration disclosed in Japanese Patent Laid-Open No. 10-68879, the distance between the first lens unit and the second lens unit is adjusted in order to change the spherical aberration.

In an optical system of the three-unit configuration disclosed in Japanese Patent Laid-Open No. 2002-318347, the third lens unit has a positive lens and a negative lens, and the distance between the positive lens and the negative lens is adjusted in order to change the spherical aberration.

However, in the optical system disclosed in Japanese Patent Laid-Open No. 10-68879, since the second lens unit has a configuration including only a negative single lens, a change in the focal length of the entire system, or a change in curvature of field or distortion aberration occurs. In the optical system disclosed in Japanese Patent Laid-Open No. 2002-318347, variation of spherical aberration and off-axis coma aberration becomes large when focusing on a near object. In the optical system disclosed in Japanese Patent Laid-Open No. 2002-318347, when the aberration varying action and the focusing operation are performed, the three lens units move, and the configuration becomes complicated.

SUMMARY

The present disclosure provides an optical system, an optical apparatus, and an image pickup apparatus that can change the aberration while suppressing aberration variation due to the focusing operation from an infinite object to a near object with a simple configuration.

In an aspect of the present invention, an optical system includes a first focusing unit and a second focusing unit that move in different loci during focusing. In a first arrangement state, the first focusing unit and the second focusing unit are so arranged to generate a first aberration while maintaining an in-focus state at a predetermined object distance, and in a second arrangement state, the first focusing unit and the second focusing unit are so arranged to generate a second aberration different from the first aberration while maintaining the in-focus state at the predetermined object distance.

Further features of the present invention will become apparent from the following description of exemplary embodiments with reference to the attached drawings.

BRIEF DESCRIPTION OF THE DRAWINGS

FIGS. 2A to 2C are aberration diagrams of the optical system in Mode 1 of Embodiment 1.

FIGS. 3A to 3C are aberration diagrams of the optical system in Mode 2 of Embodiment 1.

FIGS. 4A to 4C are aberration diagrams of the optical system in Mode 3 of Embodiment 1.

FIGS. 6A to 6C are aberration diagrams of the optical system in Mode 1 of Embodiment 2.

FIGS. 7A to 7C are aberration diagrams of the optical system in Mode 2 of Embodiment 2.

FIGS. 8A to 8C are aberration diagrams of the optical system in Mode 3 of Embodiment 2.

FIGS. 10A to 10C are aberration diagrams of the optical system in Mode 1 of Embodiment 3.

FIGS. 11A to 11C are aberration diagrams of the optical system in Mode 2 of Embodiment 3.

FIGS. 12A to 12C are aberration diagrams of the optical system in Mode 3 of Embodiment 3.

FIGS. 14A to 14C are aberration diagrams of the optical system at the wide-angle end in Mode 1 of Embodiment 4.

FIGS. 15A to 15C are aberration diagrams of the optical system at the wide-angle end in Mode 2 of Embodiment 4.

FIGS. 16A to 16C are aberration diagrams of the optical system at the wide-angle end in Mode 3 of Embodiment 4.

FIGS. 17A to 17C are aberration diagrams of the optical system at the middle zooming position in Mode 1 of Embodiment 4.

FIGS. 18A to 18C are aberration diagrams of the optical system at the middle zooming position in Mode 2 of Embodiment 4.

FIGS. 19A to 19C are aberration diagrams of the optical system at the middle zooming position in Mode 3 of Embodiment 4.

FIGS. 20A to 20C are aberration diagrams of the optical system at the telephoto end in Mode 1 of Embodiment 4.

FIGS. 21A to 21C are aberration diagrams of the optical system at the telephoto end in Mode 2 of Embodiment 4.

FIGS. 22A to 22C are aberration diagrams of the optical system at the telephoto end in Mode 3 of Embodiment 4.

DESCRIPTION OF THE EMBODIMENTS

Figure 1:
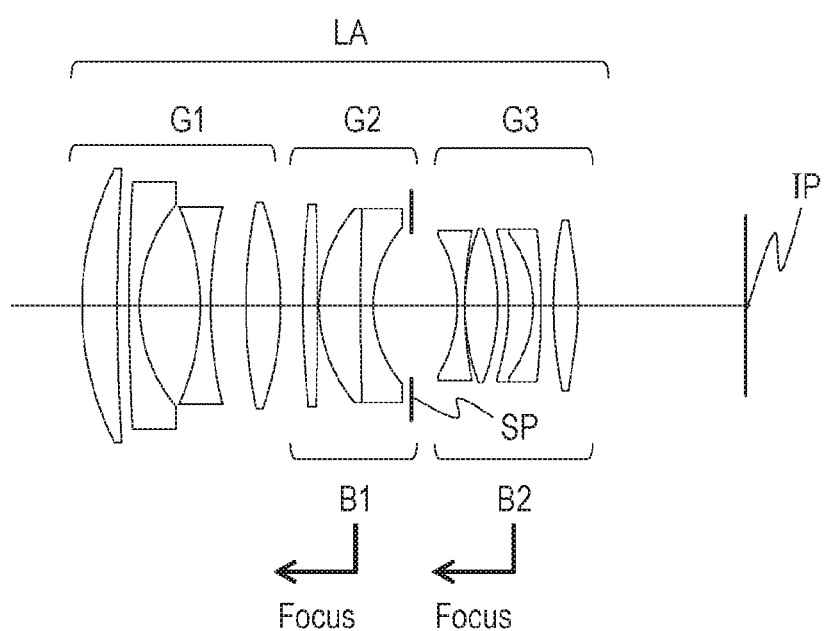
FIG. 1 is a sectional view of an optical system when focusing on an infinite object in Mode 1 of Embodiment 1.

Embodiments of the present invention will now be described in detail with reference to the drawings. In the drawings, the same members will be denoted by the same reference numerals, and redundant description will be omitted.

The optical system of the present disclosure has a lens unit (first focusing unit) B1 and a lens unit (second focusing unit) B2. In the optical system of the present disclosure, focusing from an infinite object to a near object is performed by moving the lens unit B1 and the lens unit B2 in different loci. The lens units are lens elements that integrally move when performing focusing, and may have one or more lenses.

The optical system of the present disclosure has a first arrangement state of the first and second lens units that satisfies the condition regarded as an in-focus state at a predetermined object distance and that generates a first aberration. The optical system of the present disclosure further has a second arrangement state of the first and second lens units that satisfies the above condition and that generates a second aberration different from the first aberration.

The condition regarded as an in-focus state at a predetermined object distance means that the focal position is within the position range in front of and behind the peak position of contrast (best focus) on the focal plane, that is, within the range (focal depth) within which blurring is permitted. When the F-number of the optical system is F and the diameter of the permissible circle of confusion is δ, the focal depth range is ±Fδ.

Although the aberration can be changed with one lens unit, the focal position changes, and when the focal position is corrected by the focusing operation, the angle of view (focal length) changes, and it becomes difficult to arbitrarily change the aberration at the time of shooting. In the present embodiment, when changing the aberration, it is possible to suppress changes in the angle of view (focal length) and the focal position by moving the two lens units in the optical system.

Although it is possible to change the aberration at an arbitrary object distance by moving a lens unit different from the lens unit moving upon focusing from an infinite object to a near object, since the mechanism becomes complicated, it is not desirable. In the present embodiment, aberration at an arbitrary object distance can be changed with a simple configuration by adding a function of changing aberration to the lens unit moving upon focusing from an infinite object to a near object.

As described above, by appropriately setting the configuration of the optical system, it is possible to enhance the imaging performance from an infinite object to a near object and to make the aberration variable with a simple configuration.

In the present embodiment, the optical system LA can have at least two arrangement states that differ in the amount of aberration generated when it is regarded as an in-focus state on an infinite object. That is, the arrangement state of the lens unit B1 and the lens unit B2 can have a first arrangement state and a second arrangement state. "It is regarded as an in-focus state on an infinite object" means that the focal position is within the position range in front of and behind the peak position of contrast (best focus) on the focal plane, that is, within the range (focal depth) within which blurring is permitted. At this time, it is preferable that the optical system LA satisfy the following conditional expression (1):

$$\left(\frac{S1}{|S1|}\right) \times \left(\frac{X1}{|X1|}\right) + \left(\frac{S2}{|S2|}\right) \times \left(\frac{X2}{|X2|}\right) = 0 \tag{1}$$

$$S1 = (1 - (\beta i1)^2) \times (\beta i1r)^2, \text{ and}$$

$$S2 = (1 - (\beta i2)^2) \times (\beta i2r)^2.$$

Here, S1 is the position sensitivity of the lens unit B1 in the first arrangement state, and S2 is the position sensitivity of the lens unit B2 in the first arrangement state. X1 is the amount of movement of the lens unit B1 in the case of changing from the first arrangement state to the second arrangement state, and X2 is the amount of movement of the lens unit B2 in the case of changing from the first arrangement state to the second arrangement state. βi1 is the lateral magnification of the lens unit B1 in the first arrangement state, and βi2 is the lateral magnification of the lens unit B2 in the first arrangement state. βi1r is the composite lateral magnification of the lens units arranged closer to the image side than the lens unit B1 in the first arrangement state, and βi2r is the composite lateral magnification of the lens units arranged closer to the image side than the lens unit B2 in the first arrangement state.

The position sensitivity is the ratio of the movement distance of the image plane IP to the movement distance of the focus lens unit. The sign of the amount of movement (X1, X2) is positive when moving to the image side when changing from the first arrangement state to the second arrangement state, and is negative when moving to the object side.

The conditional expression (1) is a conditional expression for keeping the focal position substantially constant when changing the aberration, and defines the combination of the sign of the position sensitivity and the sign of the movement direction. By moving the lens unit B1 and the lens unit B2 such that the sum of the first and second terms of the conditional expression (1) becomes zero and the conditional expression (1) is satisfied, the focal position can be kept substantially constant when aberration is changed. As a result, there is no need to perform the focusing operation again. By moving the two lens units, it is also possible to mutually correct changes in spherical aberration and field curvature when aberration is changed.

The optical system LA has a first lens unit G1 of positive or negative refractive power (optical power, reciprocal of the focal length) on the most object side. Li is the total length (total lens length) of the optical system LA in the first arrangement state, and Lj is the total length of the optical system LA in the second arrangement state. At this time, it is preferable that the following conditional expression (2) be satisfied. The total length of the optical system LA is the distance from the first lens surface to the image plane when focusing on an infinite object.

$$0.99 < Li/Lj < 1.01 \tag{2}$$

The conditional expression (2) is a conditional expression for suppressing the change in the total length of the optical system LA in the first and second arrangement states. When changing from the first arrangement state to the second arrangement state, the first lens unit G1 can be fixed (not moved). By making the first lens unit G1 a fixed unit, the change in the total length of the optical system LA is suppressed, and the lens barrel can be simplified. By making the first lens unit G1 a fixed unit, user operability is improved.

It is preferable that the optical system LA satisfy the following conditional expression (3):

$$0.9 < (\beta i1 \times \beta i2)/(\beta j1 \times \beta j2) < 1.1 \tag{3}.$$

Here, βi1 is the lateral magnification of the lens unit B1 in the first arrangement state, and βi2 is the lateral magnification of the lens unit B2 in the first arrangement state. βj1 is the lateral magnification of the lens unit B1 in the second arrangement state, and βj2 is the lateral magnification of the lens unit B2 in the second arrangement state.

The ratio of βi1×βi2 to βj1×βj2 in the conditional expression (3) indicates the change in magnification when changing from the first arrangement state to the second arrangement state. If it is out of the range of the conditional expression (3), it is difficult to keep the angle of view substantially constant when changing from the first arrangement state to the second arrangement state, which is not desirable. When the angle of view changes, it is possible to keep the angle of view substantially constant by enlarging or reducing the image by software, but it is desirable to perform it in the optical system because it causes degradation of image quality.

It is preferable that the optical system LA satisfy the following conditional expression (4):

$$\beta < -0.1 \quad (4),$$

where β is the image magnification upon focusing on the nearest object.

The conditional expression (4) is a conditional expression defining the image magnification (lateral magnification) in the case of focusing on the nearest object point. Although it may be compensated by enlargement by electronic zoom or the like, it is not desirable because high precision aberration correction is required and the size of the optical system is increased.

It is preferable that the optical system LA satisfy the following conditional expression (5):

$$0.4 < |f1/f2| < 2.5 \quad (5),$$

where f1 and f2 are the focal lengths of the lens unit B1 and the lens unit B2, respectively.

The conditional expression (5) is a conditional expression that defines the focal length f1 of the lens unit B1 by the focal length f2 of the lens unit B2. When the upper limit of the conditional expression (5) is exceeded, the refractive power of the lens unit B1 becomes weak, and when focusing on a near object, the amount of movement of the lens unit B1 increases. The refracting power of the lens unit B2 becomes strong, and when focusing on a near object, spherical aberration increases, making correction difficult. Below the lower limit of the conditional expression (5), the refractive power of the lens unit B2 becomes weak, and when focusing on a near object, the amount of movement of the lens unit B2 increases. The refracting power of the lens unit B1 becomes strong, and when focusing on a near object, spherical aberration increases, making correction difficult.

More preferably, the numerical range of the conditional expression (5) may be set as follows:

$$0.45 < |f1/f2| < 2.45 \quad (5a).$$

When the conditional expression (5a) is satisfied, the sharing of refractive index between the lens unit B1 and the lens unit B2 becomes more appropriate, and the increase of the spherical aberration in the case of focusing on a near object can be easily reduced.

It is preferable that the optical system LA have a third arrangement state of the lens unit B1 and the lens unit B2 that satisfies the following expression (6):

$$I < 0 \quad (6),$$

where I is the third-order aberration coefficient at the time of focusing on an infinite object.

The conditional expression (6) is a conditional expression defining the direction in which the spherical aberration occurs. If it is out of the range of the conditional expression (6), it becomes difficult to generate the spherical aberration in the direction of overcorrection.

The optical system of each embodiment described below is a shooting lens system used in an image pickup apparatus such as a video camera, a digital still camera, a silver-halide film camera, or a TV camera. The optical system of each embodiment can also be used as a projection optical system for a projection apparatus (projector).

In each embodiment, the arrangement state of the lens unit B1 and the lens unit B2 at the time of focusing to a predetermined object distance is referred to as Mode 1. The arrangement state of the lens unit B1 and the lens unit B2 in a case where the spherical aberration is changed in the negative direction while maintaining the in-focus state to the predetermined object distance in Mode 1 is referred to as Mode 2, and the arrangement state of the lens unit B1 and the lens unit B2 in a case where the spherical aberration is changed in the positive direction while maintaining the in-focus state to the predetermined object distance in Mode 1 is referred to as Mode 3.

Embodiment 1

FIG. 1 is a sectional view of an optical system LA when focusing on an infinite object in Mode 1. The optical system LA includes, in order from the object side (front side) to the image side (rear side), a first lens unit G1 having negative refractive power, a second lens unit G2 (lens unit B1) having positive refractive power, and a third lens unit G3 (lens unit B2) having positive refractive power. The left side of the figure is the object side, and the right side is the image side. The aperture stop SP determines (limits) a light beam of the full aperture F-number (Fno). For example, when the optical system LA is used as a shooting optical system of a video camera or a digital still camera, the image pickup surface of the solid-state image pickup device (photoelectric conversion device) such as a CCD sensor or a CMOS sensor is arranged on the image plane IP. When the optical system LA is used as a shooting optical system of a silver-halide film camera, a photosensitive surface corresponding to the film surface is arranged on the image plane IP. The arrows relating to the focus indicate the movement direction of the lens units when performing focusing from an infinite object to a near object.

FIGS. 2A to 2C are aberration diagrams of the optical system LA when focusing on an infinite object in Mode 1. FIGS. 2A, 2B, and 2C respectively show a case of focusing on an infinite object, a case where the imaging magnification is −0.02 times, and a case where the imaging magnification is −0.12 times.

Figure 3B:
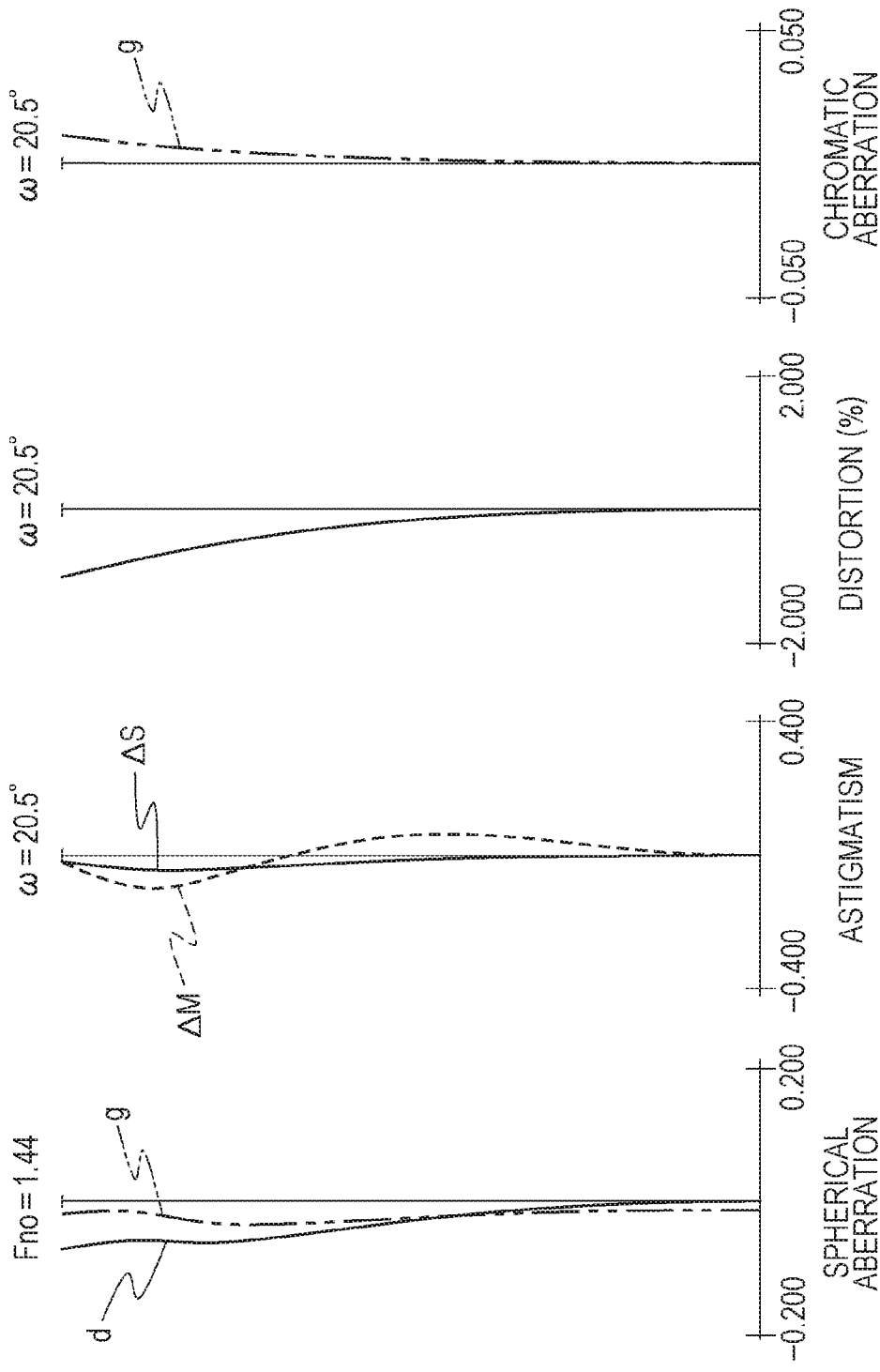

FIGS. 3A to 3C are aberration diagrams of the optical system LA when focusing on an infinite object in Mode 2. FIGS. 3A, 3B, and 3C respectively show a case of focusing on an infinite object, a case where the imaging magnification is −0.02 times, and a case where the imaging magnification is −0.12 times.

FIGS. 4A to 4C are aberration diagrams of the optical system LA when focusing on an infinite object in Mode 3. FIGS. 4A, 4B, and 4C respectively show a case of focusing on an infinite object, a case where the imaging magnification is −0.02 times, and a case where the imaging magnification is −0.12 times.

In the aberration diagrams, Fno is the F-number, and C is the half angle of view (degree), and is the angle of view obtained by ray tracing. In the spherical aberration diagrams, the solid line is the d-line (wavelength 587.6 nm), and the long dashed double-short dashed line is the g-line (wavelength 435.8 nm). In the astigmatism diagrams, the solid line is the sagittal image plane at the d-line, and the dotted line is the meridional image plane at the d-line. Distortion aberration is shown for d-line. In the lateral chromatic aberration diagrams, the long dashed double-short dashed line is the g-line.

In the optical system LA of the present embodiment, when focusing from an infinite object to a near object, the lens unit B1 and the lens unit B2 both move to the object side such that the distance therebetween decreases. Thus, when performing focusing from an infinite object to a near object, the incident height of light rays incident on the lens unit B2 is suppressed low. At the same time, it is easy to reduce the angle of incidence of light rays incident on the lens unit B2, as compared with the focus method in which the lens unit B1 and the lens unit B2 are integrally moved, and various aberrations, especially off-axis coma aberration, are efficiently corrected.

When the lens unit B1 and the lens unit B2 are integrally moved, the spherical aberration increases in the negative direction when performing focusing from an infinite object to a near object. For this reason, it is difficult to obtain satisfactory optical performance with respect to focusing on a near object. On the other hand, in the present embodiment, a floating focus method is used, which changes the distance between the lens unit B1 and the lens unit B2. Accordingly, by effectively canceling the spherical aberration generated from the lens unit B1 by the spherical aberration of the opposite sign generated from the lens unit B2, the spherical aberration generated from each lens unit is satisfactorily corrected.

In the present embodiment, upon changing from Mode 1 to Mode 2, the lens unit B1 is arranged closer to the object side than its position in Mode 1, and the lens unit B2 is arranged closer to the image side than its position in Mode 1. Upon changing from Mode 1 to Mode 3, the lens unit B1 is arranged closer to the image side than its position in Mode 1, and the lens unit B2 is arranged closer to the object side than its position in Mode 1.

As shown in Table 5, the optical system LA of the present embodiment satisfies the conditional expressions (1) to (6).

Embodiment 2

Figure 5:
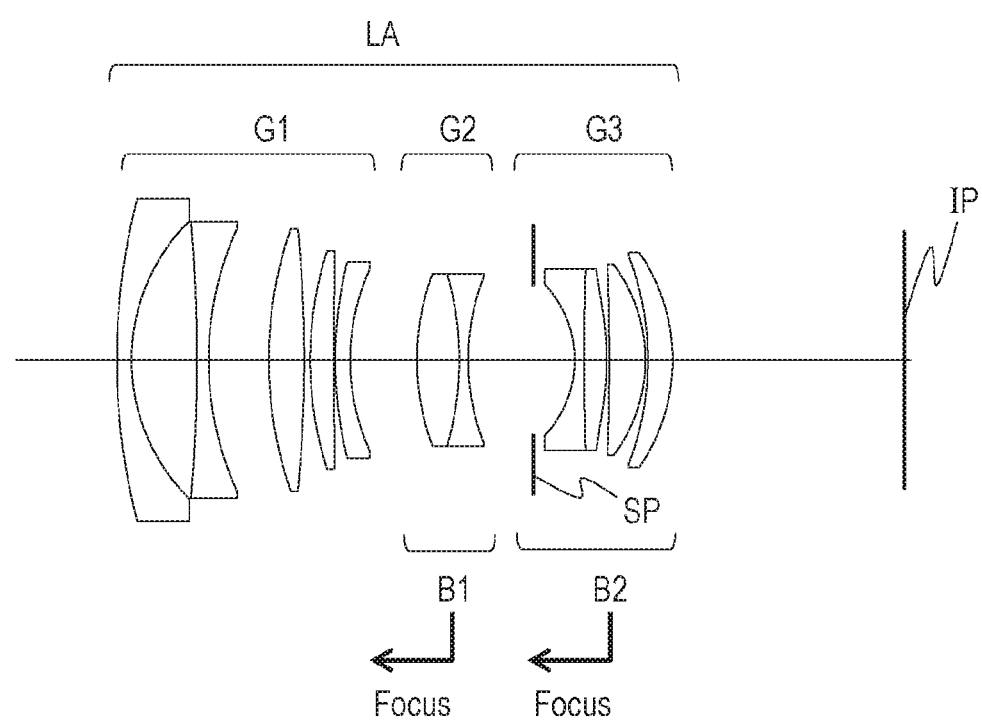
FIG. 5 is a sectional view of an optical system when focusing on an infinite object in Mode 1 of Embodiment 2.

FIG. 5 is a sectional view of an optical system LA when focusing on an infinite object in Mode 1. The optical system LA includes, in order from the object side to the image side, a first lens unit G1 having negative refractive power, a second lens unit G2 (lens unit B1) having positive refractive power, and a third lens unit G3 (lens unit B2) having positive refractive power.

FIGS. 6A to 6C are aberration diagrams of the optical system LA when focusing on an infinite object in Mode 1. FIGS. 6A, 6B, and 6C respectively show a case of focusing on an infinite object, a case where the imaging magnification is −0.02 times, and a case where the imaging magnification is −0.12 times.

FIGS. 7A to 7C are aberration diagrams of the optical system LA when focusing on an infinite object in Mode 2. FIGS. 7A, 7B, and 7C respectively show a case of focusing on an infinite object, a case where the imaging magnification is −0.02 times, and a case where the imaging magnification is −0.12 times.

FIGS. 8A to 8C are aberration diagrams of the optical system LA when focusing on an infinite object in Mode 3. FIGS. 8A, 8B, and 8C respectively show a case of focusing on an infinite object, a case where the imaging magnification is −0.02 times, and a case where the imaging magnification is −0.12 times.

In the optical system LA of the present embodiment, similarly to the optical system LA of Embodiment 1, when focusing from an infinite object to a near object, the lens unit B1 and the lens unit B2 both move to the object side such that the distance therebetween decreases. Thereby, the optical system LA of the present embodiment can obtain the effect described in Embodiment 1.

In the present embodiment, similarly to Embodiment 1, upon changing from Mode 1 to Mode 2, the lens unit B1 is arranged closer to the object side than its position in Mode 1, and the lens unit B2 is arranged closer to the image side than its position in Mode 1. Upon changing from Mode 1 to Mode 3, the lens unit B1 is arranged closer to the image side than its position in Mode 1, and the lens unit B2 is arranged closer to the object side than its position in Mode 1.

As shown in Table 5, the optical system LA of the present embodiment satisfies the conditional expressions (1) to (6).

Embodiment 3

Figure 9:
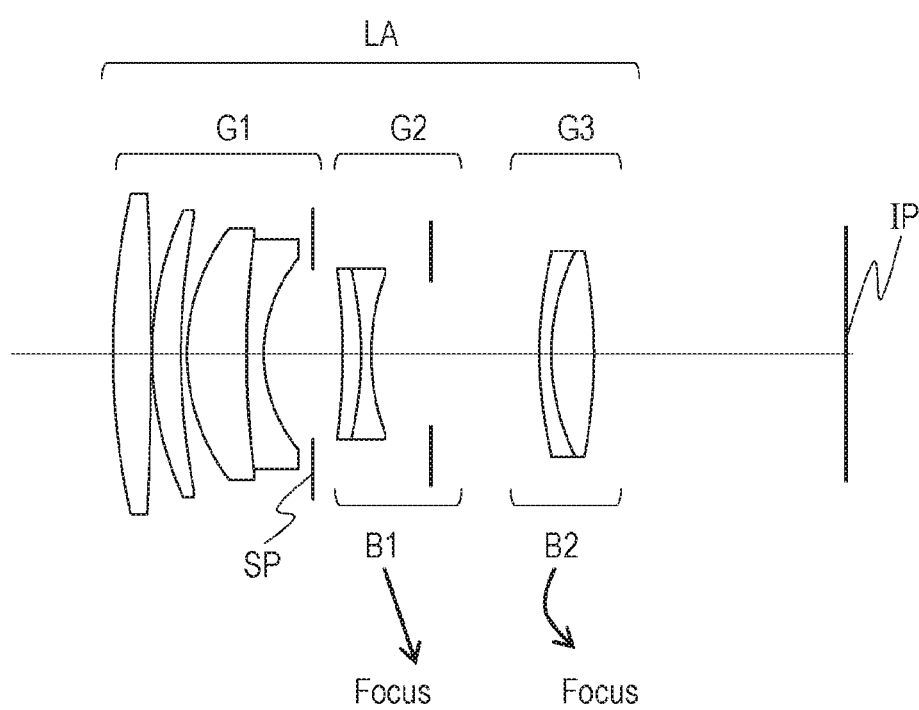
FIG. 9 is a sectional view of an optical system when focusing on an infinite object in Mode 1 of Embodiment 3.

FIG. 9 is a sectional view of an optical system LA when focusing on an infinite object in Mode 1. The optical system LA includes, in order from the object side to the image side, a first lens unit G1 having positive refractive power, a second lens unit G2 (lens unit B1) having negative refractive power, and a third lens unit G3 (lens unit B2) having positive refractive power.

FIGS. 10A to 10C are aberration diagrams of the optical system LA when focusing on an infinite object in Mode 1. FIGS. 10A, 10B, and 10C respectively show a case of focusing on an infinite object, a case where the imaging magnification is −0.02 times, and a case where the imaging magnification is −0.12 times.

FIGS. 11A to 11C are aberration diagrams of the optical system LA when focusing on an infinite object in Mode 2. FIGS. 11A, 11B, and 11C respectively show a case of focusing on an infinite object, a case where the imaging magnification is −0.02 times, and a case where the imaging magnification is −0.12 times.

FIGS. 12A to 12C are aberration diagrams of the optical system LA when focusing on an infinite object in Mode 3. FIGS. 12A, 12B, and 12C respectively show a case of focusing on an infinite object, a case where the imaging magnification is −0.02 times, and a case where the imaging magnification is −0.12 times.

In the optical system LA according to the present embodiment, when performing focusing from an infinite object to a near object, the lens unit B1 moves toward the image side, and the lens unit B2 moves toward the image side in a convex locus. Thereby, the optical system LA of the present embodiment can obtain the effect described in Embodiment 1.

In the present embodiment, upon changing from Mode 1 to Mode 2, the lens unit B1 and the lens unit B2 are arranged closer to the object side than their respective positions in Mode 1. Upon changing from Mode 1 to Mode 3, the lens unit B1 and the lens unit B2 are arranged closer to the image side than their respective positions in Mode 1.

As shown in Table 5, the optical system LA of the present embodiment satisfies the conditional expressions (1) to (6).

Embodiment 4

Figure 13A:
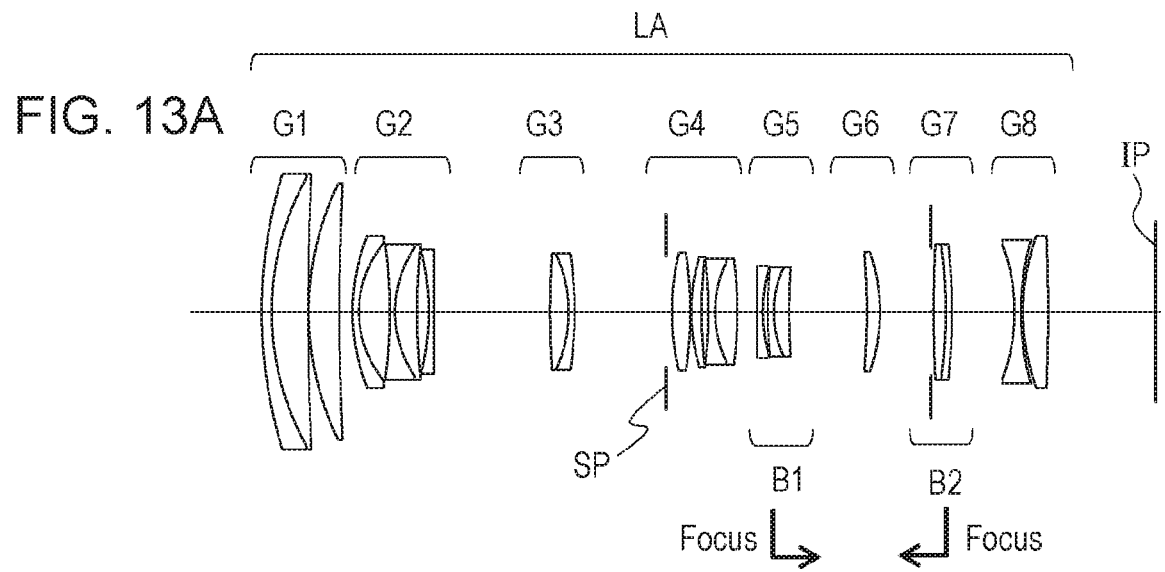
FIGS. 13A to 13C are sectional views of an optical system when focusing on an infinite object in Mode 1 of Embodiment 4.
Figure 13B:
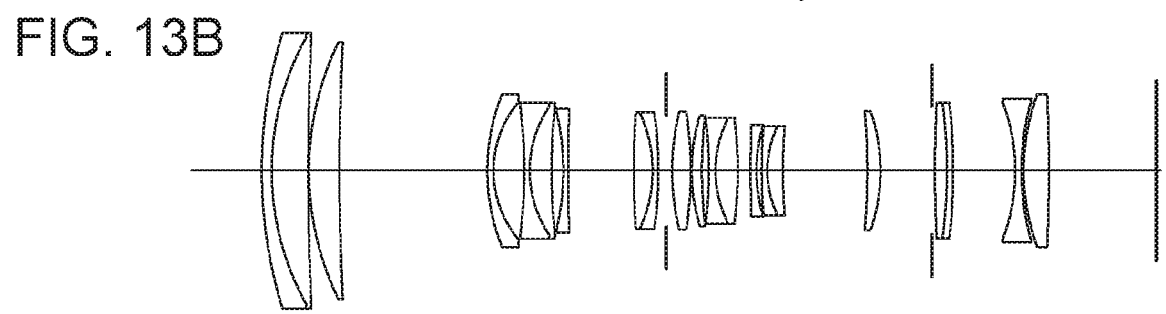
Figure 13C:
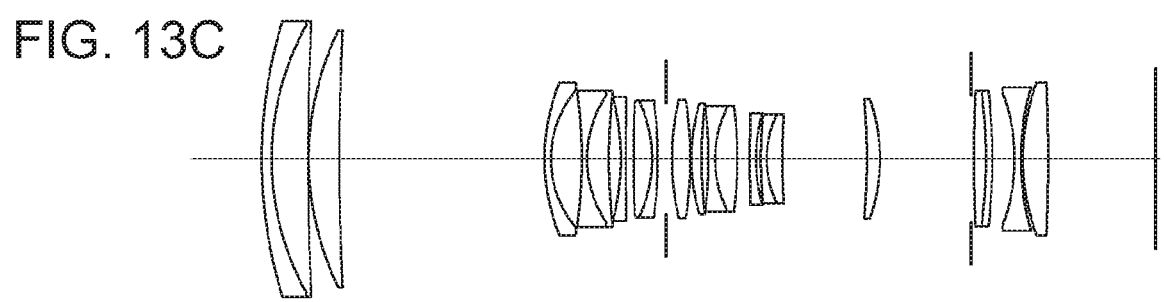

FIGS. 13A to 13C are sectional views of an optical system LA when focusing on an infinite object in Mode 1 and are sectional views of the optical system at the wide-angle end (FIG. 13A), the middle zooming position (FIG. 13B), and the telephoto end (FIG. 13C). The optical system LA is an eight-unit zoom lens and includes the first lens unit G1, the second lens unit G2, the third lens unit G3, a fourth lens unit G4, a fifth lens unit G5, a sixth lens unit G6, a seventh lens unit G7, and an eighth lens unit G8. In the present embodiment, the wide-angle end and the telephoto end refer to the zoom positions where the lens units for magnification variation are located at either end of their mechanically movable ranges on the optical axis. The refractive powers of the eight-unit zoom lens in order from the object side to the image side are positive (G1), negative (G2), positive (G3), positive (G4), negative (G5), positive (G6), positive (G7), and negative (G8).

Figure 14A:
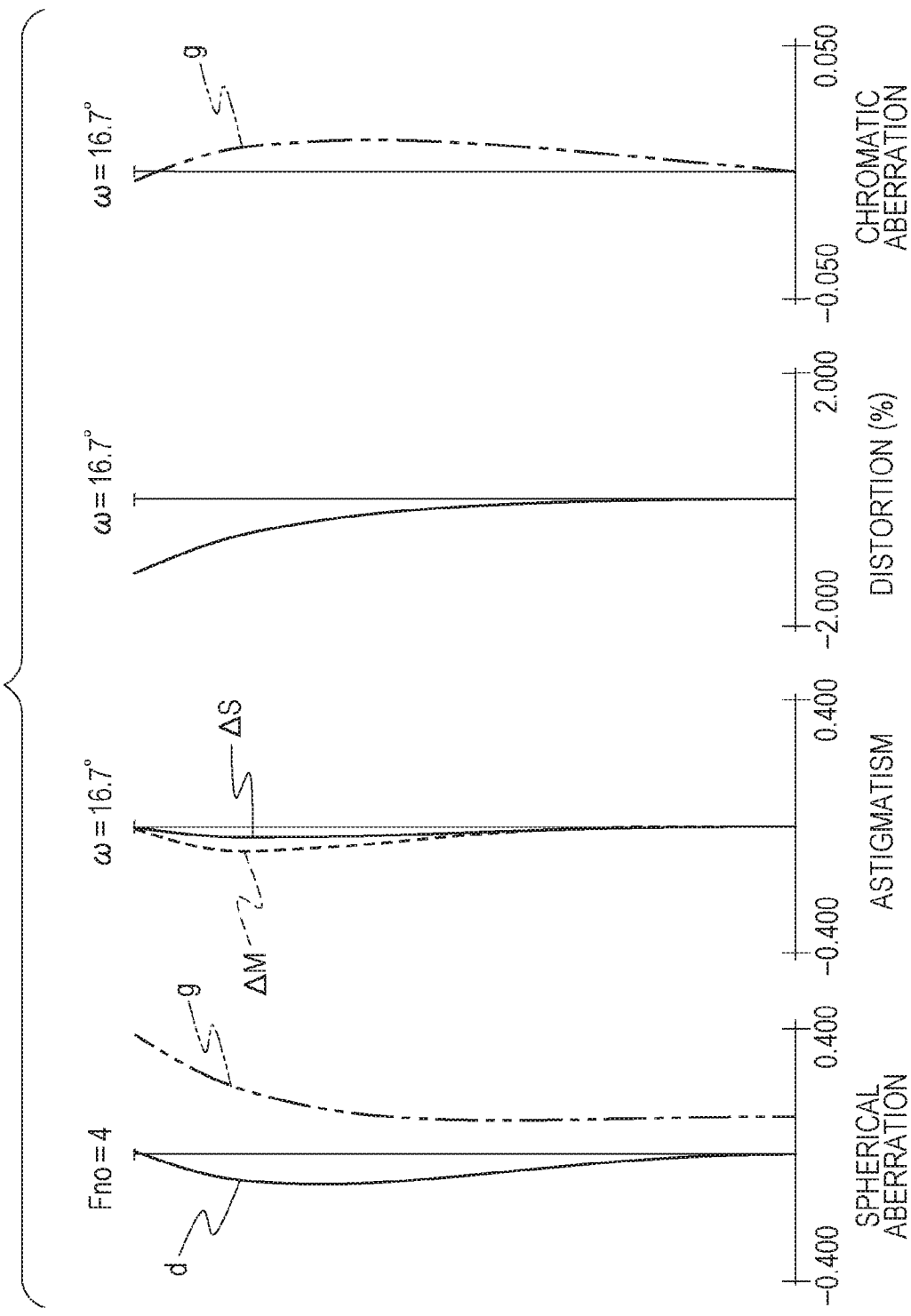

FIGS. 14A to 14C are aberration diagrams of the optical system LA when focusing on an infinite object at the wide-angle end in Mode 1 of Embodiment 4. FIGS. 14A, 14B, and 14C respectively show a case of focusing on an infinite object, a case where the imaging magnification is −0.02 times, and a case where the imaging magnification is −0.12 times.

Figure 15C:
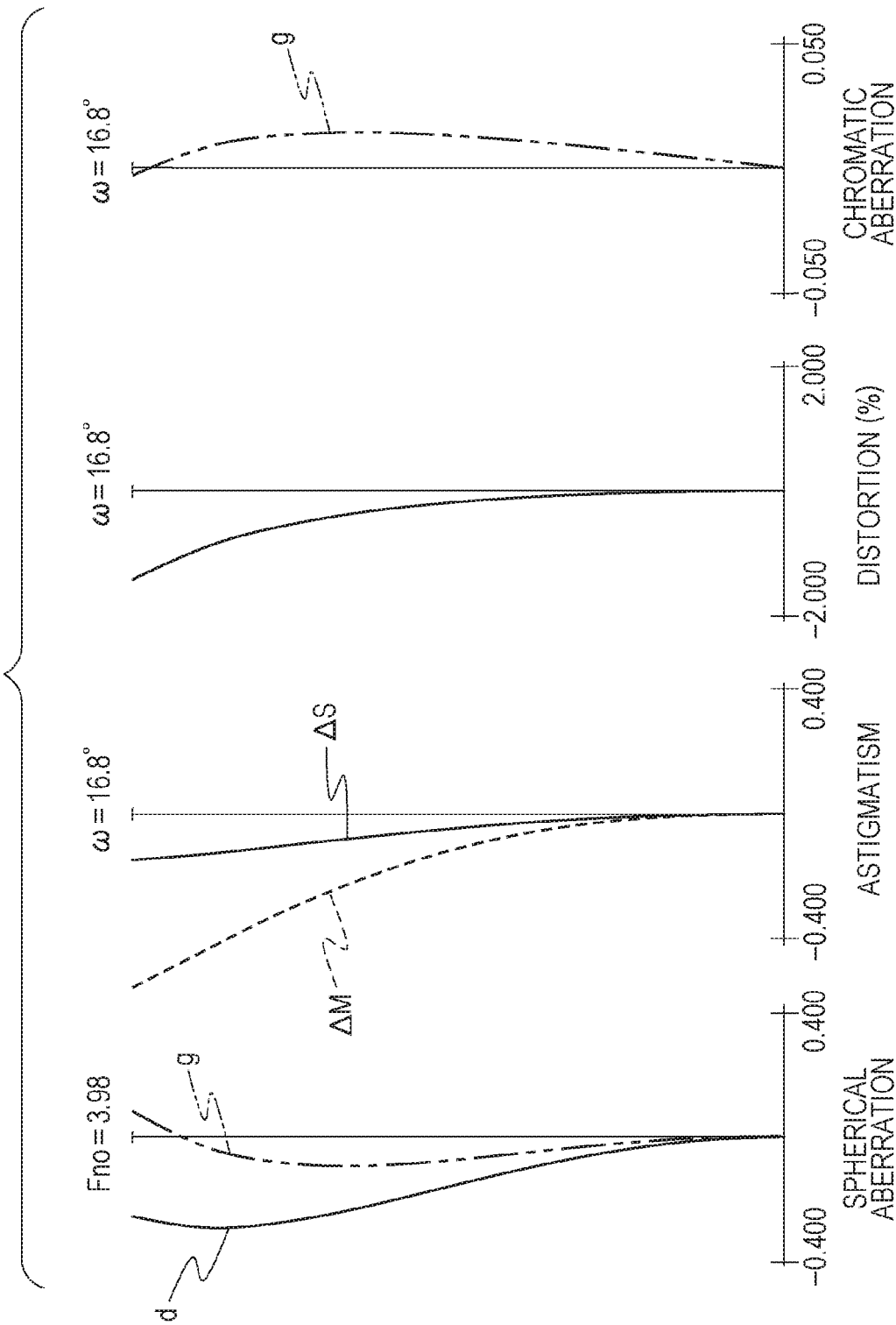

FIGS. 15A to 15C are aberration diagrams of the optical system LA when focusing on an infinite object at the wide-angle end in Mode 2 of Embodiment 4. FIGS. 15A, 15B, and 15C respectively show a case of focusing on an infinite object, a case where the imaging magnification is −0.02 times, and a case where the imaging magnification is −0.12 times.

FIGS. 16A to 16C are aberration diagrams of the optical system LA when focusing on an infinite object at the wide-angle end in Mode 3 of Embodiment 4. FIGS. 16A, 16B, and 16C respectively show a case of focusing on an infinite object, a case where the imaging magnification is −0.02 times, and a case where the imaging magnification is −0.12 times.

Figure 17C:
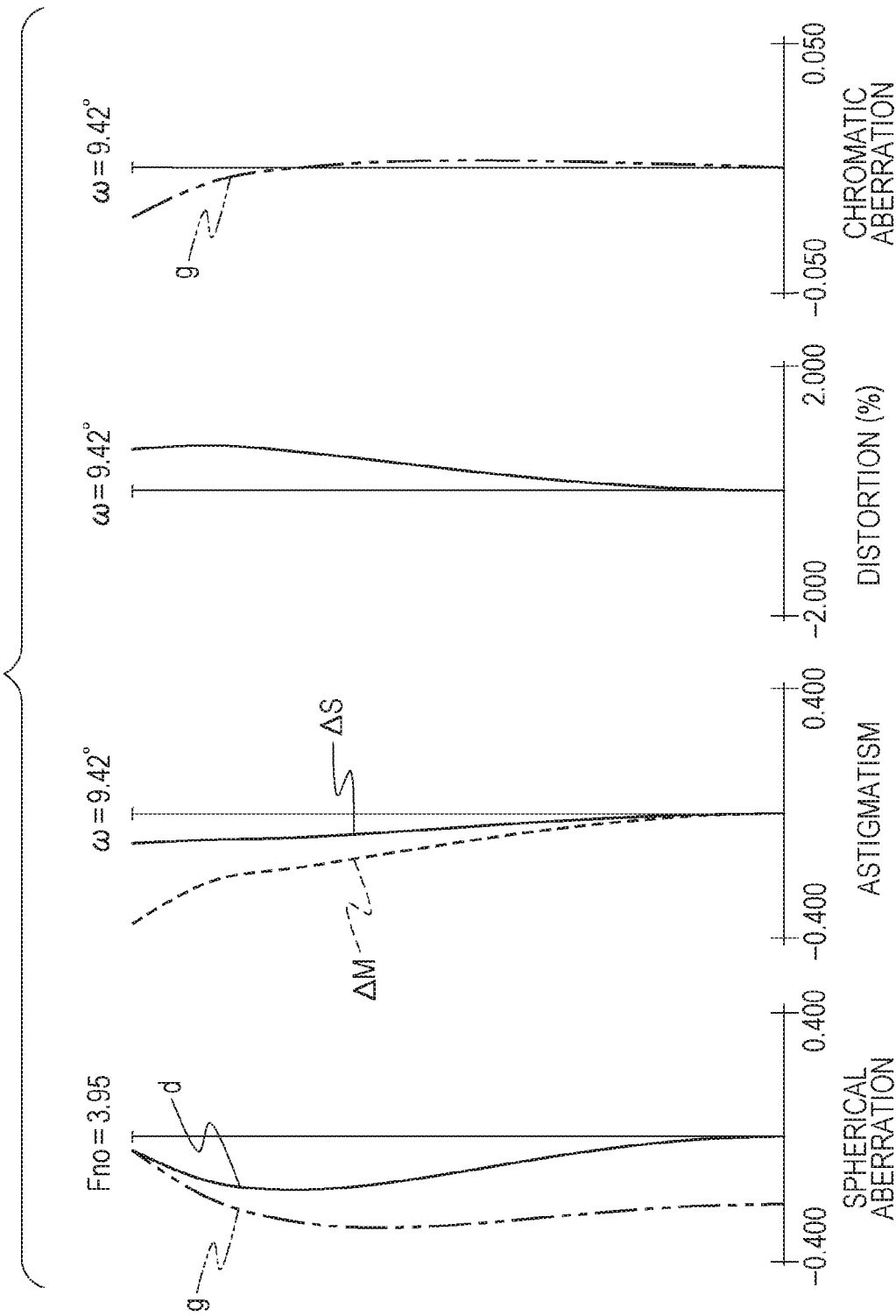

FIGS. 17A to 17C are aberration diagrams of the optical system LA when focusing on an infinite object at the middle zooming position in Mode 1 of Embodiment 4. FIGS. 17A, 17B, and 17C respectively show a case of focusing on an infinite object, a case where the imaging magnification is −0.02 times, and a case where the imaging magnification is −0.16 times.

FIGS. 18A to 18C are aberration diagrams of the optical system LA when focusing on an infinite object at the middle zooming position in Mode 2 of Embodiment 4. FIGS. 18A, 18B, and 18C respectively show a case of focusing on an infinite object, a case where the imaging magnification is −0.02 times, and a case where the imaging magnification is −0.16 times.

Figure 19A:
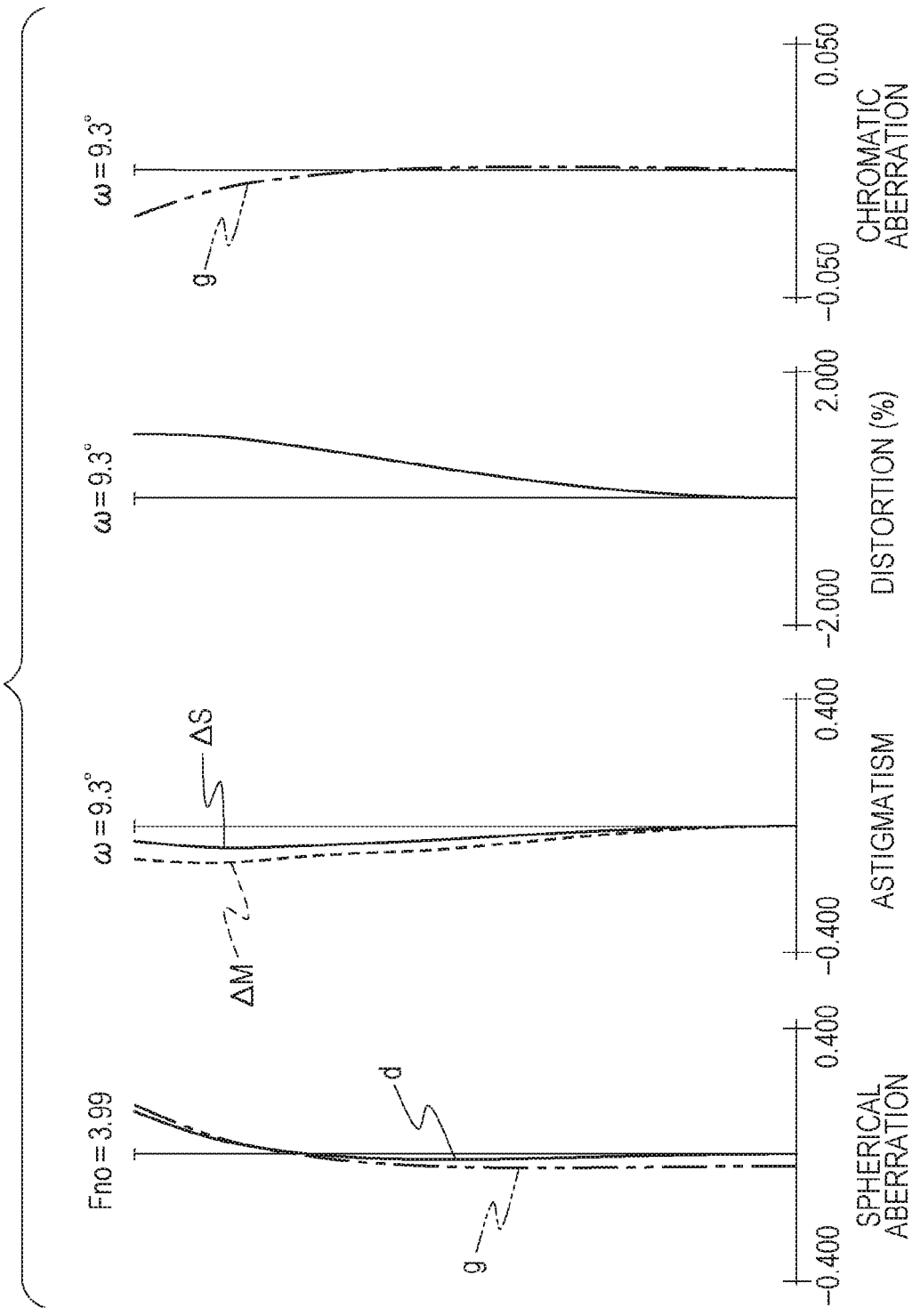
Figure 19B:
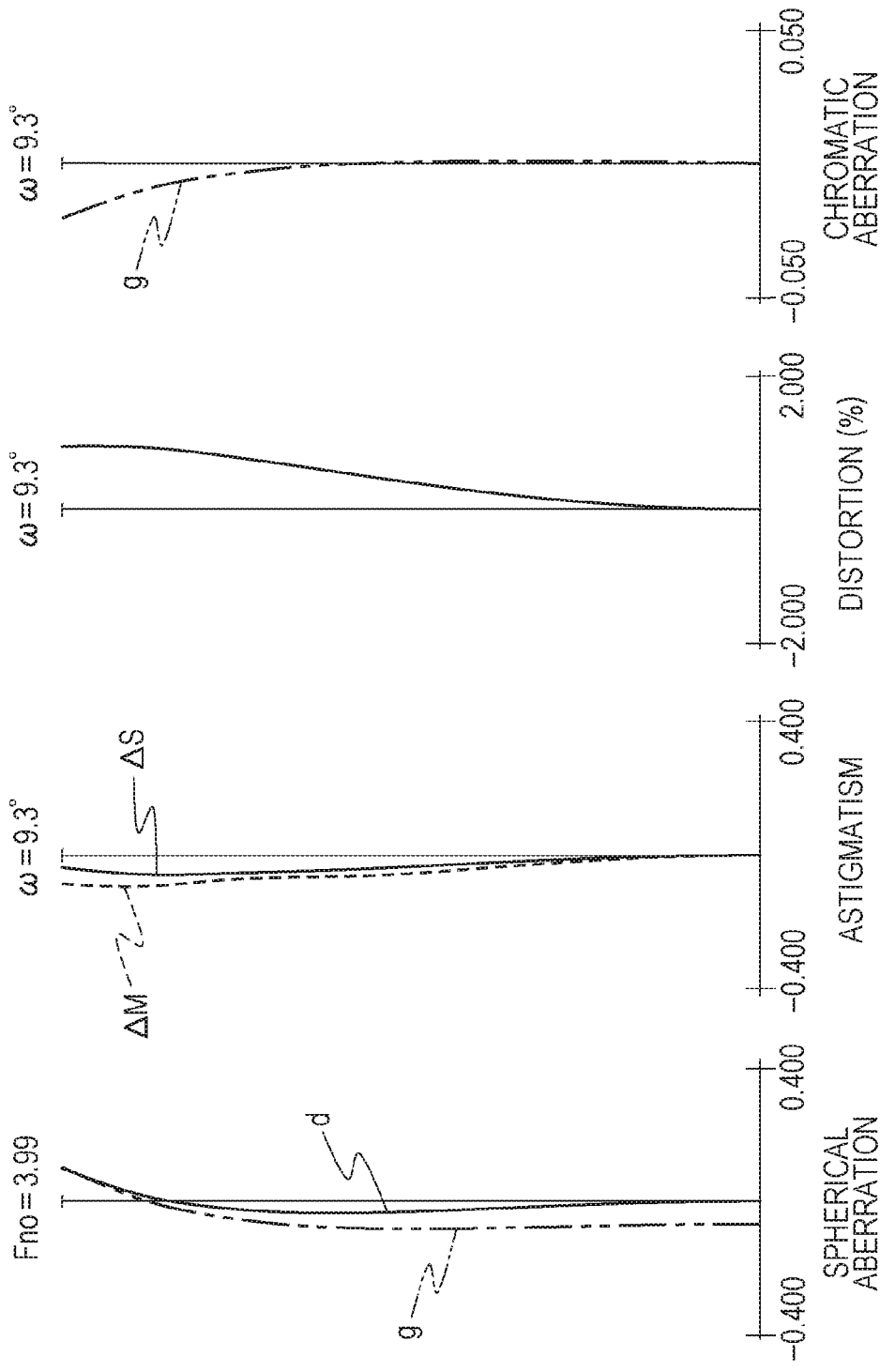

FIGS. 19A to 19C are aberration diagrams of the optical system LA when focusing on an infinite object at the middle zooming position in Mode 3 of Embodiment 4. FIGS. 19A, 19B, and 19C respectively show a case of focusing on an infinite object, a case where the imaging magnification is −0.02 times, and a case where the imaging magnification is −0.16 times.

Figure 20B:
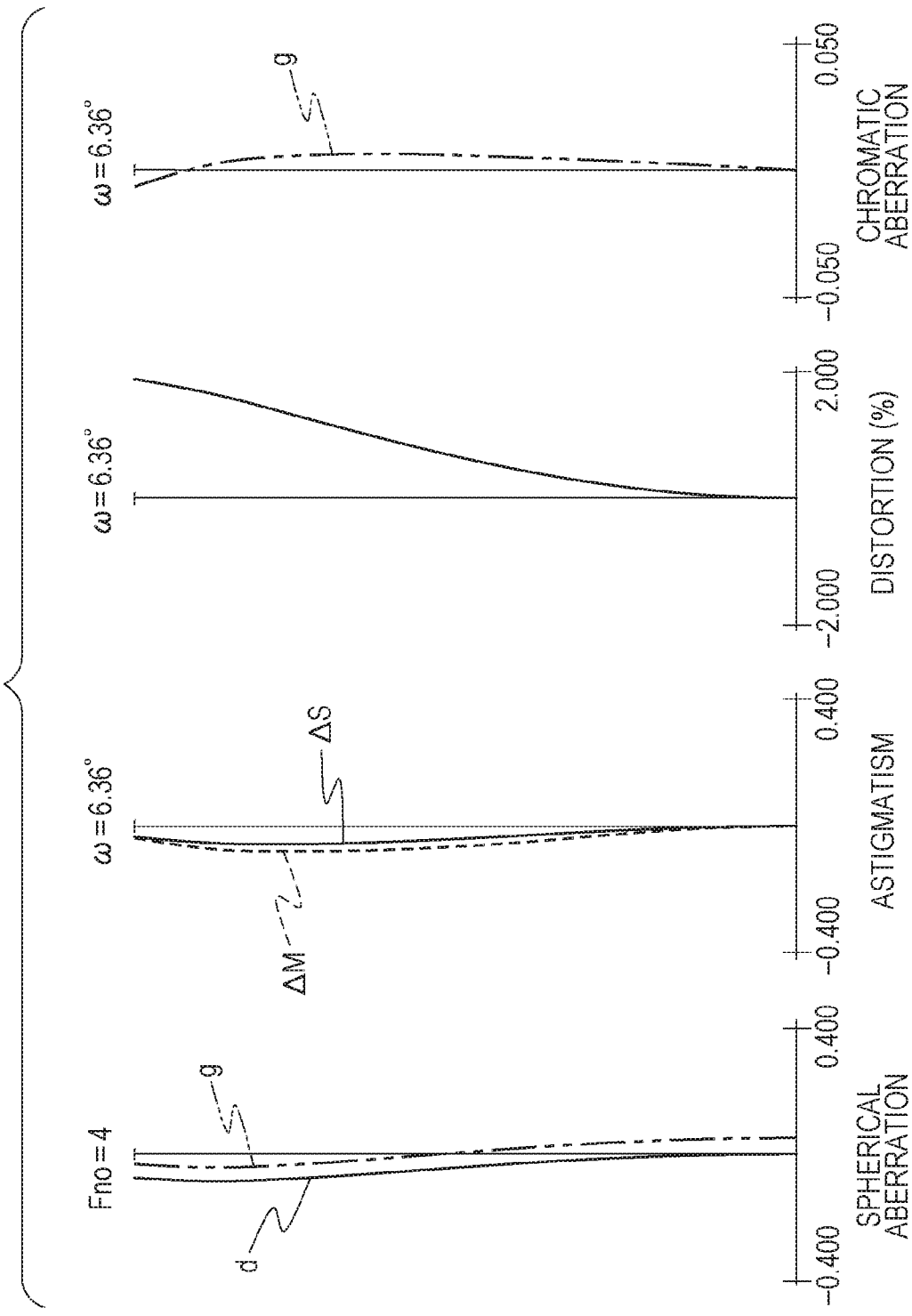

FIGS. 20A to 20C are aberration diagrams of the optical system LA when focusing on an infinite object at the telephoto end in Mode 1 of Embodiment 4. FIGS. 20A, 20B, and 20C respectively show a case of focusing on an infinite object, a case where the imaging magnification is −0.02 times, and a case where the imaging magnification is −0.25 times.

FIGS. 21A to 21C are aberration diagrams of the optical system LA when focusing on an infinite object at the telephoto end in Mode 2 of Embodiment 4. FIGS. 21A, 21B, and 21C respectively show a case of focusing on an infinite object, a case where the imaging magnification is −0.02 times, and a case where the imaging magnification is −0.25 times.

Figure 22C:
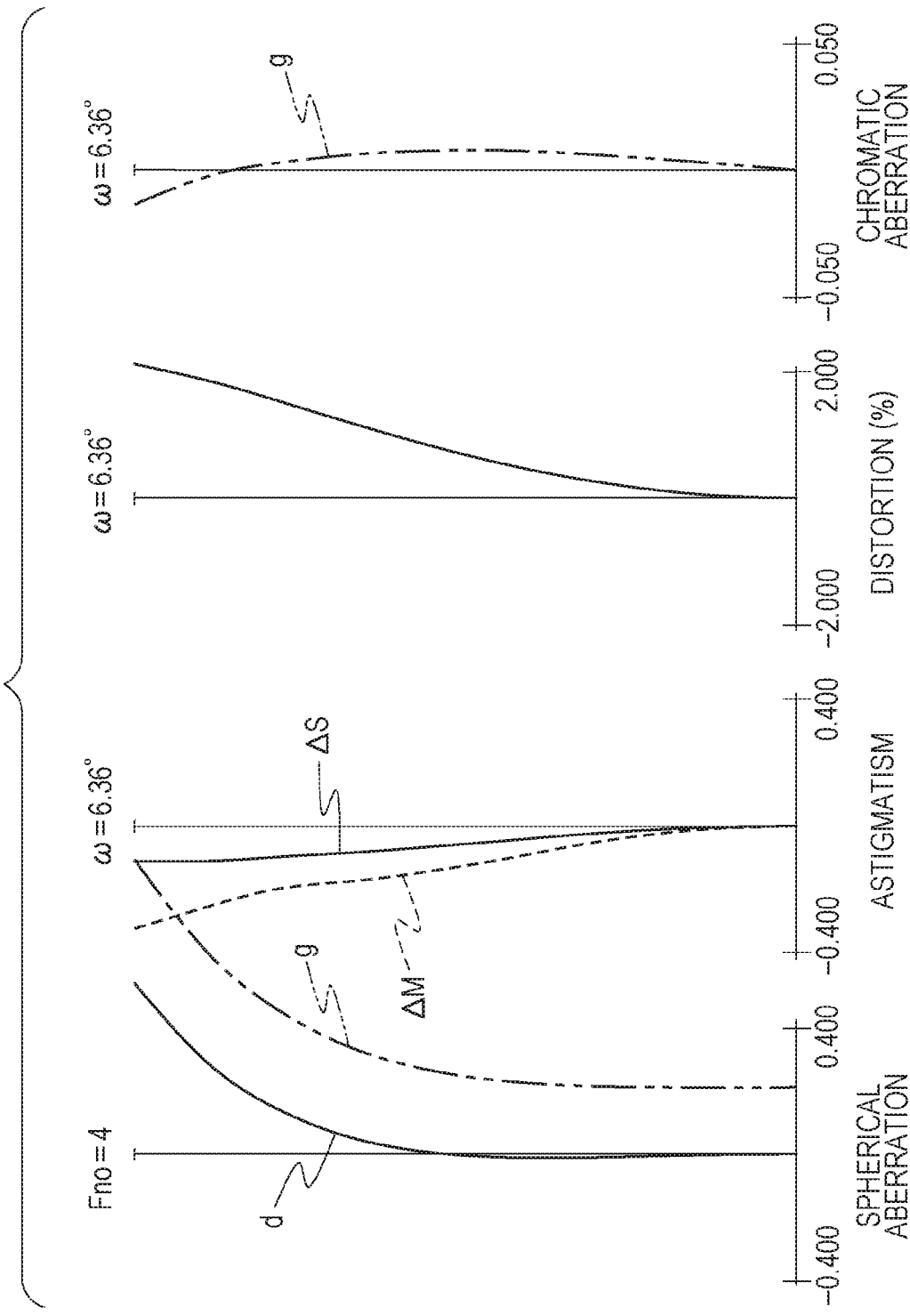

FIGS. 22A to 22C are aberration diagrams of the optical system LA when focusing on an infinite object at the telephoto end in Mode 3 of Embodiment 4. FIGS. 22A, 22B, and 22C respectively show a case of focusing on an infinite object, a case where the imaging magnification is −0.02 times, and a case where the imaging magnification is −0.25 times.

In the optical system LA of the present embodiment, when focusing from an infinite object to a near object, the lens unit B1 and the lens unit B2 move such that the distance therebetween decreases. Thereby, the optical system LA of the present embodiment can obtain the effect described in Embodiment 1.

In the present embodiment, upon changing from Mode 1 to Mode 2, the lens unit B1 and the lens unit B2 are arranged closer to the object side than their respective positions in Mode 1. Upon changing from Mode 1 to Mode 3, the lens unit B1 and the lens unit B2 are arranged closer to the image side than their respective positions in Mode 1.

As shown in Table 5, the optical system LA of the present embodiment satisfies the conditional expressions (1) to (6).

As described above, the optical system according to the present embodiment can change the aberration while suppressing aberration variation due to the focusing operation from an infinite object to a near object with a simple configuration.

Numerical embodiments 1 to 4 corresponding to Embodiments 1 to 4 are shown below. In each numerical embodiment, r denotes the radius of curvature of each surface, d denotes the lens thickness and air space between the i-th surface and the (i+1)th surface, and nd and vd denote the refractive index and the Abbe number, respectively, of the material of the optical member for the d-line. Asterisk means a surface having an aspherical shape. BF denotes back focus. As for the focal length and others, in order from the left, the value when focusing on an infinite object, the value in a state where the spherical aberration is changed in the negative direction while maintaining the state of focusing on an infinite object, and the value in a state where the spherical aberration is changed in the positive direction while maintaining the state of focusing on an infinite object are shown.

An aspherical shape is defined by the following expression:

$$X = \frac{\frac{H^2}{R}}{1+\sqrt{1-(1+K)\left(\frac{H}{R}\right)^2}} + A4H^4 + A6H^6 + A8H^8 + A10H^{10} + A12H^{12}$$

where X is the amount of displacement from the reference plane in the direction of the optical axis, H is the height of the optical axis in a direction perpendicular to the optical axis, R is a paraxial curvature radius, K is a conic constant, and A4 to A12 are aspherical coefficients.

The lens intervals in the change of object distance (image pickup magnification) and aberration change in the various data items of Embodiments 1 to 4 are shown in Tables 1, 2, 3, and 4, respectively. Mode 1, Mode 2, and Mode 3 are shown in order from the left. Let I1, I2, and I3 be the aberration coefficients I of Mode 1, Mode 2, and Mode 3, respectively.

Table 5 shows the relationship between each conditional expression and Embodiments 1 to 4. As for the conditional expression (6), the value of the mode whose aberration coefficient I is the minimum among the modes is described. "e−x" means $10^{-x}$.

Numerical Embodiment 1

Unit mm

Surface data

| Surface number | r | d | nd | νd |
|---|---|---|---|---|
| 1 | 73.117 | 8.54 | 1.83481 | 42.7 |
| 2 | 529.326 | 2.85 | | |
| 3 | 567.053 | 2.50 | 1.53172 | 48.8 |
| 4 | 38.089 | 14.65 | | |
| 5 | −57.716 | 2.50 | 1.68948 | 31.0 |
| 6 | 100.195 | 8.53 | | |
| 7 | 129.031 | 8.39 | 1.77250 | 49.6 |
| 8 | −72.534 | (Variable) | | |
| 9 | 220.348 | 3.52 | 1.80810 | 22.8 |
| 10 | −939.941 | 0.42 | | |
| 11 | 36.216 | 10.00 | 1.81600 | 46.6 |
| 12 | 829.783 | 3.00 | 1.72047 | 34.7 |
| 13 | 28.894 | 9.25 | | |
| 14(Stop) | ∞ | (Variable) | | |
| 15 | −32.944 | 1.80 | 1.65412 | 39.7 |
| 16 | 95.642 | 0.00 | | |
| 17 | 53.370 | 7.95 | 1.81600 | 46.6 |
| 18 | −50.351 | 2.61 | | |
| 19 | −55.805 | 5.99 | 1.59522 | 67.7 |
| 20 | −28.239 | 1.80 | 1.69895 | 30.1 |
| 21 | −174.528 | 3.11 | | |
| 22 | 105.030 | 5.85 | 1.77250 | 49.5 |
| 23* | −67.535 | (Variable) | | |
| Image plane | ∞ | | | |

Aspherical surface data

Twenty-third surface

K = 0.00000e+000 A4 = 4.52438e−006 A6 = −5.73009e−010
A8 = 4.20022e−012

| | | | |
|---|---|---|---|
| Focal length | 57.57 | 57.89 | 57.00 |
| F-number | 1.43 | 1.44 | 1.44 |
| Angle of view | 20.60 | 20.49 | 20.79 |
| Image height | 21.64 | 21.64 | 21.64 |
| Total lens length | 160.04 | 160.04 | 160.04 |
| BF | 40.43 | 40.27 | 40.70 |

Lens unit B1 data

| Starting surface | Ending surface | Focal length |
|---|---|---|
| 9 | 14 | 145.04 |

Lens unit B2 data

| Starting surface | Ending surface | Focal length |
|---|---|---|
| 15 | 23 | 63.34 |

TABLE 1

| | Mode 1 | | | Mode 2 | | | Mode 3 | | |
|---|---|---|---|---|---|---|---|---|---|
| | ∞ | −0.02 times | −0.12 times | ∞ | −0.02 times | −0.12 times | ∞ | −0.02 times | −0.12 times |
| d8 | 5.33 | 4.74 | 1.08 | 4.72 | 4.28 | 0.77 | 6.44 | 4.94 | 1.17 |
| d14 | 11.03 | 10.29 | 6.46 | 11.79 | 10.84 | 6.80 | 9.65 | 10.04 | 6.37 |
| d23 | 40.43 | 41.76 | 49.24 | 40.27 | 41.66 | 49.22 | 40.7 | 41.81 | 49.25 |

Numerical Embodiment 2

Unit mm

Surface data

| Surface number | r | d | nd | νd |
|---|---|---|---|---|
| 1 | 109.427 | 2.48 | 1.58313 | 59.4 |
| 2 | 33.109 | 11.02 | | |
| 3 | −280.870 | 1.98 | 1.58313 | 59.4 |
| 4 | 53.587 | 10.14 | | |
| 5 | 67.837 | 6.00 | 1.72916 | 54.7 |
| 6 | −223.991 | 0.99 | | |
| 7 | 60.882 | 4.04 | 1.71300 | 53.9 |
| 8 | 1617.573 | 0.20 | | |
| 9 | 69.321 | 2.50 | 1.51633 | 64.1 |
| 10 | 37.128 | (Variable) | | |
| 11 | 41.884 | 7.14 | 1.83481 | 42.7 |
| 12 | −52.238 | 1.50 | 1.63980 | 34.5 |
| 13 | 38.909 | (Variable) | | |
| 14(Stop) | ∞ | 7.02 | | |
| 15 | −18.564 | 1.60 | 1.80518 | 25.4 |
| 16 | 664.345 | 3.79 | 1.83481 | 42.7 |
| 17* | −47.124 | 0.46 | | |
| 18 | −450.032 | 6.07 | 1.77250 | 49.6 |
| 19 | −26.878 | 0.44 | | |
| 20 | −49.113 | 4.18 | 1.77250 | 49.6 |
| 21 | −31.938 | (Variable) | | |
| Image plane | ∞ | | | |

Aspherical surface data

Seventeenth surface

K = 3.09216e+000 A4 = 1.76602e−005 A6 = 8.65801e−009
A8 = 1.34333e−011 A10 = −5.69195e−014

| | | | |
|---|---|---|---|
| Focal length | 33.75 | 33.98 | 33.64 |
| F-number | 1.72 | 1.74 | 1.72 |
| Angle of view | 32.66 | 32.49 | 32.75 |
| Image height | 21.64 | 21.64 | 21.64 |
| Total lens length | 132.93 | 132.93 | 132.93 |
| BF | 39.14 | 38.99 | 39.21 |

Lens unit B1 data

| Starting surface | Ending surface | Focal length |
|---|---|---|
| 10 | 13 | 116.84 |

Lens unit B2 data

| Starting surface | Ending surface | Focal length |
|---|---|---|
| 14 | 16 | 48.14 |

TABLE 2

| | Mode 1 | | | Mode 2 | | | Mode 3 | | |
|---|---|---|---|---|---|---|---|---|---|
| | ∞ | −0.02 times | −0.12 times | ∞ | −0.02 times | −0.12 times | ∞ | −0.02 times | −0.12 times |
| d10 | 11.29 | 10.77 | 6.47 | 10.64 | 10.12 | 5.76 | 11.60 | 11.10 | 6.82 |
| d13 | 10.94 | 10.72 | 8.86 | 11.74 | 11.51 | 9.62 | 10.56 | 10.34 | 8.48 |
| d21 | 39.14 | 39.87 | 46.04 | 38.99 | 39.73 | 45.99 | 39.21 | 39.93 | 46.07 |

Numerical Embodiment 3

Unit mm

Surface data

| Surface number | r | d | nd | vd |
|---|---|---|---|---|
| 1 | 123.998 | 6.42 | 1.65160 | 58.5 |
| 2 | −552.182 | 0.20 | | |
| 3 | 58.282 | 4.86 | 1.59522 | 67.7 |
| 4 | 122.111 | 1.00 | | |
| 5 | 35.256 | 10.00 | 1.71300 | 53.9 |
| 6 | 143.585 | 0.11 | | |
| 7 | 155.981 | 2.89 | 1.71736 | 29.5 |
| 8 | 25.289 | 8.28 | | |
| 9(Stop) | ∞ | (Variable) | | |
| 10 | −119.391 | 3.14 | 1.80518 | 25.4 |
| 11 | −62.314 | 1.70 | 1.51633 | 64.1 |
| 12 | 38.774 | 10.07 | | |
| 13 | ∞ | (Variable) | | |
| 14 | 72.515 | 1.99 | 1.80000 | 29.8 |
| 15 | 39.041 | 7.20 | 1.71300 | 53.9 |
| 16 | −92.657 | (Variable) | | |
| Image plane | ∞ | | | |

| | | | |
|---|---|---|---|
| Focal length | 103.20 | 102.73 | 103.55 |
| F-number | 2.17 | 2.16 | 2.17 |
| Angle of view | 11.84 | 11.89 | 11.80 |
| Image height | 21.64 | 21.64 | 21.64 |
| Total lens length | 123.79 | 123.79 | 123.79 |
| BF | 42.20 | 43.15 | 42.20 |

Lens unit B1 data

| Starting surface | Ending surface | Focal length |
|---|---|---|
| 10 | 13 | 116.84 |

Lens unit B2 data

| Starting surface | Ending surface | Focal length |
|---|---|---|
| 14 | 21 | 48.14 |

TABLE 3

| | Mode 1 | | | Mode 2 | | | Mode 3 | | |
|---|---|---|---|---|---|---|---|---|---|
| | ∞ | −0.02 times | −0.12 times | ∞ | −0.02 times | −0.12 times | ∞ | −0.02 times | −0.12 times |
| d10 | 4.97 | 6.57 | 21.38 | 4.54 | 6.30 | 21.60 | 5.30 | 7.31 | 24.59 |
| d13 | 18.36 | 16.33 | 1.71 | 18.26 | 16.28 | 1.73 | 18.44 | 16.49 | 2.01 |
| d21 | 42.61 | 43.04 | 42.86 | 43.15 | 43.36 | 42.62 | 42.20 | 42.14 | 39.35 |

Numerical Embodiment 4

Unit mm

Surface data

| Surface number | r | d | nd | vd |
|---|---|---|---|---|
| 1 | 113.024 | 2.40 | 1.72047 | 34.7 |
| 2 | 66.442 | 8.81 | 1.43875 | 94.7 |
| 3 | 757.319 | 0.15 | | |
| 4 | 71.175 | 7.36 | 1.49700 | 81.5 |
| 5 | 583.178 | (Variable) | | |
| 6 | 49.469 | 1.50 | 1.73800 | 32.3 |
| 7 | 25.786 | 7.41 | | |
| 8 | −123.349 | 1.30 | 1.49700 | 81.5 |
| 9 | 27.758 | 5.28 | 1.85478 | 24.8 |
| 10 | 145.829 | 2.84 | | |
| 11 | −61.094 | 1.25 | 1.80100 | 35.0 |
| 12 | 1811.368 | (Variable) | | |
| 13 | 228.227 | 4.50 | 1.69680 | 55.5 |
| 14 | −33.026 | 1.40 | 1.83481 | 42.7 |
| 15 | −99.451 | (Variable) | | |
| 16 (Stop) | ∞ | 1.40 | | |
| 17 | 59.754 | 4.48 | 1.69895 | 30.1 |
| 18 | −91.806 | 0.20 | | |
| 19 | 45.190 | 2.47 | 1.69350 | 50.8 |
| 20 | 108.415 | 1.70 | | |
| 21 | −103.468 | 1.60 | 1.80518 | 25.4 |
| 22 | 28.003 | 5.38 | 1.53775 | 74.7 |
| 23 | −92.070 | (Variable) | | |
| 24 | 1449.551 | 1.40 | 1.85478 | 24.8 |
| 25 | 38.266 | 1.22 | | |
| 26 | 117.731 | 1.40 | 1.62230 | 53.2 |
| 27 | 24.933 | 3.77 | 1.80810 | 22.8 |
| 28 | 160.424 | (Variable) | | |
| 29 | −183.068 | 3.20 | 1.51633 | 64.1 |
| 30 | −44.873 | (Variable) | | |
| 31 | 340.273 | 2.89 | 1.67300 | 38.1 |
| 32 | −122.021 | 1.50 | 1.85026 | 32.3 |
| 33 | −145.605 | (Variable) | | |
| 34 | −46.118 | 1.50 | 1.83400 | 37.3 |
| 35 | 63.000 | 0.50 | | |
| 36 | 53.024 | 6.05 | 1.88300 | 40.8 |
| 37 | −463.304 | (Variable) | | |
| Image plane | ∞ | | | |

Various data
Zoom ratio 2.78

| | | | | | | |
|---|---|---|---|---|---|---|
| Focal length | 72.21 | 130.45 | 194.06 | 72.81 | 129.76 | 192.70 |
| F-number | 4.00 | 3.93 | 4.00 | 3.98 | 3.96 | 4.00 |
| Angle of view | 16.68 | 9.42 | 6.36 | 16.77 | 9.47 | 6.41 |
| Image height | 21.64 | 21.64 | 21.64 | 21.64 | 21.64 | 21.64 |
| Total lens length | 215.54 | 215.54 | 215.54 | 215.54 | 215.54 | 215.54 |
| BF | 25.98 | 25.98 | 25.97 | 25.98 | 25.98 | 25.98 |
| Focal length | 69.87 | 132.10 | 194.06 | | | |
| F-number | 3.87 | 3.99 | 4.00 | | | |
| Angle of view | 17.21 | 9.30 | 6.36 | | | |
| Image height | 21.64 | 21.64 | 21.64 | | | |
| Total lens length | 211.91 | 216.17 | 214.30 | | | |
| BF | 22.34 | 26.60 | 24.74 | | | | zoom lens unit data

| Unit | Starting surface | Focal length | Lens structure length | Front principal point position | Rear principal point position |
|---|---|---|---|---|---|
| 1 | 1 | 130.99 | 18.72 | 4.32 | −8.37 |
| 2 | 6 | −39.24 | 19.58 | 8.28 | −6.17 |
| 3 | 13 | 138.10 | 5.90 | 2.44 | −1.00 |
| 4 | 16 | 56.01 | 17.22 | 0.74 | −11.00 |
| 5 | 24 | −71.93 | 7.78 | 0.70 | −4.17 |
| 6 | 29 | 114.22 | 3.20 | 2.78 | 0.68 |
| 7 | 31 | 157.55 | 5.09 | 2.64 | −0.61 |
| 8 | 35 | −81.27 | 8.05 | −1.61 | −6.23 |

TABLE 3-continued

| Unit mm | | |
|---|---|---|
| Starting surface | Ending surface | Focal length |
| Lens unit B1 data | | |
| 24 | 28 | −71.98 |
| Lens unit B2 data | | |
| 31 | 33 | 157.55 |

TABLE 4

| Wide-angle end | Mode 1 | | | Mode 2 | | | Mode 3 | | |
|---|---|---|---|---|---|---|---|---|---|
| | ∞ | −0.02 times | −0.12 times | ∞ | −0.02 times | −0.12 times | ∞ | −0.02 times | −0.12 times |
| d5 | 3.20 | 3.20 | 3.20 | 35.60 | 35.60 | 35.60 | 49.49 | 49.49 | 49.49 |
| d12 | 28.00 | 28.00 | 28.00 | 15.74 | 15.74 | 15.74 | 1.80 | 1.80 | 1.80 |
| d15 | 22.05 | 22.05 | 22.05 | 1.91 | 1.91 | 1.91 | 1.97 | 1.97 | 1.97 |
| d23 | 4.70 | 5.04 | 7.78 | 3.10 | 3.63 | 9.93 | 3.08 | 3.97 | 20.60 |
| d28 | 18.66 | 18.32 | 15.58 | 20.26 | 19.73 | 13.43 | 20.28 | 19.38 | 2.76 |
| d30 | 13.00 | 12.02 | 6.79 | 12.05 | 11.09 | 5.92 | 12.23 | 11.23 | 5.97 |
| d33 | 15.13 | 16.11 | 21.34 | 14.96 | 16.46 | 25.77 | 5.28 | 7.62 | 24.91 |
| d37 | 25.98 | 25.98 | 25.98 | 25.98 | 25.98 | 25.98 | 25.98 | 25.98 | 25.98 |

TABLE 4-continued

| Middle zooming position | Mode 1 | | | Mode 2 | | | Mode 3 | | |
|---|---|---|---|---|---|---|---|---|---|
| | ∞ | −0.02 times | −0.16 times | ∞ | −0.02 times | −0.16 times | ∞ | −0.02 times | −0.16 times |
| d5 | 3.20 | 3.20 | 3.20 | 35.60 | 35.60 | 35.60 | 49.49 | 49.49 | 49.49 |
| d12 | 28.00 | 28.00 | 28.00 | 15.74 | 15.74 | 15.74 | 1.80 | 1.80 | 1.80 |
| d15 | 22.05 | 22.05 | 22.05 | 1.91 | 1.91 | 1.91 | 1.97 | 1.97 | 1.97 |
| d23 | 4.36 | 4.69 | 7.39 | 2.78 | 3.31 | 9.51 | 2.77 | 3.64 | 20.00 |
| d28 | 19.00 | 18.67 | 15.97 | 20.58 | 20.05 | 13.85 | 20.59 | 19.72 | 3.36 |
| d30 | 13.14 | 11.64 | 2.33 | 12.25 | 10.78 | 1.55 | 14.47 | 12.94 | 3.54 |
| d33 | 16.07 | 17.03 | 22.20 | 15.85 | 17.32 | 26.55 | 6.57 | 8.86 | 26.00 |
| d37 | 25.98 | 25.98 | 25.98 | 25.98 | 25.98 | 25.98 | 25.98 | 25.98 | 25.98 |

| Telephoto end | Mode 1 | | | Mode 2 | | | Mode 3 | | |
|---|---|---|---|---|---|---|---|---|---|
| | ∞ | −0.02 times | −0.24 times | ∞ | −0.02 times | −0.24 times | ∞ | −0.02 times | −0.24 times |
| d5 | 3.20 | 3.20 | 3.20 | 35.60 | 35.60 | 35.60 | 49.49 | 49.49 | 49.49 |
| d12 | 28.00 | 28.00 | 28.00 | 15.74 | 15.74 | 15.74 | 1.80 | 1.80 | 1.80 |
| d15 | 22.05 | 22.05 | 22.05 | 1.91 | 1.91 | 1.91 | 1.97 | 1.97 | 1.97 |
| d23 | 5.07 | 5.41 | 8.21 | 3.40 | 3.94 | 10.32 | 3.31 | 4.22 | 21.05 |
| d28 | 18.29 | 17.95 | 15.15 | 19.96 | 19.42 | 13.04 | 20.05 | 19.14 | 2.31 |
| d30 | 22.70 | 20.36 | 3.09 | 21.52 | 19.23 | 2.09 | 24.28 | 21.85 | 4.34 |
| d33 | 14.08 | 15.08 | 20.37 | 14.09 | 15.61 | 25.00 | 4.31 | 6.69 | 24.09 |
| d37 | 25.98 | 25.98 | 25.98 | 25.98 | 25.98 | 25.98 | 25.97 | 25.97 | 25.97 |

TABLE 5

| | | | | Embodiment 4 | | |
|---|---|---|---|---|---|---|
| Parameter | Embodiment 1 | Embodiment 2 | Embodiment 3 | Wide-angle end | Middle zooming position | Telephoto end |
| f1 | 145.040 | 116.840 | 116.840 | −71.980 | −71.980 | −71.980 |
| f2 | 63.340 | 48.140 | 48.140 | 157.550 | 157.550 | 157.550 |
| S1 | 0.201 | 0.184 | −1.147 | −2.222 | −2.251 | −2.047 |
| S2 | 0.799 | 0.815 | 0.931 | 0.812 | 0.809 | 0.618 |
| X1 | −0.610 | −0.646 | −0.435 | −0.341 | −0.316 | −0.315 |
| X2 | 0.155 | 0.147 | −0.435 | −0.938 | −0.890 | −1.286 |
| β | −0.120 | −0.120 | −0.125 | −0.120 | −0.162 | −0.245 |
| βi1 | −0.032 | 0.058 | 4.199 | 3.302 | 3.316 | 2.968 |
| βi2 | 0.449 | 0.430 | 0.263 | 0.764 | 0.765 | 0.826 |
| βj1 | −0.032 | 0.058 | 4.322 | 3.354 | 3.365 | 3.007 |
| βj2 | 0.451 | 0.433 | 0.254 | 0.758 | 0.759 | 0.818 |
| βi1r | 0.449 | 0.430 | 0.263 | 0.474 | 0.475 | 0.512 |
| βi2r | 1.000 | 1.000 | 1.000 | 1.396 | 1.396 | 1.396 |
| Li | 160.042 | 132.925 | 123.795 | 215.538 | 215.538 | 215.537 |
| Lj | 160.042 | 132.925 | 123.795 | 215.538 | 215.538 | 215.538 |
| I1 | 1.882E−02 | −4.359E−02 | 3.350E−02 | 6.118E−01 | 3.882E−01 | 4.064E−01 |
| I2 | 3.070E−02 | 1.340E−04 | 4.490E−02 | 7.812E−01 | 5.539E−01 | 2.581E−01 |
| I3 | −2.000E−03 | −6.458E−02 | 2.465E−02 | 3.678E−01 | 2.059E−01 | −2.726E−02 |
| Conditional expression (1) | 0.000 | 0.000 | 0.000 | 0.000 | 0.000 | 0.000 |
| Conditional expression (2) | 1.000 | 1.000 | 1.000 | 1.000 | 1.000 | 1.000 |
| Conditional expression (3) | 0.994 | 0.993 | 1.005 | 0.992 | 0.993 | 0.997 |
| Conditional expression (4) | −0.120 | −0.120 | −0.125 | −0.120 | −0.162 | −0.245 |
| Conditional expression (5) | 2.290 | 2.427 | 2.427 | 0.457 | 0.457 | 0.457 |
| Conditional expression (6) | 2.000E−03 | −6.458E−02 | 2.465E−02 | 3.678E−01 | 2.059E−01 | −2.726E−02 |

Embodiment 5

Figure 23:
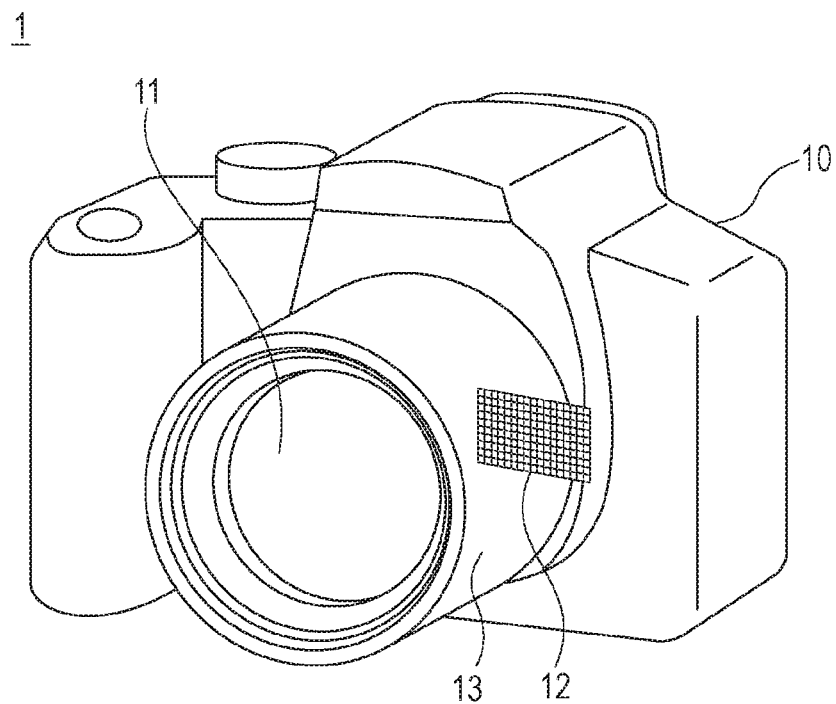
FIG. 23 is a schematic diagram of a main part of an image pickup apparatus of Embodiment 5.

A digital camera (image pickup apparatus, optical apparatus) 1 using the optical system of the present disclosure as an image pickup optical system will be described with reference to FIG. 23. FIG. 23 is a schematic diagram of a main part of the digital camera 1. The digital camera 1 has a camera body 10 and a lens apparatus 13 including an image pickup optical system 11. The image pickup optical system 11 is configured by any one of the optical systems described in Embodiments 1 to 4. A solid-state image pickup device (photoelectric conversion device) 12 such as a CCD sensor or a CMOS sensor is built in the camera body 10 and receives an object image formed by the image pickup optical system 11.

Figure 24:
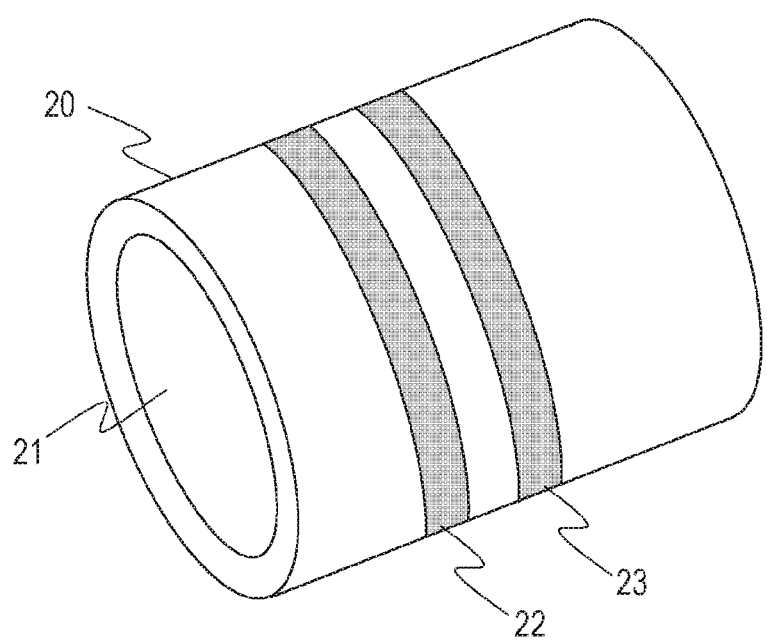
FIG. 24 is an external perspective view of the lens apparatus of Embodiment 5.

A lens apparatus (optical apparatus) 20 using the optical system of the present disclosure as an image pickup optical system will be described with reference to FIG. 24. FIG. 24 is an external perspective view of the lens apparatus 20. The lens apparatus 20 includes an image pickup optical system 21, a focus operation unit 22, and an operation unit 23 for changing the arrangement state of the lens units. The image pickup optical system 21 is configured by any one of the optical systems described in Embodiments 1 to 4. When the user operates the focus operation unit 22, the arrangement of the lens units of the image pickup optical system 21 is mechanically or electrically changed, and the focal position can be changed. When the user operates the operation unit 23, the arrangement of the lens units of the image pickup optical system 21 is mechanically or electrically changed, and the aberration can be changed.

In the present embodiment, each operation unit has a ring shape, but the shape of each operation unit is not limited to a ring shape and may be another shape. Each operation unit may be a button or the like for electrically moving each lens unit. The lens apparatus 20 may not have the focus operation unit.

As described above, by applying the optical system of the present disclosure to an optical device such as a digital camera or a lens apparatus, an optical device that is small and has high optical performance can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-243042 filed Dec. 15, 2016, which is hereby incorporated by reference herein in its entirety.

What is claimed is:

1. An optical system comprising:
a first lens unit disposed closest to an object side;
a first focusing unit disposed on an image side of the first lens unit; and
a second focusing unit disposed on the image side of the first focusing unit,
wherein the first focusing unit and the second focusing unit move in different loci during focusing,
wherein in a first arrangement state, the first focusing unit and the second focusing unit are so arranged to generate a first aberration while maintaining an in-focus state at a predetermined object distance, and in a second arrangement state, the first focusing unit and the second focusing unit are so arranged to generate a second aberration different from the first aberration while maintaining the in-focus state at the predetermined object distance,
wherein the first arrangement state is changed to the second arrangement state by moving the first focusing unit and the second focusing unit only, and focusing is performed by moving the first focusing unit and the second focusing unit only,
wherein a total length of the optical system, which is a distance between a most object side surface of the first lens unit and an image plane, is the same in the first arrangement state and the second arrangement state, and
wherein, when changing between the first arrangement state and the second arrangement state, the first lens unit does not move.

2. The optical system according to claim 1, wherein the first arrangement state and the second arrangement state are arrangement states of the optical system that is in focus on an infinite object.

3. The optical system according to claim 1, wherein the following conditional expression is satisfied:

$$\left(\frac{S1}{|S1|}\right) \times \left(\frac{X1}{|X1|}\right) + \left(\frac{S2}{|S2|}\right) \times \left(\frac{X2}{|X2|}\right) = 0$$

where S1 is defined as $S1=(1-(\beta i1)^2) \times (\beta i1r)^2$, S2 is defined as $S2=(1-(\beta i2)^2) \times (\beta i2r)^2$, where $\beta i1$ is a lateral magnification of the first focusing unit in the first arrangement state, $\beta i2$ is a lateral magnification of the second focusing unit in the first arrangement state, $\beta i1r$ is a composite lateral magnification of one or more lens unit arranged closer to the image side than the first focusing unit in the first arrangement state, $\beta i2r$ is a composite lateral magnification of one or more lens unit arranged closer to the image side than the second focusing unit in the first arrangement state, X1 is an amount of movement of the first focusing unit when changing from the first arrangement state to the second arrangement state, X2 is an amount of movement of the second focusing unit when changing from the first arrangement state to the second arrangement state, and $\beta i2r=1$ in a case where the one or more lens unit are not arranged closer to the image side than the second focusing unit.

4. The optical system according to claim 1, wherein the following conditional expression is satisfied:

$$0.9 < (\beta i1 \times \beta i2)/(\beta j1 \times \beta j2) < 1.1,$$

where $\beta i1$ is a lateral magnification of the first focusing unit in the first arrangement state, $\beta i2$ is a lateral magnification of the second focusing unit in the first arrangement state, $\beta j1$ is a lateral magnification of the first focusing unit in the second arrangement state, and $\beta j2$ is a lateral magnification of the second focusing unit in the second arrangement state.

5. The optical system according to claim 1, the optical system further comprises a third arrangement state, wherein in the third arrangement state, the first focusing unit and the second focusing unit are arranged such that the following conditional expression is satisfied:

$$I < 0,$$

where I is a third-order aberration coefficient at the time of focusing on the infinite object.

6. The optical system according to claim 1, wherein the following conditional expression is satisfied:

$\beta < -0.1$, where β is an image magnification upon focusing at a closest distance.

7. The optical system according to claim 1, wherein the following conditional expression is satisfied:

$0.4 > |f1/f2| < 2.5$, where f1 is a focal length of the first focusing unit, and f2 is a focal length of the second focusing unit.

8. The optical system according to claim 1, wherein the first focusing unit and the second focusing unit each include at least one positive lens and at least one negative lens.

9. The optical system according to claim 1, wherein, in performing the change from the first arrangement state to the second arrangement state and the focusing operation together, a focal position is kept substantially constant when aberration is changed.

10. The optical system according to claim 1, wherein the optical system is either a shooting lens system configured to be used in an image pickup apparatus or a projection optical system configured to be used in a projection apparatus.

11. The optical system according to claim 1, wherein, except for the first focusing unit and the second focusing unit, no unit is moved when the change from the first arrangement state to the second arrangement state and the focusing operation are performed together.

12. An optical apparatus comprising:
an optical system, wherein the optical system includes:
a first lens unit disposed closest to an object side,
a first focusing unit disposed on an image side of the first lens unit, and
a second focusing unit disposed on the image side of the first focusing unit,
wherein the first focusing unit and the second focusing unit move in different loci during focusing in a focusing operation,
wherein, in a first arrangement state, the first focusing unit and the second focusing unit are arranged to generate a first aberration while maintaining an in-focus state at a predetermined object distance, and in a second arrangement state, the first focusing unit and the second focusing unit are arranged to generate a second aberration different from the first aberration while maintaining the in-focus state at the predetermined object distance, and
wherein the first arrangement state is changed to the second arrangement state by moving the first focusing unit and the second focusing unit only, and focusing is performed by moving the first focusing unit and the second focusing unit only,
wherein a total length of the optical system, which is a distance between a most object side surface of the first lens unit and an image plane, is the same in the first arrangement state and the second arrangement state, and
wherein, when changing between the first arrangement state and the second arrangement state, the first lens unit does not move.

13. The optical apparatus according to claim 12, wherein the first focusing unit and the second focusing unit each include at least one positive lens and at least one negative lens.

14. An image pickup apparatus comprising:
an optical system; and
an image pickup device configured to receive an image formed by the optical system,
wherein the optical system includes:
a first lens unit disposed closest to an object side,
a first focusing unit disposed on an image side of the first lens unit, and
a second focusing unit disposed on the image side of the first focusing unit,
wherein the first focusing unit and the second focusing unit move in different loci during focusing in a focusing operation,
wherein, in a first arrangement state, the first focusing unit and the second focusing unit are arranged to generate a first aberration while maintaining an in-focus state at a predetermined object distance, and in a second arrangement state, the first focusing unit and the second focusing unit are arranged to generate a second aberration different from the first aberration while maintaining the in-focus state at the predetermined object distance, and
wherein the first arrangement state is changed to the second arrangement state by moving the first focusing unit and the second focusing unit only, and focusing is performed by moving the first focusing unit and the second focusing unit only,
wherein a total length of the optical system, which is a distance between a most object side surface of the first lens unit and an image plane, is the same in the first arrangement state and the second arrangement state, and
wherein, when changing between the first arrangement state and the second arrangement state, the first lens unit does not move.

15. The image pickup apparatus according to claim 14, wherein the first focusing unit and the second focusing unit each include at least one positive lens and at least one negative lens.

* * * * *